United States Patent [19]
Michioka et al.

[11] Patent Number: 6,132,093
[45] Date of Patent: Oct. 17, 2000

[54] LINEAR MOTION GUIDING APPARATUS

[75] Inventors: Hidekazu Michioka; Katsuya Iida; Masahiro Yoshihashi; Hiroaki Mochizuki; Tadashi Hirokawa, all of Tokyo-to, Japan

[73] Assignee: THK, Co., Ltd., Tokyo-To, Japan

[21] Appl. No.: 09/088,491

[22] Filed: Jun. 2, 1998

[30] Foreign Application Priority Data

Jun. 16, 1997 [JP] Japan ................................. 9-175336
Apr. 30, 1998 [JP] Japan ................................ 10-136062

[51] Int. Cl.⁷ ............................................. F16C 29/06
[52] U.S. Cl. ........................................................ 384/45
[58] Field of Search ................................ 384/45, 43, 44; 464/168

[56] References Cited

FOREIGN PATENT DOCUMENTS 0 400 200  12/1990  European Pat. Off. .
2 175 054  11/1986  United Kingdom .
2 180 303   3/1987  United Kingdom .

*Primary Examiner*—Lenard A. Footland
*Attorney, Agent, or Firm*—Young & Thompson

[57] ABSTRACT

A linear motion guiding apparatus comprises a guide rail provided with a ball running groove, and a movable block movably arranged along the guide rail through balls. The movable block is provided with a ball running counter-groove, a ball returning passage arranged away from the ball running counter-groove and direction changing passages for connecting these members. A resin-formed body for forming a ball circulation passage comprises a pair of ball passage forming portions, a returning passage forming portion and a pair of direction changing passage-inner guide forming portions. The resin-formed body is separately formed from a body of the movable block. At least two portions of (a) the ball passage forming portions, (b) the returning passage forming portion, (c) one of the direction changing passage-inner guide forming portions and (d) another of the of direction changing passage-inner guide forming portions are connected with each other through integral forming so that the resin-formed body can be built in the body of the movable block.

3 Claims, 44 Drawing Sheets

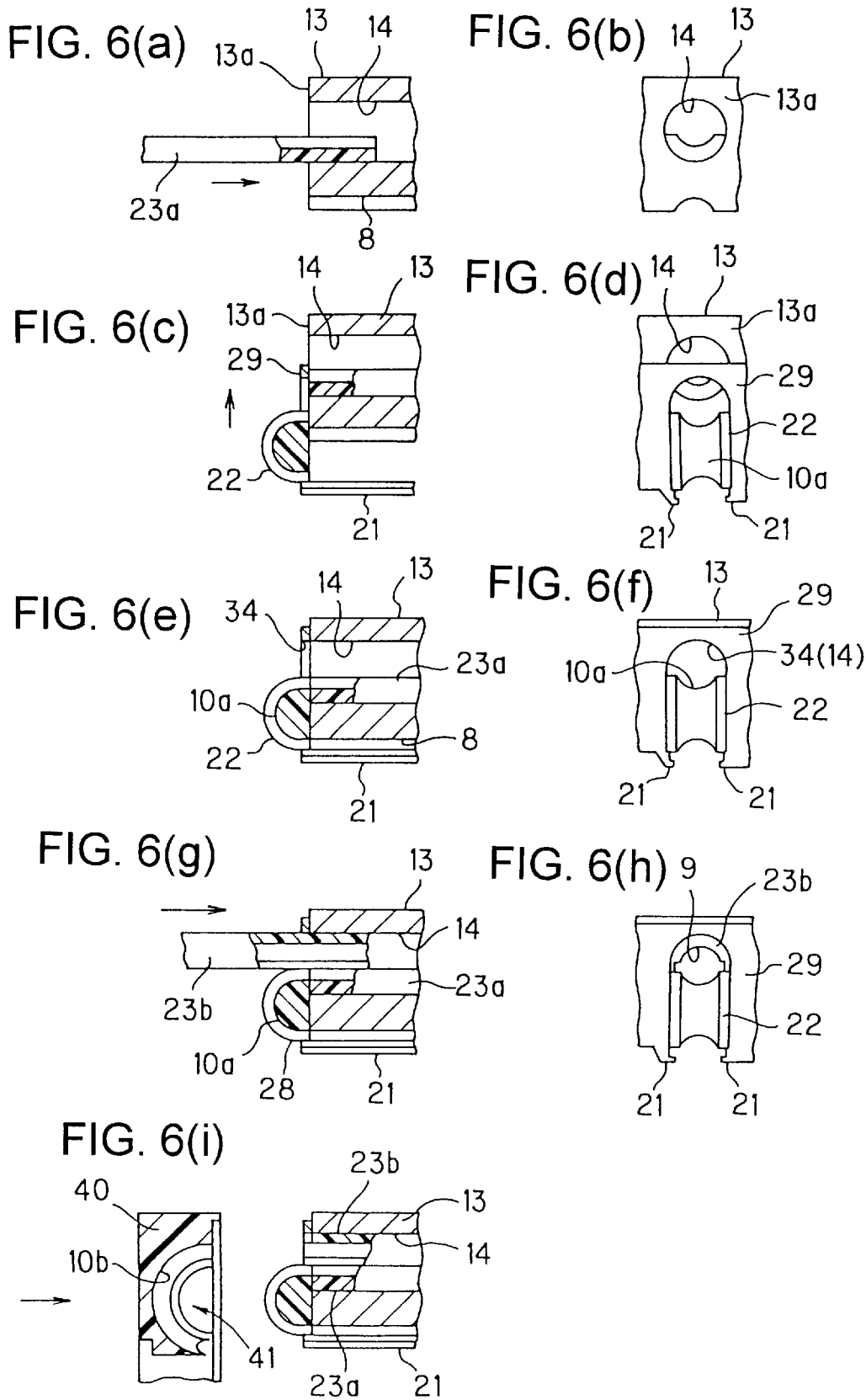

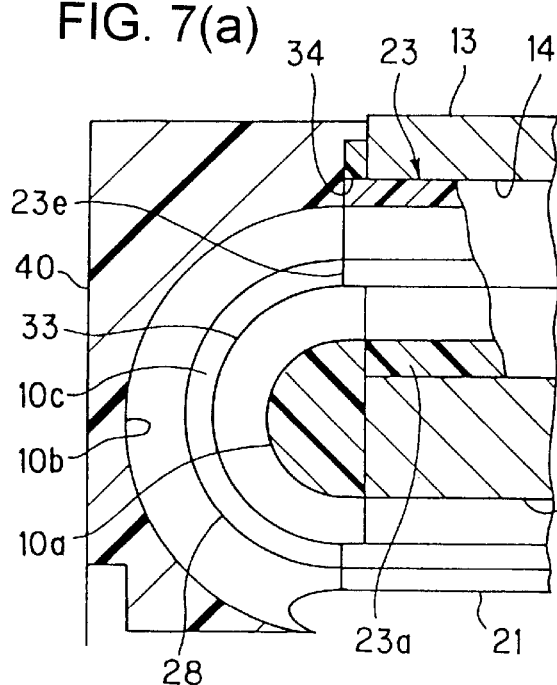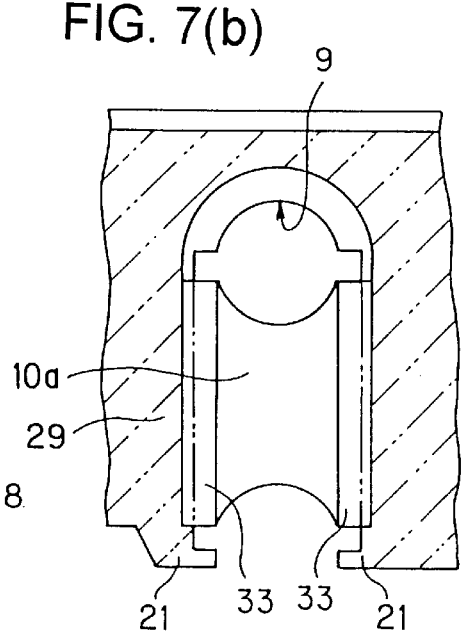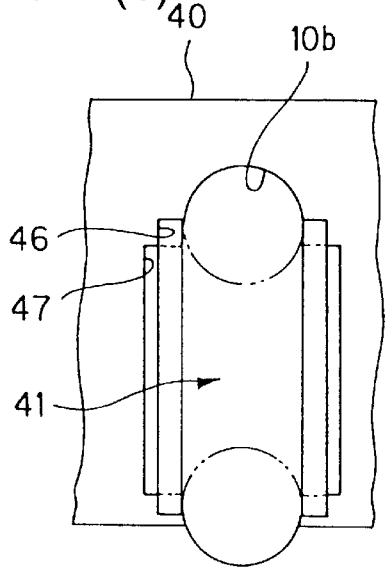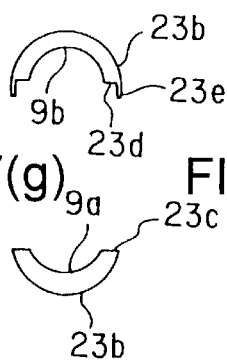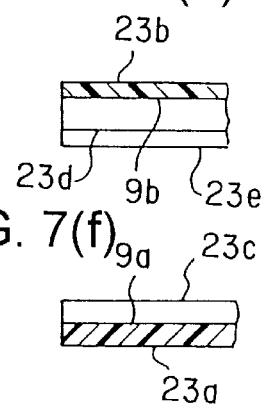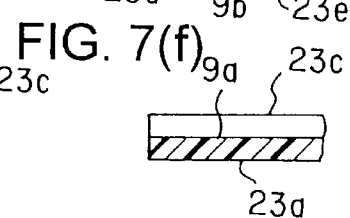

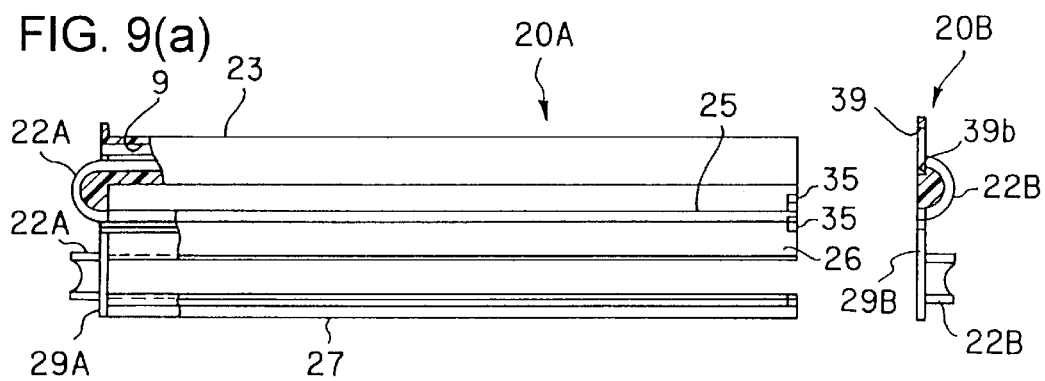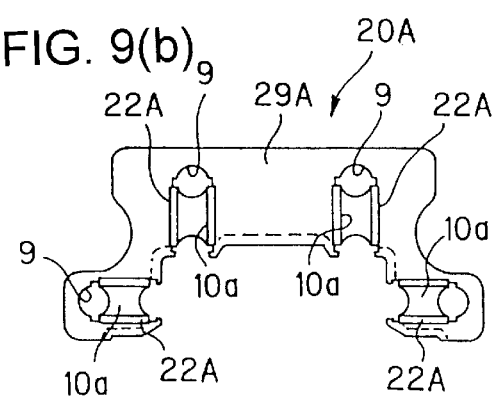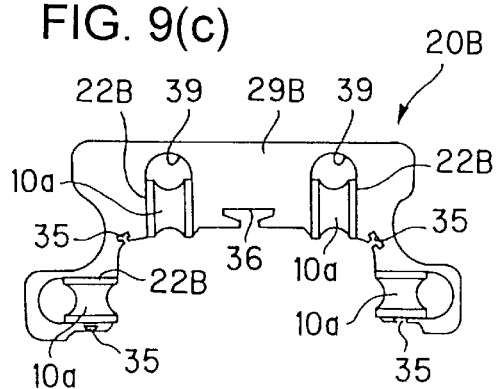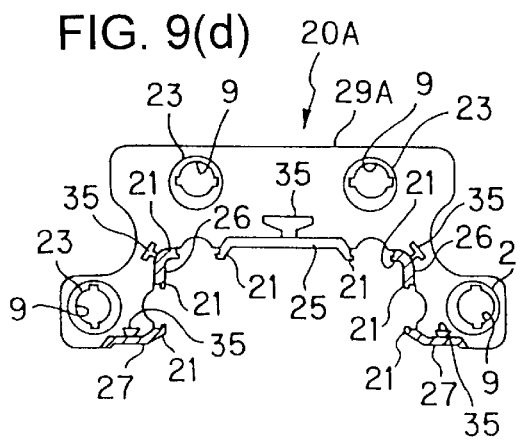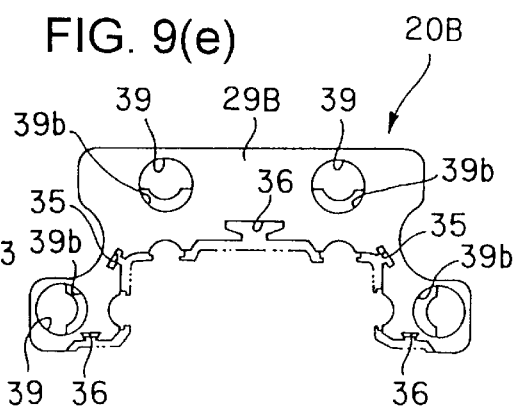

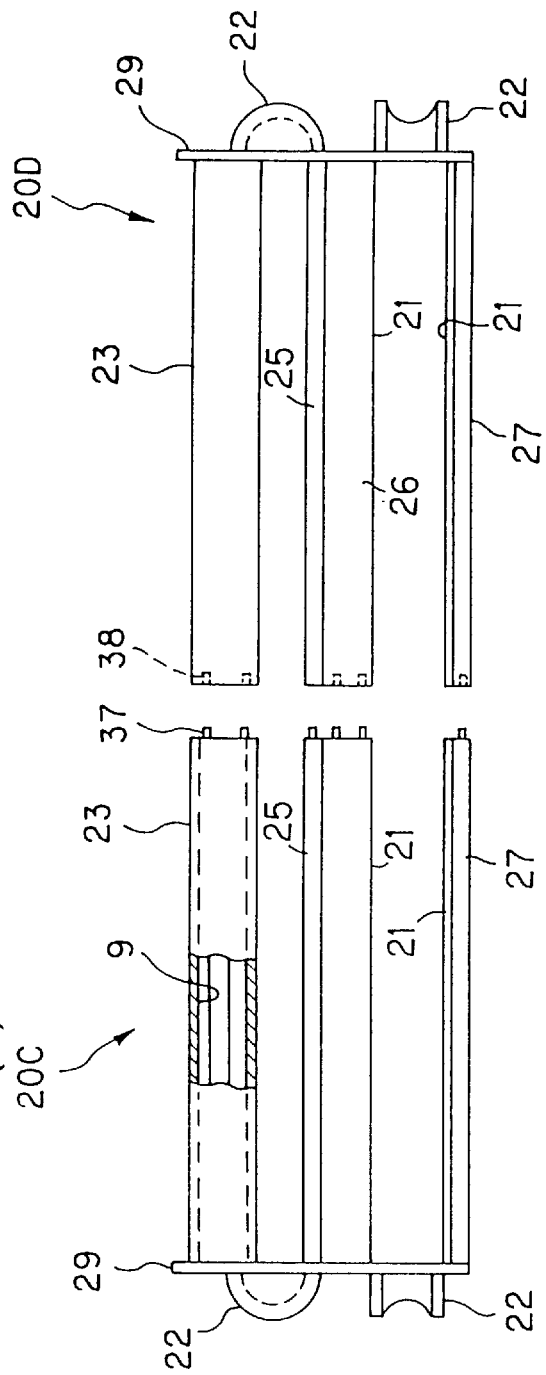
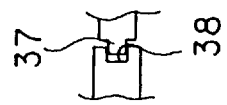
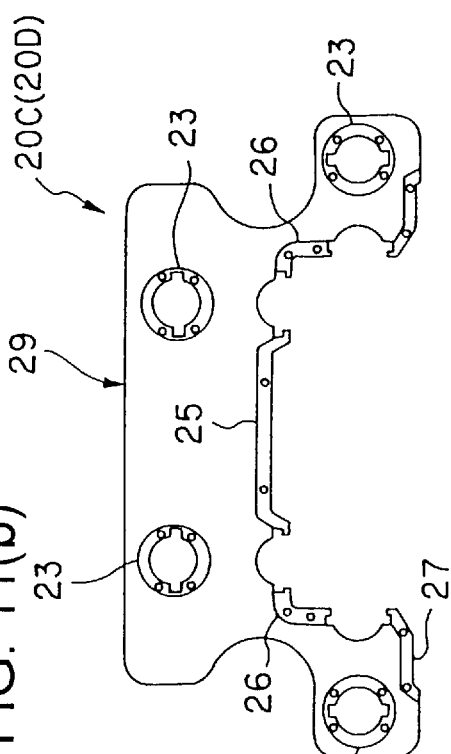

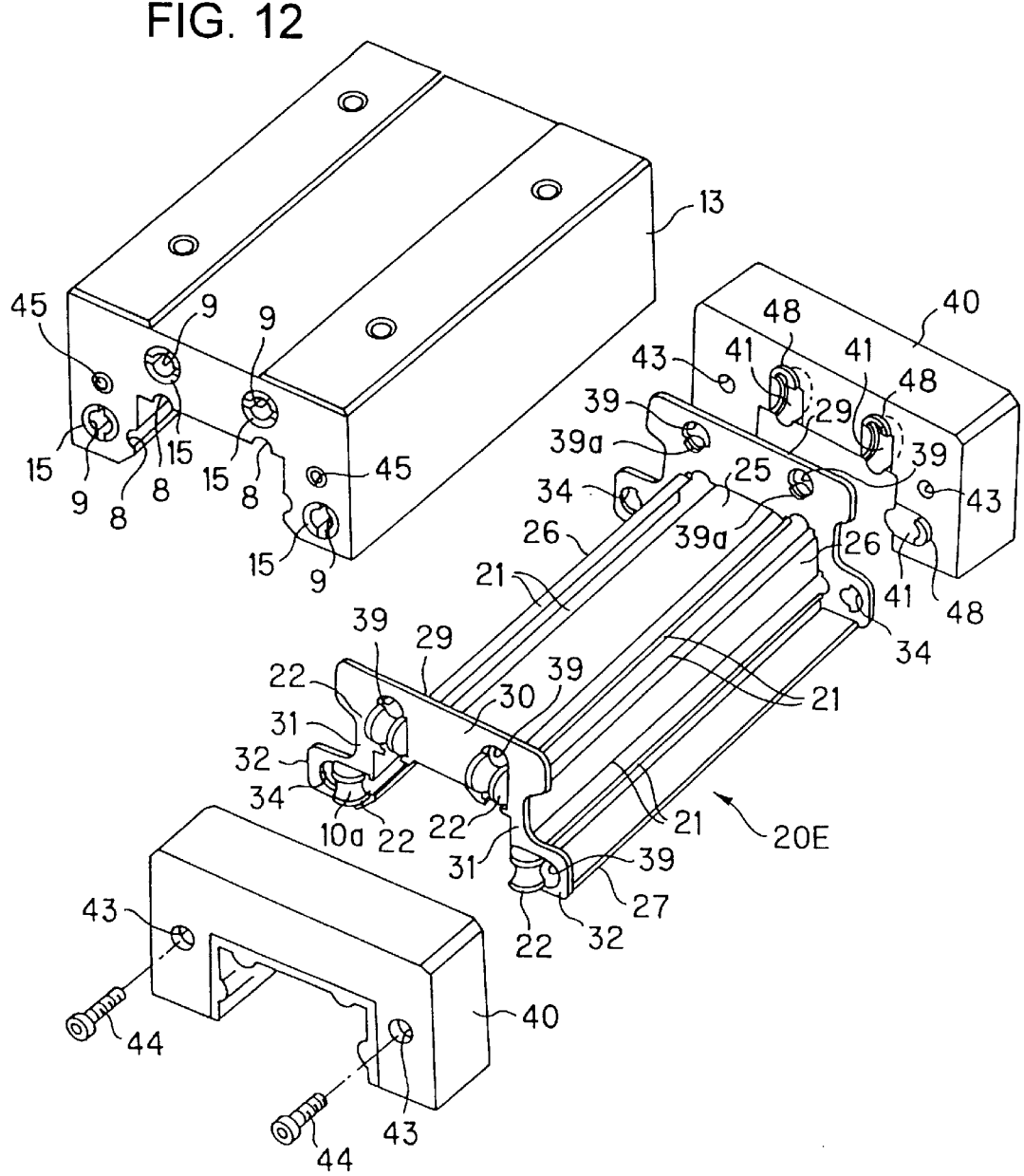

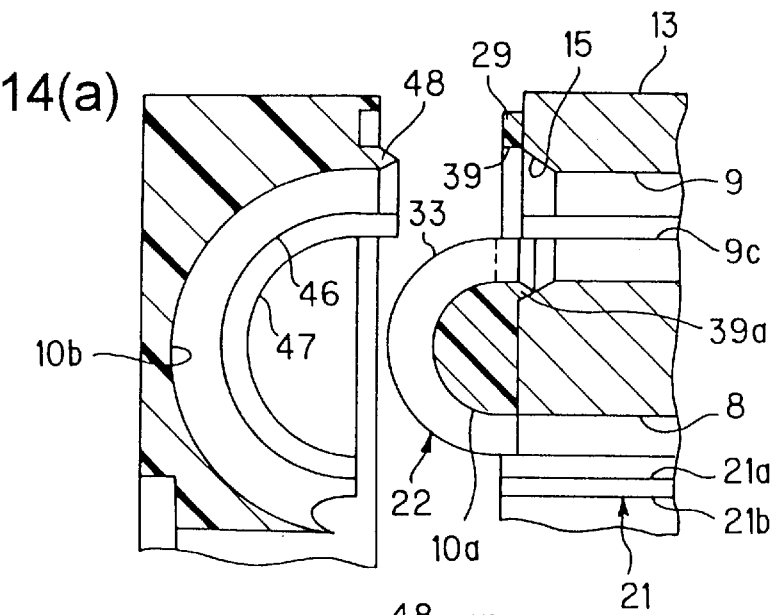
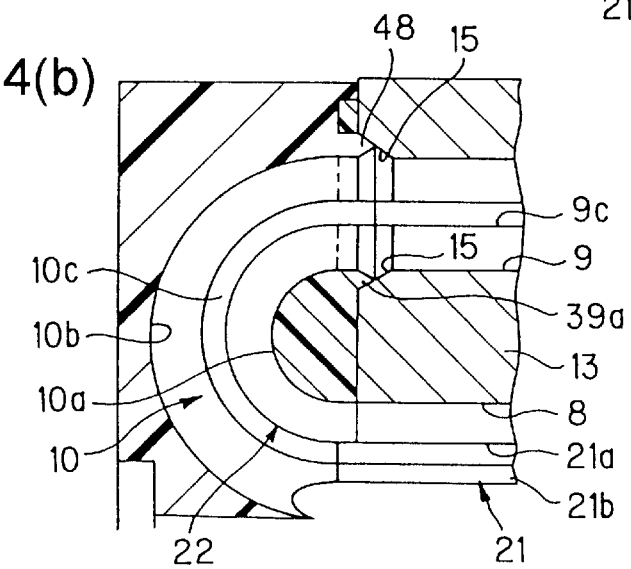
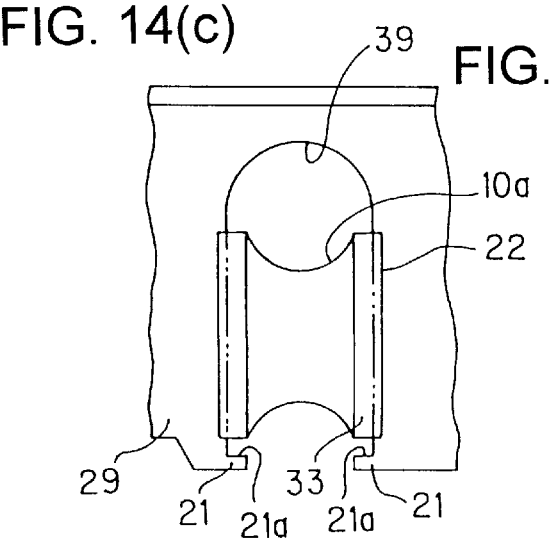
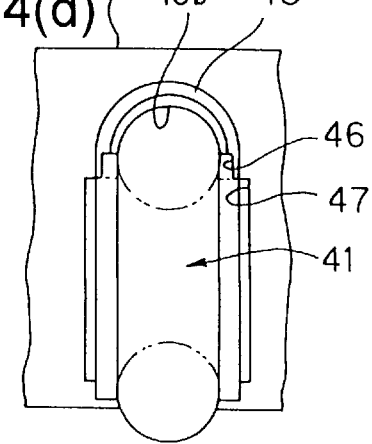

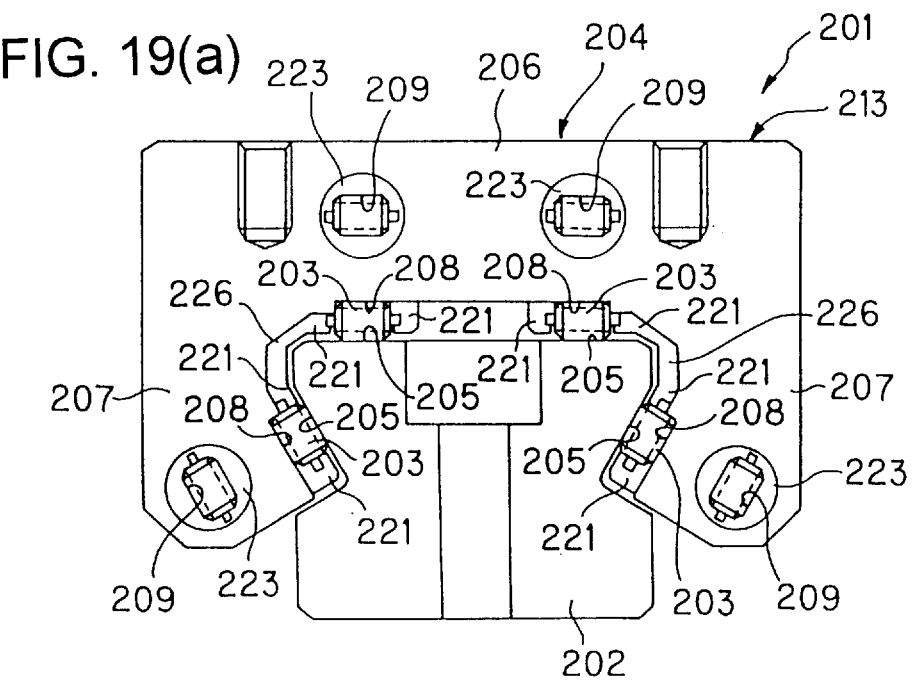
FIG. 19(a)
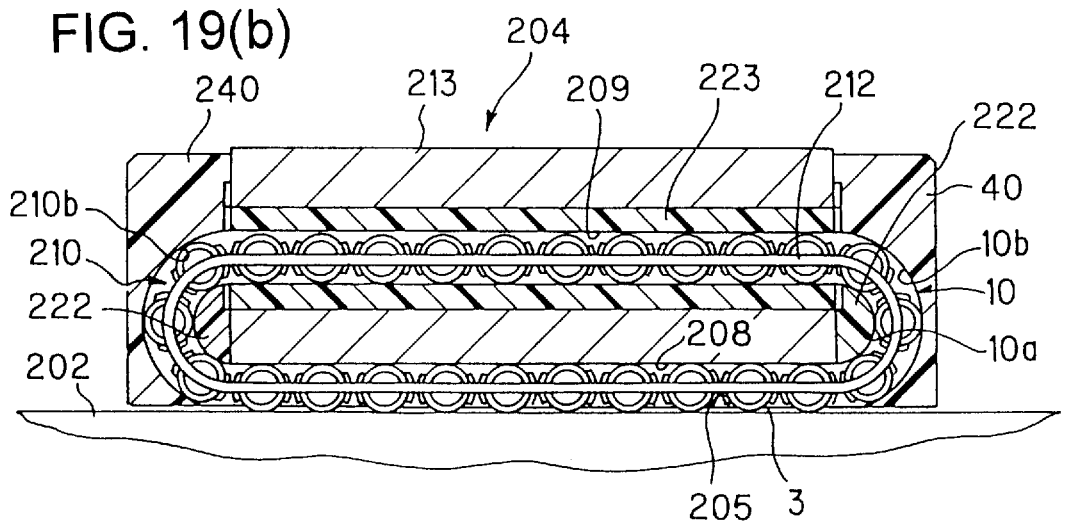
FIG. 19(b)
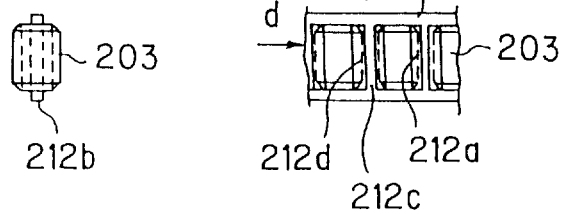
FIG. 19(c)
FIG. 19(d)

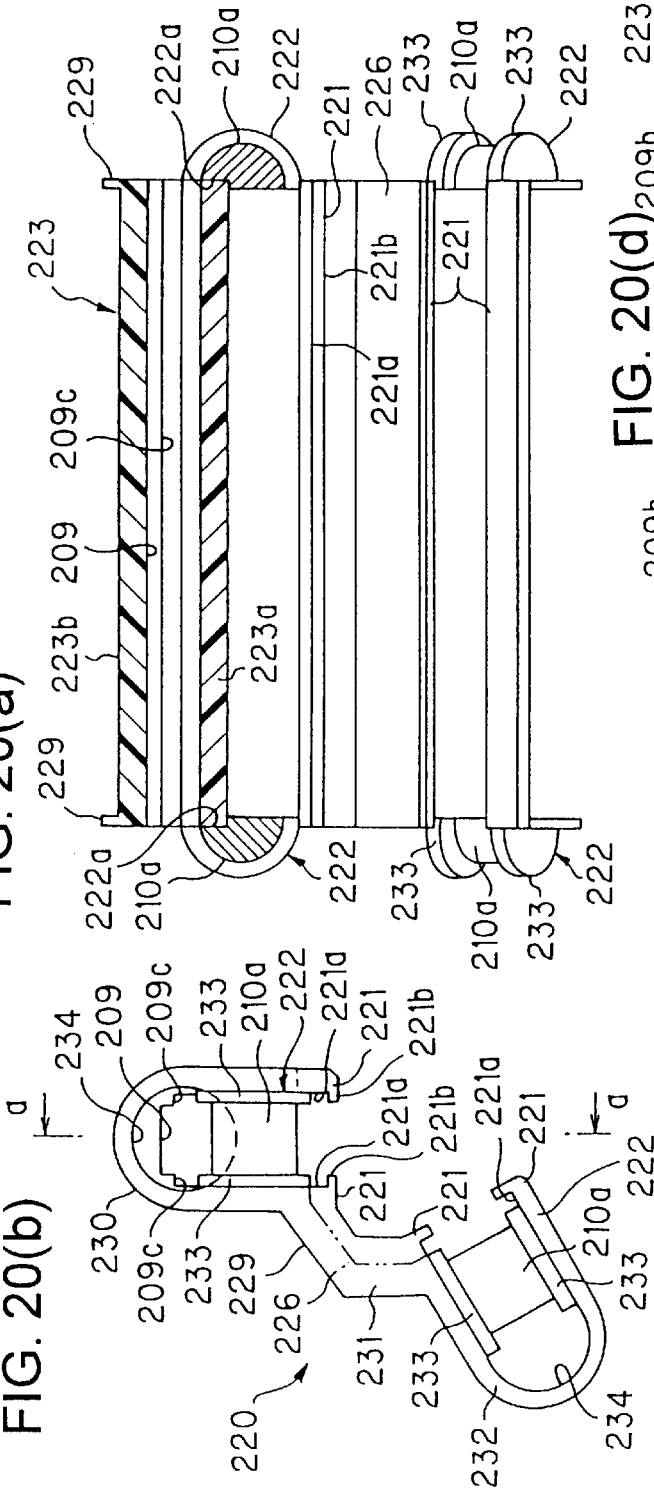
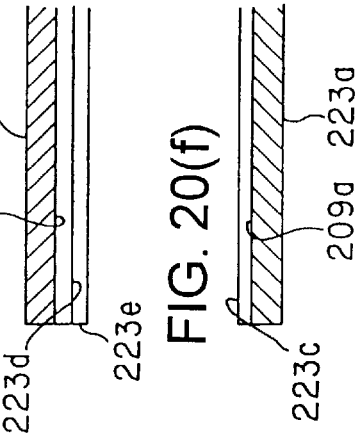
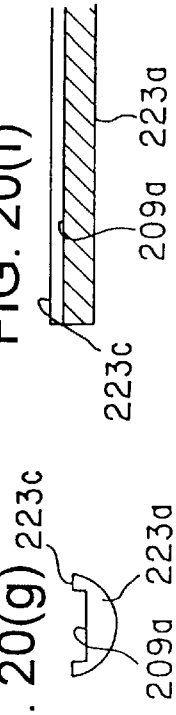
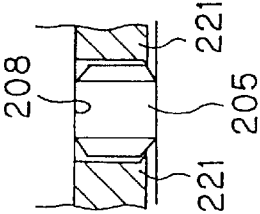
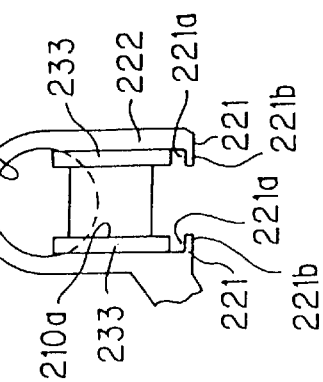

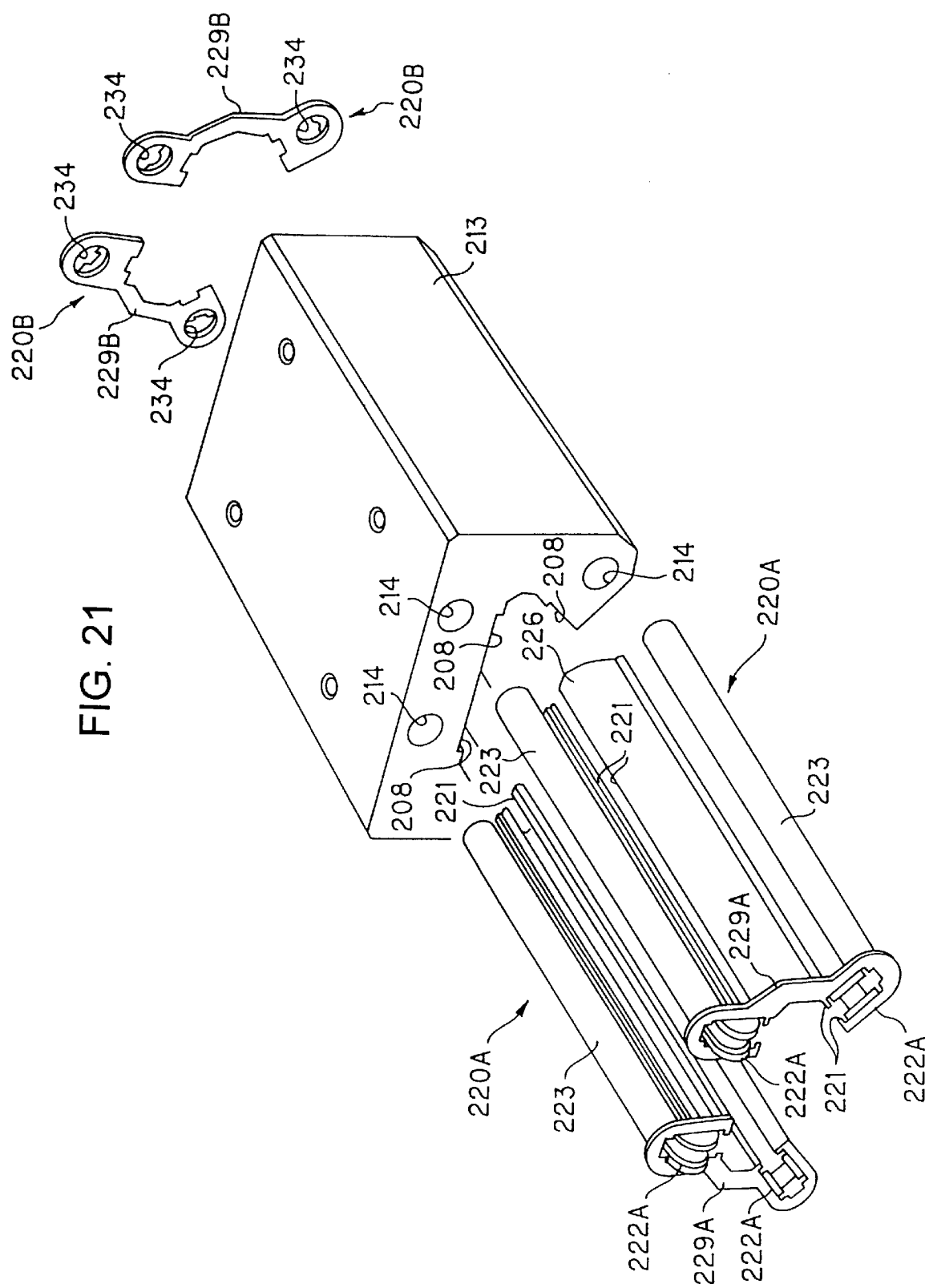

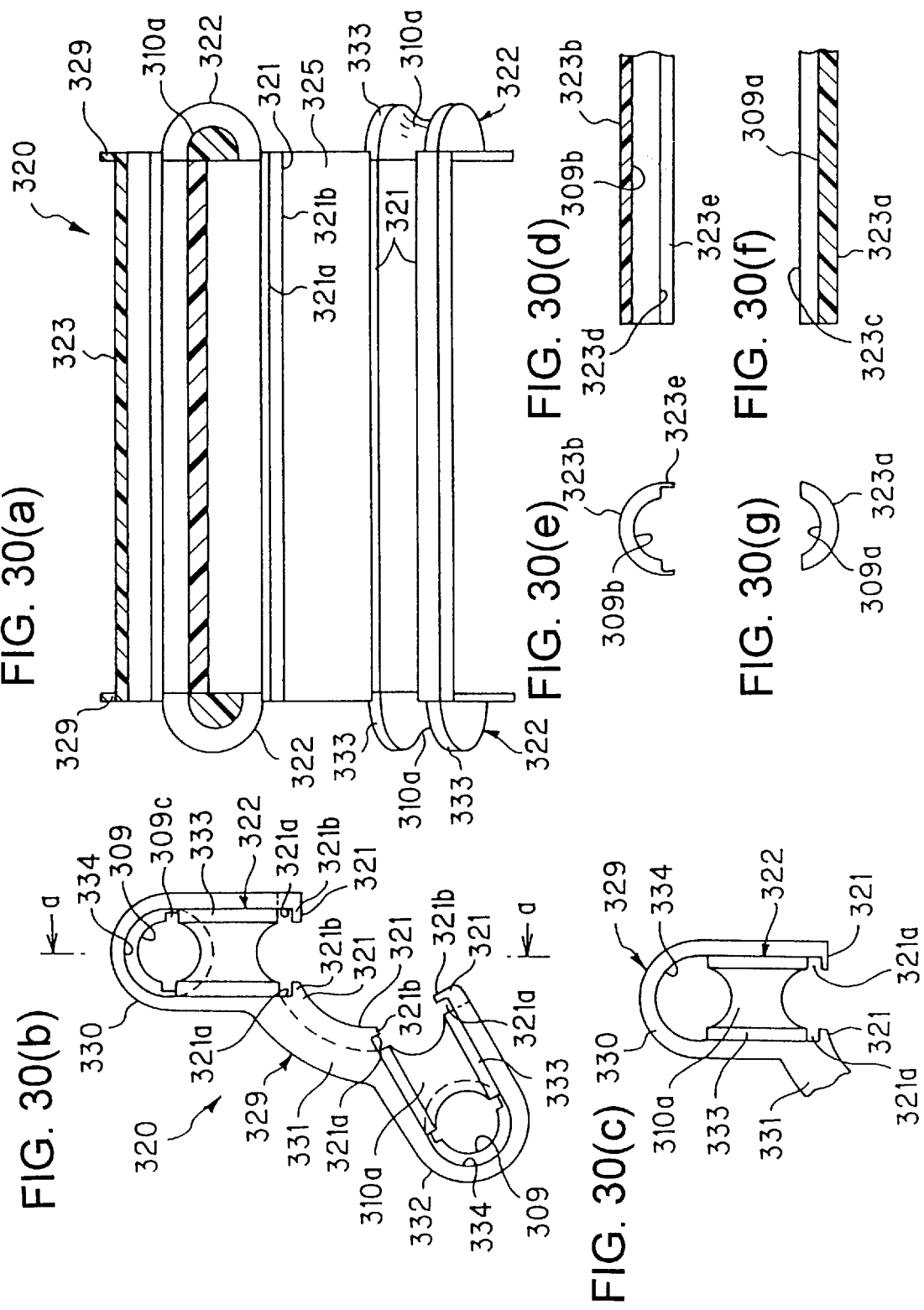

LINEAR MOTION GUIDING APPARATUS

BACKGROUND OF THE INVENTION

1. Field of the Invention

The present invention relates to a linear motion guiding apparatus in which a passage forming member formed of resin is built into a body of movable member.

2. Description of the Related Art

The applicant has already proposed a technical idea that, in a movable block of a linear motion guiding apparatus, a pair of ball passage forming portions extending along the opposite longitudinal sides of a loaded-ball running groove, a ball returning passage forming portion and a pair of direction changing passage-inner guide forming portions were integrally formed of resin with a body of the movable block (refer to Japanese Patent Provisional Publication No. H7-317,762).

More specifically, when a resin forming is carried out, the body of the movable block is inserted in a die, and the ball passage forming portions, the direction changing passage-inner guide forming portions or the ball returning passage forming portion is integrally formed with the block body.

In the conventional movable block obtained by the integral forming, the block body is inserted in the die, as mentioned above. When the block body has a large size, a large-scaled die is required to be used. It is not easy to prepare such a large-scaled die, and there is actual restriction in size. The ball passage forming portions located at the opposite longitudinal sides of the ball running groove extending along the longitudinal direction of the block body are thin and long, with the result that molten resin may not reach every part of the space for forming the ball passage forming portions during the resin forming treatment.

Increase in number of gates formed on the die may solve the above-mentioned problem of misrun of the molten resin. However, when the block body is inserted in the die, the block body may deteriorate the run of the molten resin.

When the movable block has a pair of wing portions, which face right and left-hand side portions of the guide rail so that the guide rail is held between the wing portions, and there are four trains of balls between the right and left-hand side portions of the guide rail and the right and left-hand wing portions of the moving block, and more specifically, the upper and lower trains of balls are arranged at each of a gap between the right-hand side portion of the guide rail and the corresponding right-hand wing portion of the moving block and another gap between the left-hand side portion of the guide rail and the corresponding left-hand wing portion of the moving block, the block body inserted in the die may deteriorate the run of the molten resin in the width direction of the moving block.

SUMMARY OF THE INVENTION

An object of the present invention is therefore to provide a linear motion guiding apparatus in which a resin-formed body for forming a rolling member circulation passage is formed separately from a body of a movable member so as to permit easy formation of the resin-formed body, and such a resin-formed body is able to be built in the body of the movable member, ensuring integral formability of the maximum number of unit parts for defining the rolling member circulation passage.

In order to attain the aforementioned object, a linear motion guiding apparatus comprises:

a guide member provided with a rolling member running track, and a movable member arranged so as to be movable along the guide member through a large number of rolling members, said movable member being provided with (i) a rolling member running counter-track corresponding to the rolling member running track of said guide member, (ii) a rolling member returning passage arranged away from said rolling member running counter-track by a prescribed distance and in parallel therewith and (iii) a pair of direction changing passages for connecting the rolling member running counter-track and the rolling member returning passage to permit circulation of the rolling members, characterized in that:

a resin-formed body for forming a rolling member circulation passage comprises a pair of rolling member passage forming portions extending along both longitudinal sides of said rolling member running counter-track, a returning passage forming portion for forming the rolling member returning passage and a pair of direction changing passage-inner guide forming portions for forming inner peripheral guide portions of said direction changing passages, said resin-formed body being separately formed from a body of said movable member; and at least two portions of (a) said pair of rolling member passage forming portions, (b) said returning passage forming portion, (c) one of said pair of direction changing passage-inner guide forming portions and (d) another of said pair of direction changing passage-inner guide forming portions are connected with each other through integral forming so that said resin-formed body can be built in the body of said movable member.

Embodiments of the combination of these portions (a) to (d) for the resin-formed body for forming the rolling member circulation passage may include the following three examples:

the first example in which the resin-formed body comprises (i) an integral body of the pair of rolling member passage forming portions and the pair of direction changing passage-inner guide forming portions, and (ii) the returning passage forming portion separately formed from the integral body the second example in which the resin-formed body comprises (i) an integral body of the pair of rolling member passage forming portions, the returning passage forming portion and one of the pair of direction changing passage-inner guide forming portions, and (ii) another of the pair of direction changing passage-inner guide forming portions separately formed from the integral body; and the third example in which the resin-formed body is manufactured by preparing an integral body of the pair of rolling member passage forming portions, the returning passage forming portion and the pair of direction changing passage-inner guide forming portions, and then dividing the pair of rolling member passage forming portions and the returning passage forming portion in longitudinal intermediate portions thereof into respective two parts.

According to the present invention, the resin-formed body for forming the rolling member circulation passage is separately formed from the body of the movable member. Even if the movable member has a large size, the flow of molten resin is not therefore restricted by the body of the movable member unlike the conventional prior art in which the body of the movable member and the resin-formed body are integrally formed with each other, and it is possible to ensure proper run of molten resin through increase in a number of gates in the die, thus leading to an excellent formability. In general, it is hard to achieve proper run of molten resin especially at the rolling member passage forming portions extending along the longitudinal sides of the rolling member running counter-track, and it is therefore effective to separately form the resin-formed body from the body of the movable member in the same manner as the present invention.

The rolling member circulation passage is formed by the resin-formed body. Therefore, the direct positioning can be achieved in the relative positional relationship between the direction changing passage-inner guide forming portions and the rolling member passage forming portion, as well as the relative positional relationship between the direction changing passage-inner guide forming portions and the returning passage forming portion, and the continuity of the rolling member circulation passage is properly ensured, thus leading to smooth run of the rolling members.

Since the rolling member passage forming portions are located along the both longitudinal sides of the rolling member running counter-track, the direction changing passage-inner guide forming portions having a proper relative positional relationship with the rolling member passage forming portions are accurately set on the both ends of the rolling member running counter-track.

Maintenance of a proper relative positional relationship of the direction changing passage-inner guide forming portions with the rolling member returning passage causes the direction changing passage-inner guide forming portions to be accurately connected to the inner surface of the rolling member returning passage.

Especially, change in a running direction of the rolling members takes place in the connection area of the rolling member passage forming portions with the direction changing passage-inner guide forming portions as well as in the connection area of the direction changing passage-inner guide forming portions with returning passage forming portion. When two portions in such a connection area are connected with each other by integral forming, a step for assembling these two portions is not required, thus making it possible to ensure a smooth continuity of these two portions without being affected by accuracy of assembly.

The rolling member returning passage may be a through-hole formed in the body of the movable member, the resin formed-body may comprise the pair of direction changing passage-inner guide forming portions and the rolling member passage forming portions extending along the both longitudinal sides of the rolling member running counter-track, and the rolling member passage forming portions and at least one of the pair of direction changing passage-inner guide forming portions may be connected with each other through integral forming.

When the rolling member passage forming portions and the direction changing passage-inner guide forming portions are integrally formed with each other so as to provide the smooth connection area in this manner, it is possible to achieve the smooth run of the rolling members in the connection area of these portions, thus improving circulation property of the rolling member without providing any returning passage forming portion made of resin. Such a construction causes easy manufacture of the apparatus due to no existence of the returning passage forming portion.

The present invention may have additional features that a rolling member retainer is provided, the rolling member retainer being able to retain the rolling members in a train with a prescribed distance kept between adjacent two of the rolling members, and the rolling member retainer having side edge portions projecting from both sides of each of the rolling members; and guide grooves for guiding the side edge portions of the rolling member retainer are formed on an entire periphery of the rolling member circulation passage.

The present invention may have additional features that a retaining portion is provided on the rolling member passage forming portion, for preventing the rolling member retainer being out of place, when the movable member is removed from the guide member, and a guide portion is continuously formed on the entire periphery of the rolling member circulation passage, for guiding the side edge portions of the rolling member retainer.

Such provision of the rolling member retainer permits the smooth run of the rolling members by means of the rolling member retainer, due to proper maintenance of continuity of the guide portion for the rolling member retainer.

Since the guide portion for the rolling member retainer having a small thickness is not formed by inserting the body of the movable member in a die and then injecting molten resin into the die, but is separately formed from the body of the movable member, position of gates can freely be determined without being restricted by the body of the movable member, with the result that molten resin can reach, during formation of the guide portion, the entire space therefor, which is formed in the die.

The present invention may have additional features that each of the direction changing passage-inner guide forming portions has a thin sheet portion, which is to be brought into contact with the end face of the body of the movable member, and each of the direction changing passage-inner guide forming portions is connected to the rolling member passage forming portions or the returning passage forming portion by means of the thin sheet portion.

When each of the direction changing passage-inner guide forming portions is connected to the rolling member passage forming portions by means of the thin sheet portion, deformation of the thin sheet portion can absorb distortion, which occurs between the direction changing passage-inner guide forming portion and the rolling member passage forming portion, or between the direction changing passage-inner guide forming portion and the returning passage forming portion. Accordingly, it is possible to maintain an accurate positional relationship between the end of the direction changing passage-inner guide forming portion and the rolling member passage forming portion or between the direction changing passage-inner guide forming portion and the returning passage forming portion.

The thin sheet portion is urged against the flat end face of the body of the movable member by a clamping force, which is applied to the side cover plate. The position of the direction changing passage-inner guide forming portion can therefore be corrected through deformation of the thin sheet portion, even when the direction changing passage-inner guide forming portion is not correctly positioned relative to the end face of the body of the movable member. In addition, the thin sheet portion can firmly be secured between the side cover plate and the body of the movable member by the clamping force, which is applied to the side cover plate, thus preventing the direction changing passage-inner guide forming portion from being incorrectly placed.

The apparatus of the present invention may have the construction that the guide member comprises a guide rail; the movable member comprises a movable block, which is provided with a horizontal portion, which faces an upper surface of the guide rail and a pair of wing portions, between which the guide rail is held at right and left-hand side surfaces thereof; two trains of the rolling members are arranged in a gap between the upper surface of the guide rail and a lower surface of the movable block, and a single train of the rolling members is arranged in each of gaps between the right and left-hand side surfaces of the guide rail and both of the wing portions, so as to provide a total number of trains of four.

The apparatus of the present invention may have the construction that the guide member comprises a guide rail; the movable member comprises a movable block, which is provided with a pair of wing portions, between which the guide rail is held at right and left-hand side surfaces thereof; and two trains of the rolling members are arranged in each of gaps between the right and left-hand side surfaces of the guide rail and both of the wing portions, so as to provide a total number of trains of four.

In these cases, the respective four direction changing passage-inner guide forming portions may be formed into an integral body, or the respective two direction changing passage-inner guide forming portions at each of the right and left-hand sides of the movable block may be formed into an integral body.

The apparatus of the present invention may have the construction that the guide member comprises a guide rail; the movable member is provided with a horizontal portion, which faces an upper surface of the guide rail and a single wing portion, which faces one side surface of the guide rail; a single train of the rolling members is arranged in a gap between the one side surface of the guide rail and the single wing portion, and another single train of the rolling members is arranged in a gap between the upper surface of the guide rail and a lower surface of the horizontal portion in a vicinity of a corner of the guide rail.

The apparatus of the present invention may have the construction that the guide member comprises a guide rail; the movable member comprises a movable block, which is provided with a pair of wing portions, between which the guide rail is held at right and left-hand side surfaces thereof; and a single train of the rolling members is arranged in each of gaps between the right and left-hand side surfaces of the guide rail and both of the wing portions, so as to provide a total number of trains of two.

The apparatus of the present invention may have the construction that the guide member comprises a guide rail; the movable member comprises a movable block arranged along one side surface of the guide rail; and two trains of the rolling members are arranged in a gap between the one side surface of the guide rail and the movable block.

The apparatus of the present invention may have the construction that the guide member comprises a spline shaft; and the movable member comprises an outer tube, which is movably supported on the spline shaft through a plurality of trains of the rolling members.

In addition, according to the present invention, there is also provided a linear motion guiding apparatus comprising:
 a guide rail provided with two rolling member running tracks on each of right and left-hand side surfaces of the guide rail, so as to provide a total number of the rolling member running tracks of four; and
 a movable block provided with a pair of wing portions, between which the guide rail is held at the right and left-hand side surfaces thereof, each of said wing portions having on an inner surface thereof two rolling member running counter-tracks corresponding to said two rolling member running tracks of the guide rail, so as to provide a total number of the rolling member running counter-tracks of four, said movable block having four endless circulation passages, which are formed by four rolling member returning passages arranged in parallel with said four rolling member running counter-tracks, respectively, and rolling member returning passages for connecting both ends of each of said four rolling member running counter-tracks with both ends of each of said four rolling member returning passages, respectively characterized in that:
 a resin-formed body comprises, for each of said endless circulation passages, a pair of rolling member passage forming portions extending along both longitudinal sides of said rolling member running counter-track, a returning passage forming portion for forming the rolling member returning passage and a pair of direction changing passage-inner guide forming portions for forming inner peripheral guide portions of said direction changing passages, said resin-formed body being separately formed from a body of said movable block;
 said resin-formed body is divided into two body-parts, which are arranged on the wing portions of the movable block, respectively, so as to form the two endless circulation passages at an inner side of each of the wing portions; and
 in each of the two body-parts, the rolling member running counter-track and the pair of direction changing passage-inner guide forming portions are formed into an integral body, and the returning passage forming portion is separately formed from said integral body.

According to the present invention, the resin-formed body for forming the rolling member circulation passage is separately formed from the body of the movable block. Even if the movable block has a large size, the flow of molten resin is not therefore restricted by the body of the movable block unlike the conventional prior art in which the body of the movable block and the resin-formed body are integrally formed with each other, and it is possible to ensure proper run of molten resin through increase in a number of gates in the die, thus leading to an excellent formability. In general, it is hard to achieve proper run of molten resin especially at the rolling member passage forming portions extending along the longitudinal sides of the rolling member running counter-track, and it is therefore effective to separately form the resin-formed body from the body of the movable block in the same manner as the present invention.

Especially, since the resin-formed body is divided into the two body-parts, each of which forms two endless circulation passages, a proper run of molten resin can be ensured, even when the block of the movable block has a larger width.

The rolling member circulation passage is formed by the resin-formed body. Therefore, the direct positioning can be achieved in the relative positional relationship between the direction changing passage-inner guide forming portions and the rolling member passage forming portion, as well as the relative positional relationship between the direction changing passage-inner guide forming portions and the returning passage forming portion, and the continuity of the rolling member circulation passage is properly ensured, thus leading to smooth run of the rolling members.

Since the rolling member passage forming portions are located along the both longitudinal sides of the rolling member running counter-track, the direction changing passage-inner guide forming portions having a proper relative positional relationship with the rolling member passage forming portions are accurately set on the both ends of the rolling member running counter-track.

Maintenance of a proper relative positional relationship of the direction changing passage-inner guide forming portions with the rolling member returning passage causes the direction changing passage-inner guide forming portions to be accurately connected to the inner surface of the rolling member returning passage.

Especially, change in a running direction of the rolling members takes place in the connection area of the rolling member passage forming portions with the direction changing passage-inner guide forming portions. When these two portions in such a connection area are connected with each other by integral forming, a step for assembling these two portions is not required, thus making it possible to ensure a smooth continuity of these two portions without being affected by accuracy of assembly.

The present invention may have additional features that a rolling member retainer is provided, the rolling member retainer being able to retain the rolling members in a train with a prescribed distance kept between adjacent two of the rolling members, and the rolling member retainer having side edge portions projecting from both sides of each of the rolling members; and guide grooves for guiding the side edge portions of the rolling member retainer are formed on an entire periphery of the rolling member circulation passage.

Such provision of the rolling member retainer permits the smooth run of the rolling members by means of the rolling member retainer, due to proper maintenance of continuity of the guide portion for the rolling member retainer.

Since the guide portion for the rolling member retainer having a small thickness is not formed by inserting the body of the movable block in a die and then injecting molten resin into the die, but is separately formed from the body of the movable block, position of gates can freely be determined without being restricted by the body of the movable block, with the result that molten resin can reach, during formation of the guide portion, the entire space therefor, which is formed in the die.

The present invention may have additional features that each of the direction changing passage-inner guide forming portions has a thin sheet portion, which is to be brought into contact with the end face of the body of the movable block, and each of the direction changing passage-inner guide forming portions is connected to the rolling member passage forming portions or the returning passage forming portion by means of the thin sheet portion.

When each of the direction changing passage-inner guide forming portions is connected to the rolling member passage forming portions by means of the thin sheet portion, deformation of the thin sheet portion can absorb distortion, which occurs between the direction changing passage-inner guide forming portion and the rolling member passage forming portion, or between the direction changing passage-inner guide forming portion and the returning passage forming portion. Accordingly, it is possible to maintain an accurate positional relationship between the end of the direction changing passage-inner guide forming portion and the rolling member passage forming portion or between the direction changing passage-inner guide forming portion and the returning passage forming portion.

The thin sheet portion is urged against the flat end face of the body of the movable member by a clamping force, which is applied to the side cover plate. The position of the direction changing passage-inner guide forming portion can therefore be corrected through deformation of the thin sheet portion, even when the direction changing passage-inner guide forming portion is not correctly positioned relative to the end face of the body of the movable block. In addition, the thin sheet portion can firmly be secured between the side cover plate and the body of the movable block by the clamping force, which is applied to the side cover plate, thus preventing the direction changing passage-inner guide forming portion from being incorrectly placed.

BRIEF DESCRIPTION OF THE DRAWINGS

FIG. 2 shows a resin frame member as shown in FIG. 1, as one of resin-formed bodies for forming a ball circulation passage, and more specifically.

FIG. 5 shows a side cover plate of the movable block, and more specifically,

FIGS. 6(a) to 6(i) are descriptive views illustrating steps for assembling the movable block as shown in FIG. 1;

FIG. 7(a) is an enlarged partial view of the direction changing passage as shown in FIG. 4(b), FIG. 7(b) is a partial side view of the direction changing passage as shown in FIG. 4(b), in which the side cover plate is removed, FIG. 7(c) is a partial side view illustrating a recess portion, which forms the direction changing passage in the side cover plate as shown in FIG. 7(a), FIG. 7(d) is a partial cross-sectional view of an outer peripheral side-half pipe member for forming a part of a resin pipe as shown in FIG. 7(a), FIG. 7(e) is a side view of the outer peripheral side-half pipe member as shown in FIG. 7(d), FIG. 7(f) is a partial cross-sectional view of an inner peripheral side-half pipe member for forming another part of the resin pipe as shown in FIG. 7(a), FIG. 7(g) is a side view of the inner peripheral side-half pipe member as shown in FIG. 7(f);

FIG. 9(a) is a disassembling side view having a partial cross-section, illustrating the resin-formed body for the ball circulation passage as shown in FIG. 8, FIG. 9(b) is a view illustrating the first resin frame of the resin-formed body, FIG. 9(c) is a view illustrating the second resin frame thereof, FIG. 9(d) is a back view of the first resin frame and FIG. 9(e) is a back view of the second resin frame;

FIG. 11(a) is a disassembling side view having a partial cross-section, illustrating the resin-formed body for the ball circulation passage as shown in FIG. 10, FIG. 11(b) is a side view illustrating the connecting end of one of divided resin frames, as shown in FIG. 11(a) and FIG. 11(c) is an enlarged cross-sectional view illustrating the connecting portion of the resin frames;

FIG. 12 is a schematic disassembling perspective view illustrating the third modification of the resin-formed body for forming the ball circulation passage in the first embodiment of the present invention;

FIG. 14(a) is an enlarged partial cross-sectional view of the direction changing passage as shown in FIG. 13(b), which is formed in the side cover plate removed from the ball passage forming portion, FIG. 14(b) is a partial cross-sectional view illustrating the side cover as shown in FIG. 14(a), which is secured to the ball passage forming portion, FIG. 14(c) is a partial side view illustrating the ball passage forming portion, in which the side cover plate as shown in FIG. 14(a) is removed, and FIG. 14(d) is a partial side view illustrating a recess portion, which forms the direction changing passage in the side cover plate as shown in FIG. 14(a);

FIG. 19(a) is a front view illustrating the linear motion guiding apparatus of the second embodiment of the present invention as shown in FIG. 18, FIG. 19(b) is a partial cross-sectional view illustrating one ball circulation passage of the apparatus as shown in FIG. 19(a), FIG. 19(c) is a partial plan view of a roller retainer as shown in FIG. 19(b) and FIG. 19(d) is a view of the roller retainer, with sight being placed in a direction of an arrow of "d" as indicated in FIG. 19(c);

FIG. 20 shows the resin-formed body for forming the ball circulation passage as shown in FIG. 18, and more specifically, FIG. 20(a) is a cross-sectional view cut along the line a—a as indicated in FIG. 20(b), FIG. 20(b) is a front view of the resin-formed body for forming the ball circulation passage as shown in FIG. 20(a), FIG. 20(c) is a partial side view of the resin-formed body for forming the ball circulation passage, in which the resin pipe as shown in FIG. 20(a) is removed, FIG. 20(d) is a cross-sectional view of an outer peripheral side-half pipe member for forming a part of a resin pipe as shown in FIG. 20(a), FIG. 20(e) is a side view of the outer peripheral side-half pipe member as shown in FIG. 20(d), FIG. 20(f) is a cross-sectional view of an inner peripheral side-half pipe member for forming another part of the resin pipe as shown in FIG. 20(a), FIG. 20(g) is a side view of the inner peripheral side-half pipe member as shown in FIG. 20(f) and FIG. 20(h) is a partial cross-sectional view illustrating the constructional example of the roller passage forming portion, in which the roller retainer is not used;

FIG. 21 is a schematic disassembling perspective view illustrating the first modification of the resin-formed body for forming the ball circulation passage in the second embodiment of the present invention;

FIG. 30 shows the resin-formed body for forming the ball circulation passage as shown in FIG. 29, and more specifically, FIG. 30(a) is a cross-sectional view cut along the line a—a as indicated in FIG. 30(b), FIG. 30(b) is a front view of the resin-formed body for forming the ball circulation passage as shown in FIG. 30(a), FIG. 30(c) is a partial side view of the resin-formed body for forming the ball circulation passage, in which the resin pipe as shown in FIG. 30(a) is removed, FIG. 30(d) is a cross-sectional view of an outer peripheral side-half pipe member for forming a part of a resin pipe as shown in FIG. 30(a), FIG. 30(e) is a side view of the outer peripheral side-half pipe member as shown in FIG. 30(d), FIG. 30(f) is a cross-sectional view of an inner peripheral side-half pipe member for forming another part of the resin pipe as shown in FIG. 30(a) and FIG. 30(g) is a side view of the inner peripheral side-half pipe member as shown in FIG. 30(f);

FIG. 43 shows a resin pipe for forming a part of the resin-formed body for forming the ball circulation passage, as shown in FIG. 41, and more specifically.

DETAILED DESCRIPTION OF THE PREFERRED EMBODIMENTS

Figure 1:
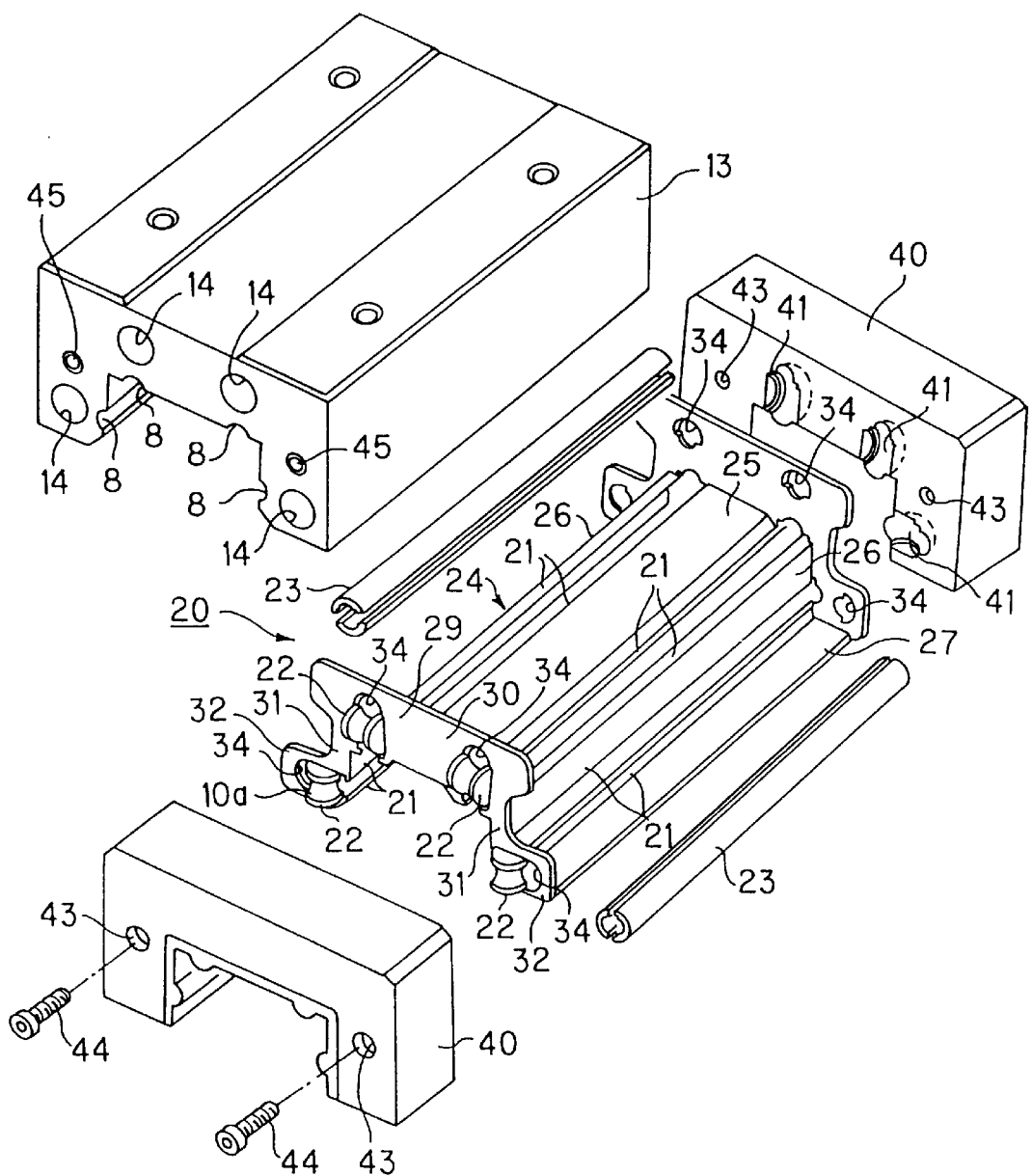
FIG. 1 is a schematic disassembling perspective view illustrating a movable block of a linear motion guiding apparatus of the first embodiment of the present invention.
Figure 2A:
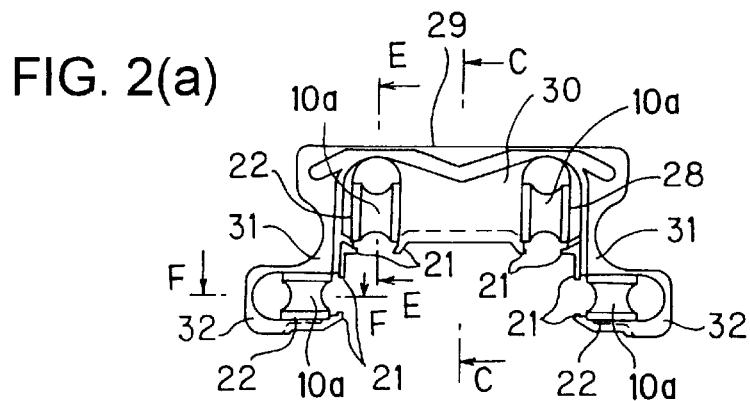
FIG. 2(a) is a front view of the resin frame member.
Figure 2B:
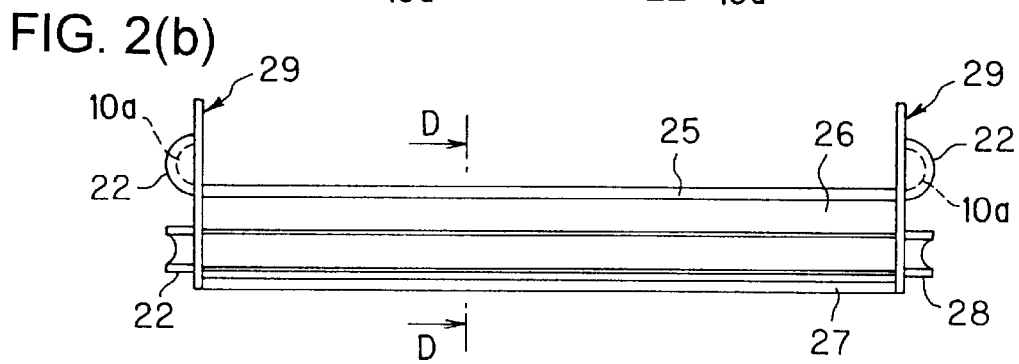
FIG. 2(b) is a side view thereof.
Figure 2C:
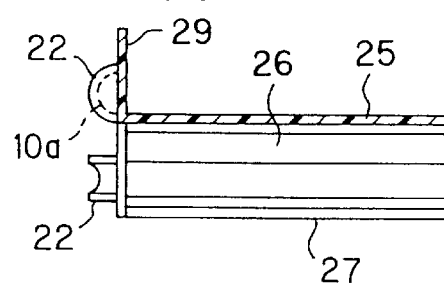
FIG. 2(c) is a cross-sectional view cut along the line C—C as indicated in FIG. 2(a)
Figure 2D:
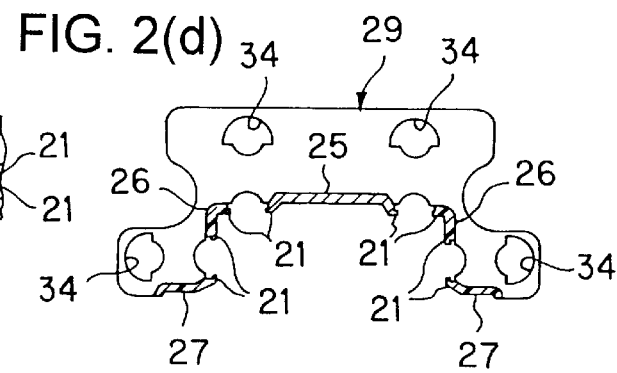
FIG. 2(d) is a cross-sectional view cut along the line D—D as indicated in FIG. 2(b)
Figure 2E:
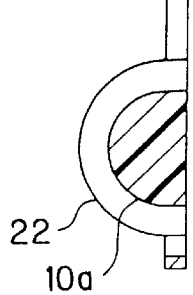
FIG. 2(e) is an enlarged cross-sectional view cut along the line E—E as indicated in FIG. 2(a) and FIG. 2(f) is an enlarged cross-sectional view cut along the line F—F as indicated in FIG. 2(a)
Figure 2F:
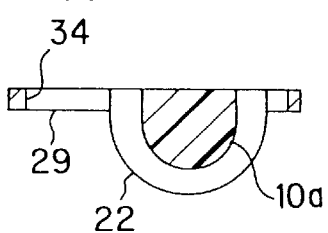

Now, embodiments of a linear motion guiding apparatus the present invention will be described in detail below with reference to the accompanying drawings.
First Embodiment FIGS. 1 to 7 show a linear motion guiding apparatus of the first embodiment of the present invention.

The linear motion guiding apparatus 1 is provided with a guide rail 2 as a guide member, which extends linearly, and a movable block 4 as a movable member, which is arranged so as to be movable along the guide rail 2 through a large number of balls 3 as rolling members.

The guide rail 2 is formed into a long bar shape having a rectangular cross-section. Two ball running grooves 5, 5 as a rolling member running track are formed on the horizontal upper surface of the guide rail 2, and a single ball running groove 5 as the rolling member running track is formed on each of the right and left-hand vertical surfaces of the guide rail 2, so as to provide a total number of grooves 5 of four.

The movable block 4 is formed as a block body having an inverse U-shaped cross-section, with its opening end being directed downwardly. The block body is provided with a horizontal portion 6, which faces the upper surface of the guide rail 2 and with a pair of wing portions 7, 7, which extend downwardly from the right and left ends of the horizontal portion 6 and face the right and left-hand side surfaces of the guide rail 2, respectively. The horizontal portion 6 has on its lower surface two ball running counter-grooves 8, 8 as a rolling member running counter-track, which correspond to the ball running grooves 5, 5 formed on the upper surface of the guide rail 2. Each of the wing portions 7, 7 has on its inner surface a single ball running counter-groove 8 as the rolling member running counter-track, which corresponds to the respective ball running grooves 5, 5 formed on the right and left-hand side surfaces of the guide rail 2.

In addition, in the movable block 4, there are formed four ball returning passages 9, 9, 9, 9 as a rolling member returning passage, which are provided in parallel with the four ball running counter-grooves 8, 8, 8, 8, respectively, as well as four pairs of direction changing passages 10, 10, 10, 10 each having a U-shape, for connecting the respective both ends of the ball running counter-grooves 8, 8, 8, 8 with the respective both ends of the ball returning passages 9, 9, 9, 9, so as to form four endless circulation passages. The ball returning passages 9, 9 respectively corresponding to the ball running grooves 5, 5 formed on the upper side of the guide rail 2 are formed in the horizontal portion 6. The other ball returning passages 9, 9 respectively corresponding to the ball running grooves 5, 5 formed on the right and left-hand vertical surfaces of the guide rail 2 are formed in the wing portions 7, 7 of the movable block 4, respectively.

In each of the four endless circulation passages in this embodiment, the balls 3 are retained in the form of train by means a ball retainer 12 as a rolling member retainer, as shown in FIG. 4 so that the balls 3 can be circulated while being guided by the ball retainer 12.

The ball retainer 12 comprises a flexible belt portion 12b, which is provided with ball holes 12a for respectively receiving the balls 3, and spacing portions 12c provided between the adjacent two balls 3, 3. The belt portion 12b has a width longer than the diameter of the ball 3 so that the both side edges of the belt portion 12b extend outwardly from the ball 3.

The spacing portion 12c is provided with a ball supporting spherical recess 12d corresponding to the spherical surface of the ball 3. The ball 3 is supported on its both sides by a pair of supporting spherical recesses 12d so as to prevent the ball 3 from coming off the belt portion 12b. In this embodiment, the one end of the belt portion 12b is not connected to the other end thereof, thus forming a strip-shaped belt having the both ends. The one end of the belt portion 12b may be connected to the other end thereof so as to form an endless belt.

The movable block 4 is composed of a block body 13 having ball running counter-grooves 8, 8, 8, 8, a resin-formed body 20 for forming ball circulation passages, which is inserted in the block body 13, and a pair of side cover plates 40, 40 secured to the both end surfaces of the block body 13, in which the resin-formed body 20 is inserted.

Each of the ball circulation passages of the resin-formed body 20 comprises a pair of ball passage forming portions 21, 21 extending along both longitudinal sides of the ball running counter-groove 8, a pair of direction changing passage-inner guide forming portions 22, 22 provided on the both side surfaces of the block body 13, and a resin pipe 23 as a returning passage forming portion, which is inserted into a through-hole formed in the block body 13. In this embodiment, the ball passage forming portions 21, 21 and the pair of direction changing passage-inner guide forming portions 22, 22 are integrally formed with each other into an integral body, and the resin pipe 23 is separately formed from the above-mentioned integral body. More specifically, there is used a construction that the ball passage forming portions 21, 21 and the pair of direction changing passage-inner guide forming portions 22, 22 are integrally connected with each other through integral forming to form an integral resin frame 24, and the four resin pipes 23 can respectively be inserted into the block body 13.

The ball passage forming portions 21, 21 are provided with guide grooves for guiding the both side edges of the belt portion 12b of the ball retainer 12 in a loaded area. The guide grooves can prevent the ball retainer 12 not only from being swung during run of the ball, but also from being sagged by engaging the side edges of the belt portion 12b with the guide groove 21a, when the movable block 4 is removed from the guide rail 2. The balls 3 are supported by the ball retainer 12. More specifically, the ball retainer 12 is supported by a jaw portion of the guide groove 21a, with the result that the balls 3 are kept in its proper position so as not to come off the movable block 4.

Figure 3A:
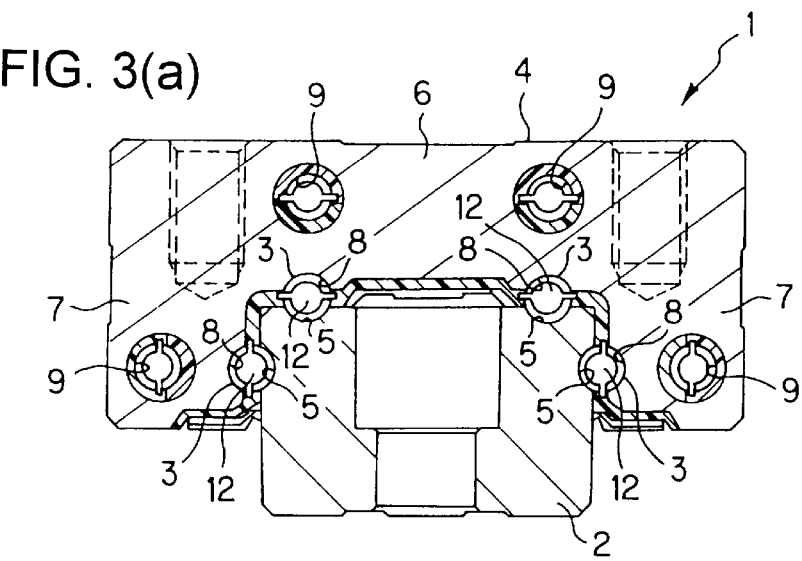
FIG. 3(a) is a front view having a cross-section, illustrating the linear motion guiding apparatus of the first embodiment of the present invention as shown in FIG. 1.
Figure 3B:
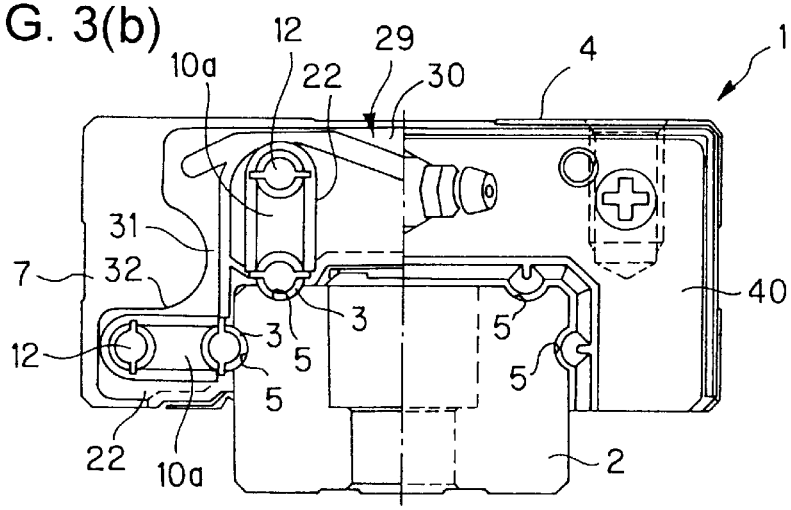
FIG. 3(b) is a front view of the apparatus as shown in FIG. 3(a), in which a half portion of a side cover plate is omitted.
Figure 3C:
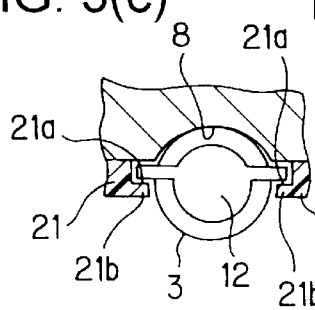
FIGS. 3(c) to (f) are partially cross-sectional views illustrating embodiments of the structure of a ball passage forming portion and the vicinity thereof, as shown in FIG. 3(a)
Figure 3D:
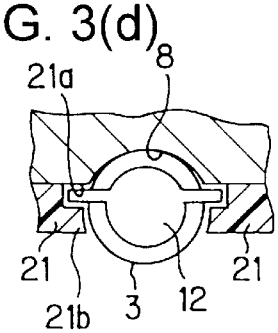
Figure 3E:
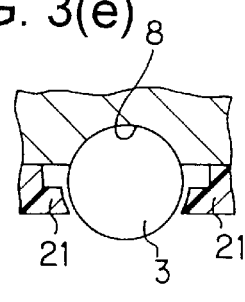

In this embodiment, a distance between the pair of ball passage forming portions 21, 21 arranged in parallel with each other on the both longitudinal sides of the ball running counter-groove 8 is slightly larger than the diameter of the ball 3. The balls 3 come off the ball running counter-groove 8, if the ball retainer 12 is not used. When an amount of projection of the jaw portion 21b is predetermined so that a distance between the pair of ball passage forming portions 21, 21 is slightly smaller than the diameter of the ball 3 as shown in FIG. 3(d), it is however possible to prevent the balls 3 from coming off the ball running counter-groove 8 even without the ball retainer 12. Such a construction can apply not only to the case where the balls 3 are inserted into the ball circulation passage with the use of the ball retainer 12, but also to the case where the balls are inserted therein without the ball retainer 12. The distance between the pair of ball passage forming portions 21, 21 may be slightly smaller than the diameter of the ball 3 so that the ball passage forming portions 21, 21 directly hold the ball 3 without the use of the ball retainer 12 as shown in FIG. 3(e).

Guide grooves 9c, 10c are also formed in the ball returning passage 9 and the direction changing passage 10 as non-loaded areas, in order to guide the side edges of the belt portion 12b. The guide grooves 9c, 10c are connected to the above-mentioned guide groove 21a in the loaded area so as to form an endless groove on the entire periphery.

Figure 3F:
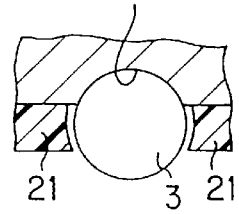
Figure 4A:
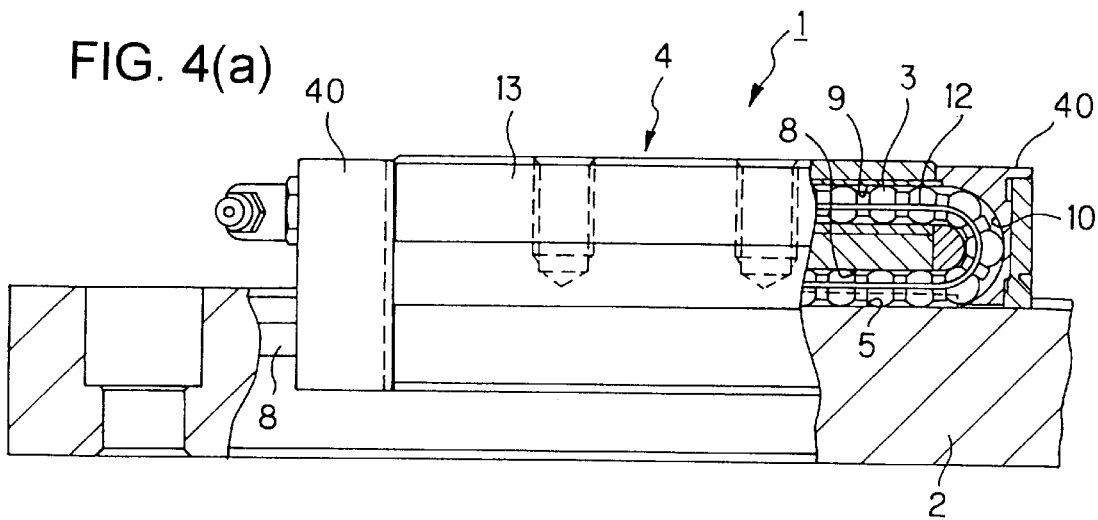
FIG. 4(a) is a side view having a partial cross section, of the linear motion guiding apparatus of the first embodiment of the present invention.
Figure 4B:
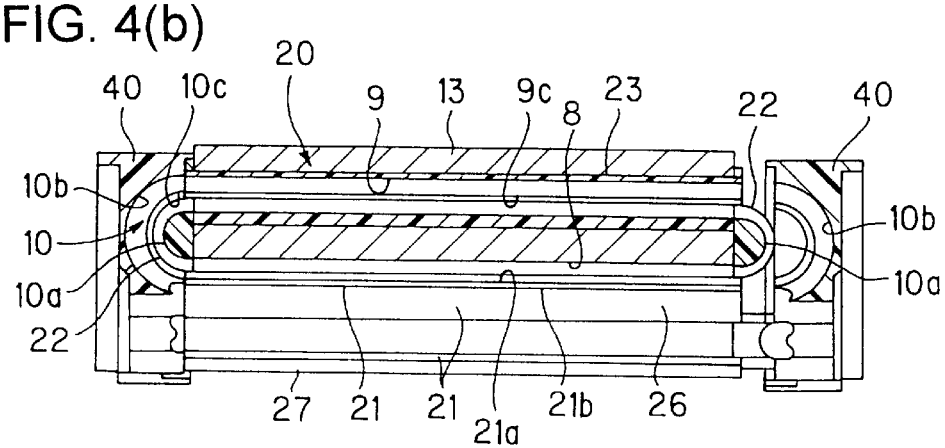
FIG. 4(b) is a cross-sectional view of a ball circulation passage of the movable block as shown in FIG. 4(A), from which a ball retainer is removed.
Figure 4C:
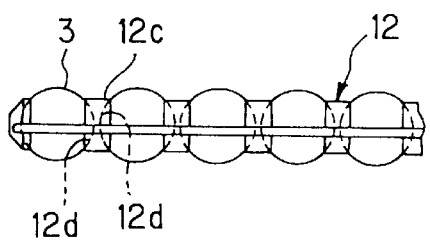
FIG. 4(c) is a partial side view of the ball retainer.
Figure 4D:
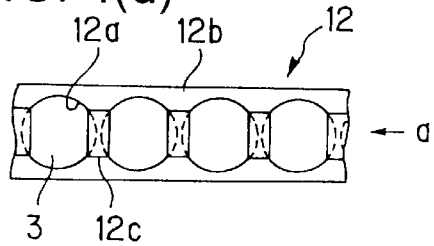
FIG. 4(d) is a plan view of the ball retainer as shown in FIG. 4(c) and FIG. 4(e) is a view of the ball retainer, with sight being placed in a direction of an arrow of "a" as indicated in FIG. 4(d)
Figure 4E:
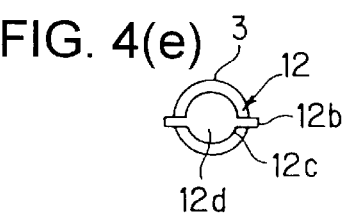

When the ball retainer 12 is not used as shown in FIG. 3(f), the distance between the pair of ball passage forming portions 21, 21 arranged on the both longitudinal sides of the ball running counter-groove 8, which portions do not have any jaw portions 21, may be slightly smaller than the diameter of the ball 3, thus preventing the balls 3 from coming off the ball running counter-groove 8.

The four sets of ball passage forming portions 21, 21 are composed of the first thin connecting plate portion 25 extending longitudinally along the under surface of the horizontal portion 6 of the block body 13, a pair of second connecting plate portions 26, 26, which have an L-shaped cross section and extend in the longitudinal direction of the block body 13 along the corner portions between the horizontal portion 6 and the wing portions 7, 7 of the block body 13, and a pair of third connecting plate portions 27, 27, which extend in the longitudinal direction of the block body 13 along the lower surfaces of the wing portions 7, 7 of the block body 13.

More specifically, the right and left-hand side edges of the first connecting plate portion 25 and the upper edges of the pair of right and left-hand second connecting plate portions 26, 26 are located at the both sides of the respective ball running counter-grooves 8, 8 provided on the under surface of the horizontal portion 6, so as to form the ball passage forming portions 21, 21; 21, 21. The lower edges of the second connecting plate portions 26, 26 and the inner edges of the third connecting plate portions 27, 27 are located at the both sides of the respective ball running counter-grooves 8, 8 provided on the respective inner surface of the wing portions 7, 7, so as to form the other ball passage forming portions 21, 21; 21, 21.

The direction changing passage-inner guide forming portion 22 has a thin sheet portion 29, which is to be connected to the end surface of the block body 13. The ball passage forming portions 21, 21 and the resin pipe 23 are connected through the above-mentioned thin sheet portion 29. In this embodiment, the direction changing passage-inner guide forming portions 22, 22 and the ball passage forming portions 21, 21 are connected by means of the thin sheet portion 29 through integral forming. The resin pipe 23 is inserted in a hole 34 formed on the thin sheet portion 29 so as to make a faucet joint, and fixed to the thin sheet portion 29.

The thin sheet portion 29 has the first end plate portion 30 corresponding to the end surface of the horizontal portion 6 of the block body 13, a pair of third end plate portions 32, 32 corresponding to the end surfaces of the wing portions 7, 7 and the second end plate portions 31, 31 for connecting the first end plate portion 30 and the respective third end plate portions 32, 32. The first end plate portion 30 has the direction changing passage-inner guide forming portions 22, 22, which are formed so as to project corresponding to the two trains of balls 3, 3 on the upper surface side of the guide rail 2. Each of the third end plate portions 32, 32 has the direction changing passage-inner guide forming portion 22, which is formed so as to project corresponding to the single train of balls 3 on the side surface of the guide rail 2.

The first end plate portions 30, 30, which are to be placed respectively on the both ends of the block body 13 are connected at its lower portion with the both ends of the first connecting plate portion 25 extending longitudinally between the first end plate portions 30, 30. The second end plate portions 31, 31, which are to be placed respectively on the both ends of the block body 13 are connected at its inner edge portion with the both ends of the second connecting plate portion 26 extending longitudinally between the second end plate portions 31, 31. The other second end plate portions 31, 31 have the same connecting structure. The third end plate portions 32, 32, which are to be placed respectively on the both ends of the block body 13 are connected at its inner edge portion with the both ends of the third connecting plate portion 27 extending longitudinally between the third end plate portions 32, 32. The other third end plate portions 32, 32 have the same connecting structure. A single resin frame 24 is formed in this way.

Each of the direction changing passage-inner guide forming portions 22 has a semi-cylindrical shape. On the outer periphery of the direction changing passage-inner guide forming portion 22, there is formed an inner guide groove 10a having a semi-circular cross section so as to form the inner guide portion for the direction changing passage 10. The one end of the inner guide groove 10a is connected to the end of the ball running counter-groove 8. Accordingly, the one end of the inner guide groove 10a has the same cross-sectional shape as the ball running counter-groove 8 so as to make an alignment of the one end of the inner guide groove 10a with the end of the ball running counter-groove 8. The other end of the inner guide groove 10a of the direction changing passage 10 is connected to the end of the ball returning passage 9. Accordingly, the other end of the inner guide groove 10a has the same cross-sectional shape as the ball returning passage 9 so as to make an alignment of the other end of the inner guide groove 10a with the end of the ball returning passage 9.

Cylindrical flange portions 33, 33 are formed on the both ends of the inner guide groove 10a. The distance between the respective outer surfaces of the cylindrical flange portions 33, 33 is larger than the width of the belt portion 12b. The cylindrical flange portions 33, 33 form a retainer-guide groove 10c for the ball retainer 12 in cooperation with a semi-circular recess portion having cutouts, which is formed on the inner periphery of the recess of the side cover plate 40 described later.

The both ends of the inner guide groove 10a for the direction changing passage 10 extend to the contacting surface of the first and third end plate portions 30, 32 with the end surface of the block body 13 so as to be connected to the respective ends of the ball running counter-groove 8 and the ball returning passage 9. Pipe inserting holes 34, 34, 34, 34 having a semi-circular shape, in which the ends of the resin pipes 23 are to be inserted are formed on the first and third end plate portions 30, 32.

As shown in FIG. 7, the resin pipe 23 is composed of an inner peripheral side-half pipe member 23a located in the inner peripheral side of the ball circulation passage, which is continuously connected to the inner guide groove 10a for the direction changing passage, and an outer peripheral side-half pipe member 23b located in the outer peripheral side of the ball circulation passage, which is continuously connected to an outer guide groove 10b for the direction changing passage 10, which is formed on the side cover plate 40. The inner peripheral side-half pipe member 23a has a groove portion 9a having a semi-circular cross section, and side edge portions 23c extending longitudinally along the groove portion 9a.

The outer peripheral side-half pipe member 23b is formed into a linear member having the same circular cross section as the outer guide groove 10b for the direction changing passage, which is formed on the side cover plate 40. The outer peripheral side-half pipe member 23b has a groove portion 9b, which is continuously connected to the outer guide groove 10b, and side edge portions 23d extending longitudinally along the groove portion 9b. The side edge portions 23d is provided on its outer edges with projections 23e, which are to be brought into contact with the outer edges of the side edge portions 23c of the inner peripheral side-half pipe member 23a to form the retainer-guide groove 9c for the ball retainer 12.

The inner peripheral side-half pipe member 23a of the resin pipe 23 has the same length of the block body 13. The inner peripheral side-half pipe member 23a is positioned so as to be brought into contact with the back surface of the direction changing passage-inner guide forming portion 22.

The outer peripheral side-half pipe member 23b of the resin pipe 23 has on the other hand a longer length than the block body 13 by a length corresponding to the thickness of the thin sheet portion 29. The outer peripheral side-half pipe members 23b are inserted in the inserting holes 34 of the first and third end plate portions 30, 32. Longitudinal positional determination of the outer peripheral side-half pipe member 23b is made by bringing the both ends of the outer peripheral side-half pipe member 23b inserted in the inserting holes 34 into contact with the peripheral edge of the end portion of the outer guide grooves 10b for the direction changing passage, which are formed on the side cover plate 40. The projections 23e formed on the both side edges of the outer peripheral side-half pipe member 23b come into contact with the outer edges of the cylindrical flange portions 33 formed on the direction changing passage-inner guide forming portion 22 to form a part of the guide groove 10c, and the outer peripheral side-half pipe member 23b and the inner peripheral side-half pipe member 23a are restricted to be turned in the inserting hole 14.

The resin pipes 23 and the direction changing passage-inner guide forming portions 22 are accurately positioned through the inserting holes 34 formed on the first and third end plate portions 30, 32 of the thin sheet portion 29 and a proper assembling is carried out in this manner.

Figure 5A:
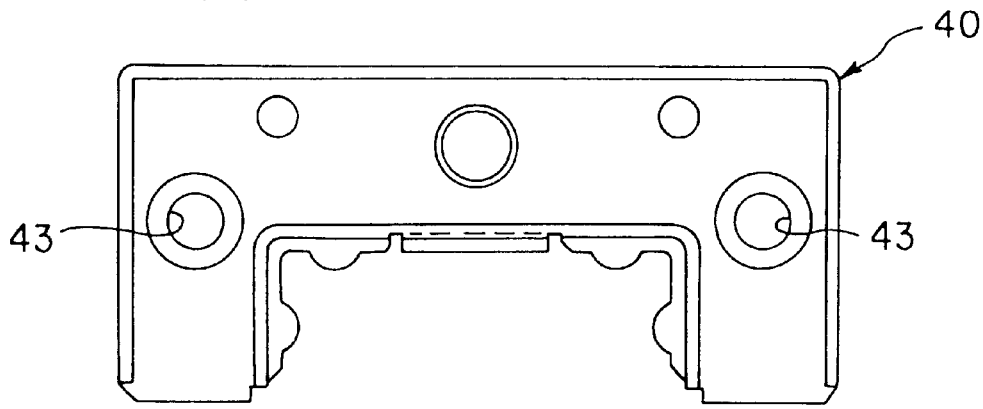
FIG. 5(a) is a front view of the side cover plate.
Figure 5B:
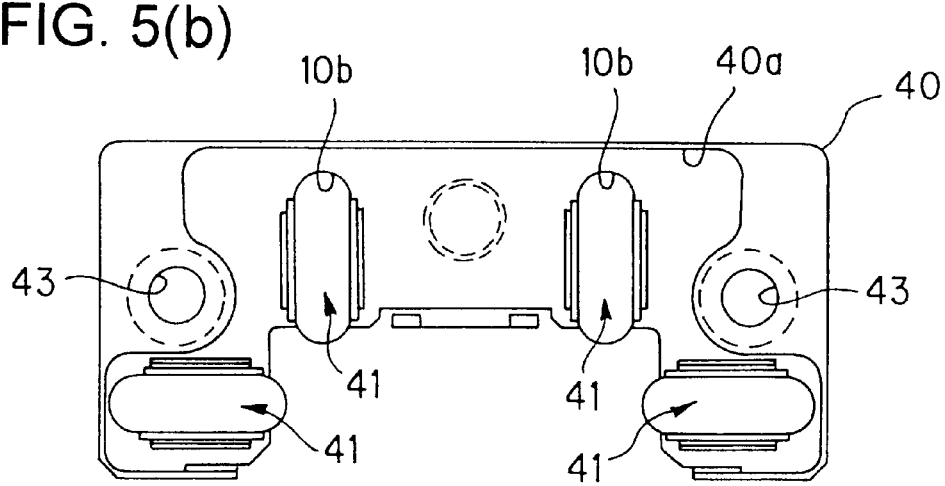
FIG. 5(b) is a back view thereof.
Figure 5C:
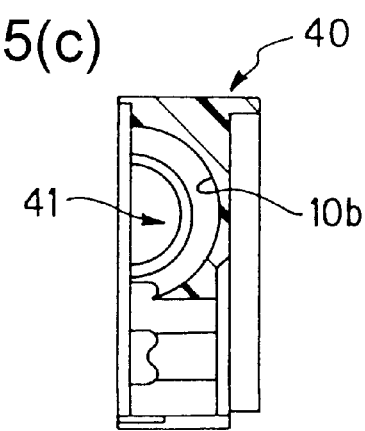
FIG. 5(c) is a transverse sectional view thereof at its central portion.

As shown in FIG. 5, the side cover plate 40 is provided with an inserting recess portion 40a, in which the thin sheet portion 29 is inserted, four recess portions 41 having the outer guide grooves 10b for the direction changing passage, into which portions the direction changing passage-inner guide forming portions 22 are fitted, and screw-fixing portions for securing the side cover plate 40 to the block body 13. In the screw-fixing portions, the side cover plate 40 is fixed to the block body 13 by inserting bolts 44 into holes 43 formed on the side cover plate 40 and engaging the bolts with screwed holes 45 formed on the end surface of the block body 13. The holes 43 are located between the first and third end plate portions 30, 32 of the thin sheet portion 29.

As shown in FIG. 7, the outer guide groove 10b for the direction changing passage in the recess portion 41 has on its side edges larger-diameter arcuate recesses 46, which form the retainer-guide groove 10c in cooperation with the cylindrical flange portions 33 of the direction changing passage-inner guide forming portions 22, and a smaller-diameter arcuate recesses 47, in which the cylindrical flange portions 33 are inserted. The direction changing passage-inner guide forming portion 22 provided with the inner guide groove 10a for the direction changing passage is fitted into the recess portion 41 of the side cover plate 40, and the thin sheet portion 29 is received in the inserting recess portion 40a of the side cover plate 40. The thin sheet portion 29 is held between the side cover plate 40 and the end surface of the block body 13 through a clamping force so as to be firmly fixed therebetween.

The direction changing passage-inner guide forming portions 22 and the ball passage forming portion 21 are connected through the thin sheet portion 29, thus making it possible to maintain an accurate positional relationship of the end of the inner guide groove 10a for the direction changing passage formed in the direction changing passage-inner guide forming portion 22 relative to the ball passage forming portions 21, 21, as well as an accurate positional relationship of the inner guide groove 10a for the direction changing passage relative to the ball returning passage 9.

The thin sheet portion 29 located in the vicinity of the direction changing passage-inner guide forming portion 22 is uniformly urged against the flat end surface of the block body 13 through a clamping force applied to the side cover plate 40 (see FIG. 7). Even when the direction changing passage-inner guide forming portion 22 is not located in a correct position, the thin sheet portion 29 changes its shape on the end surface of the block body 13, thus permitting the correct positioning of the direction changing passage-inner guide forming portion 22. The thin sheet portion 29 is firmly clamped and fixed through a clamping force, which is applied to the side cover plate 40, and frictional force caused by such a clamping step may prevent an unfavorable movement of the inner guide groove 10a for the direction changing passage.

The side cover plate 40 is secured to the block body 13 so that the direction changing passage-inner guide forming portion 22 assembled to the block body 13 is fitted into the recess portion 41 of the side cover plate 40. Such a fitting step permits to make an accurate positioning of the side cover plate 40 relative to the block body 13.

FIG. 6 shows assembling steps for the above-described resin-formed body for forming the ball circulation passage.

First, the inner peripheral side-half pipe member 23a of the resin pipe 23 is inserted in the through-hole 14 of the block body 13 (see FIGS. 6(a) and 6(b)).

Then, the resin frame 24 obtained by integral forming is inserted in the recess of the block body 13, while causing the thin sheet portions 29 at the both ends of the resin frame 24 to slide on the respective end surfaces of the block body 13 (see FIGS. 6(c) and 6(d)). The first connecting plate portion 25 of the resin frame 24 comes into contact with the under surface of the horizontal portion 6, thus making positional determination in the vertical direction of the resin frame 24. The second connecting plate portion 26 and the third connecting plate portion 27 of the resin frame 24 come into contact with the respective inner surfaces of the wing portions 7, 7 of the block body 13, thus making positional determination of the ball passage forming portions 21, 21 and the direction changing passage-inner guide forming portion 22 (see FIGS. 6(*e*) and 6(*f*)). At this time, the inserting hole 34 of the thin sheet portion 29 is aligned with the through-hole 14 of the block body 13.

Then, the outer peripheral side-half pipe member 23*b* is inserted in the through-hole 14 from the inserting hole 34, thus completing the assembling step of the resin-formed body 20 for forming the ball circulation passage (see FIGS. 6(*g*) and 6(*h*)).

Then, the one side cover plate 40 is secured to the one end surface of the block body 13 by a clamping step, the ball retainer 12 holding the balls is inserted, and the other side cover plate 40 is secured to the other end surface of the block body 13 by the same clamping step, thus completing the assembling step of the movable block 4.

According to the present invention, the resin-formed body 20 for forming the ball circulation passage is separately formed from the block body 13. Even when the movable block 4 has a larger size, there is no restriction of flow of molten resin by the block body 13, unlike the case where the block body 13 is integrally formed with the resin-formed body 20. Increase in number of gates formed on a die may ensure proper run of the molten resin, thus improving the formability. Especially, the ball passage forming portions 21, 21 located at the opposite longitudinal sides of the ball running groove 8 are thin, with the result that molten resin may not reach every part of the space for forming the ball passage forming portions 21, 21. It is therefore effective to form the resin-formed body 20 separately from the block body 13 in accordance with the embodiment of the present invention.

The continuous circulation passage is formed by the resin-formed body 20, and it is therefore possible to make positional determination of the inner guide groove 10*a* for the direction changing passage relative to the ball passage forming portions 21, 21, as well as positional determination of the inner guide groove 10*a* for the direction changing passage relative to the ball returning passage 9, thus ensuring continuity of the circulation passage so as to make smooth circulation of the balls 3.

When the proper positional relationship of the inner guide groove 10*a* for the direction changing passage relative to the ball passage forming portions 21, 21, is maintained, the ball passage forming portions 21, 21 are located at the longitudinal both sides of the ball running groove 8 so as to be aligned with the ends of the inner guide groove 10*a* for the direction changing passage.

When the proper positional relationship of the inner guide groove 10*a* for the direction changing passage relative to the ball returning passage 9 is maintained, the inner guide groove 10*a* for the direction changing passage can be aligned with the inner groove 23*a* of the ball returning passage 9.

The connecting portion of the ball passage forming portions 21, 21 and the direction changing passage-inner guide forming portion 22 is obtained by integral forming, thus permitting omission of an assembling step of the connecting portion. Although the running direction of the balls 3 is changed in such a connecting portion, the above-mentioned integral structure may ensure continuity of the circulation passage, without being affected by assembling accuracy. It is therefore possible to make smooth run of the balls 3 from the ball running passage between the ball running groove 5 and the ball running counter-groove 8 to the direction changing passage 10, as well as from the direction changing passage 10 to the ball returning passage 9.

Description will be given of modifications of the resin-formed body 20 for forming the ball circulation passage, which is divided into parts. In the description of the modifications, modified features will only be explained in comparison with the first embodiment of the present invention. The same reference numerals will be given to the same components as those in the first embodiment of the present invention, and description thereof will be omitted.

First Modification

Figure 8:
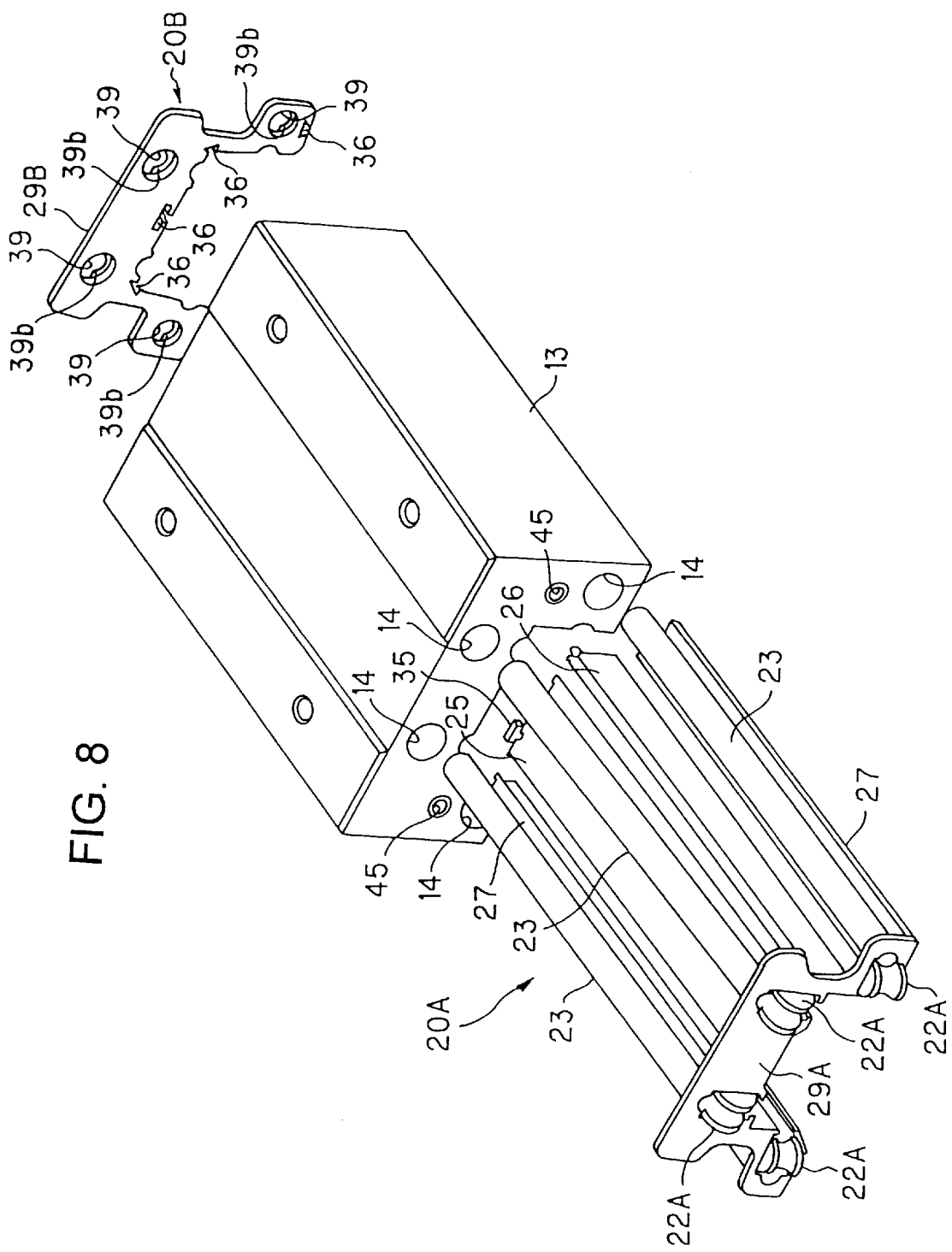
FIG. 8 is a schematic disassembling perspective view illustrating the first modification of the resin-formed body for forming the ball circulation passage in the first embodiment of the present invention.

FIGS. 8 and 9 show the first modification of the resin-formed body 20 for forming the ball circulation passage, which is described in the first embodiment.

In the first modification, the resin-formed body 20 for forming the ball circulation passage is composed of the first resin-formed frame 20A, which is obtained by integrally connecting both of the ball passage forming portions 21, 21 and the resin pipes 23 at their ends with the direction changing passage-inner guide forming portions 22A for one side, and the second resin-formed frame 20B, which is provided with the direction changing passage-inner guide forming portions 22B for the other side and separately formed from the first resin-formed frame 20A.

In this case, the ball passage forming portions 21, 21 are integrally connected with the direction changing passage-inner guide forming portions 22A through the thin sheet portion 29A as in the first embodiment.

The direction changing passage-inner guide forming portions 22A are also integrally connected with the resin pipes 23 through the thin sheet portion 29A. In this case, the resin pipe 23 is formed into a tubular integral body, although the half pipe members are used in the first embodiment. Accordingly, there exists no inserting hole 34 in the thin sheet portion 29A, and the ball returning passage 9 is exposed on the thin sheet portion 29A.

The first resin-formed frame 20A and the second resin-formed frame 20B are connected, as shown in FIG. 9, by means of a joint method using the combination of a recess and a projection to be inserted therein, such as a faucet joint method. In the illustrated example, a recess portion 36 of a dove-tail groove is formed in the second resin-formed frame 20B, and an engaging projection 35 to be engaged with the recess portion 36 is formed, on the other hand, in the ball passage forming portions 21, 21.

In this case, the resin pipe 23 of the first resin-formed frame 20A is inserted in the through-hole 14 of the block body 13, and the first, second and third connecting plate portions 25, 26, 27 are inserted along the under surface of the horizontal portion 6 of the block body 13 and the inner surfaces of the wing portions 7,7.

Then, the engaging projections 35 formed at the respective free end portions of the first, second and third connecting plate portions 25, 26, 27 are engaged with the recess portions 36 formed on the thin sheet portion 29B of the second resin-formed frame 24B, which is arranged on the other end surface of the block body 13.

The recess portions 36 may be formed on the first resin-formed frame 20A and the engaging projections 35 may be formed on the second resin-formed frame 20B. The connecting method is not limited to the method described above, and there may be used any conventional connecting method, in which the ends of the divided parts can be maintained in a proper connecting position and connected.

Second Modification

Figure 10:
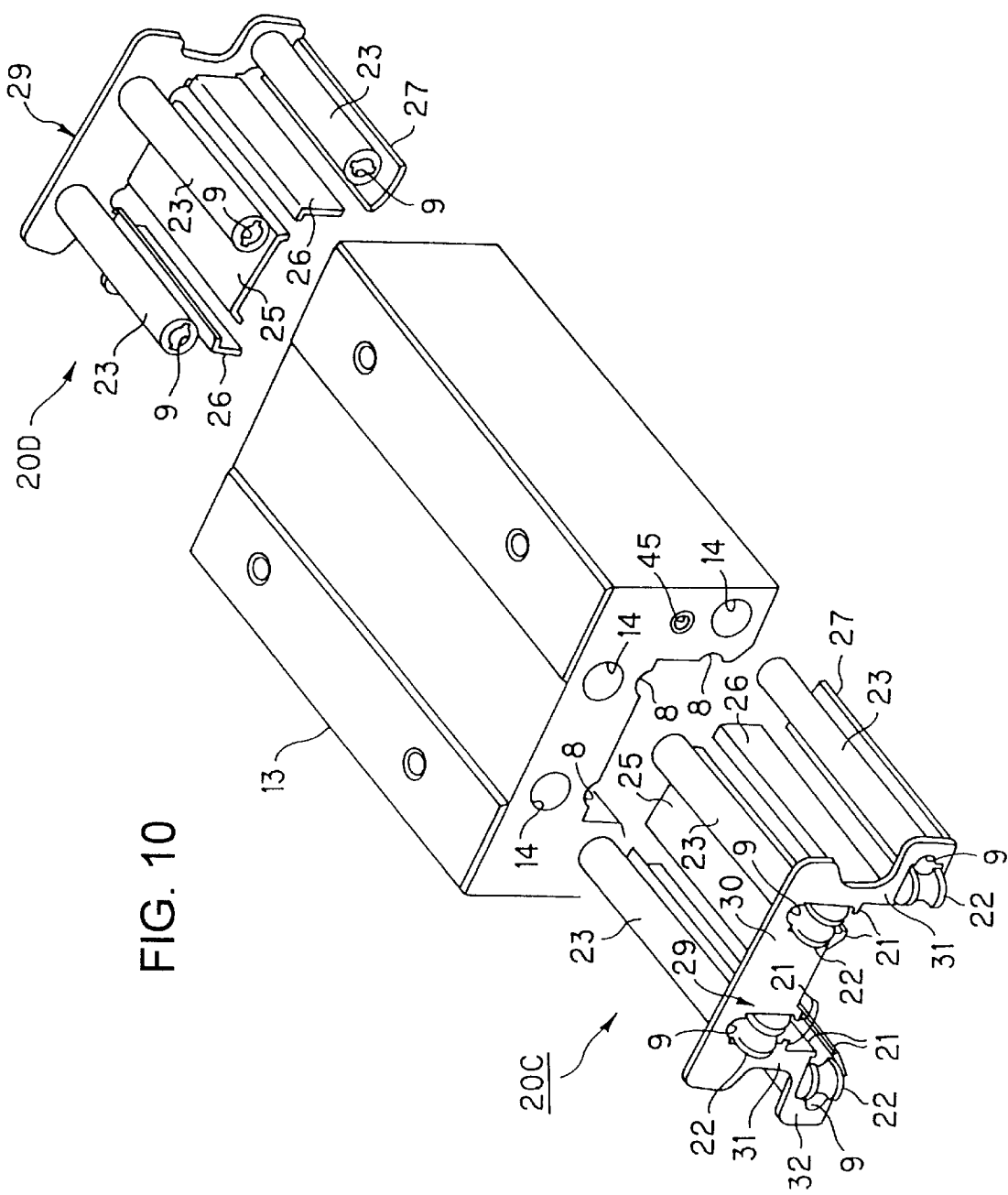
FIG. 10 is a schematic disassembling perspective view illustrating the second modification of the resin-formed body for forming the ball circulation passage in the first embodiment of the present invention.

FIGS. 10 and 11 show the second modification of the resin-formed body 20 for forming the ball circulation passage, which is described in the first embodiment.

In the second modification, the resin-formed body 20 for forming the ball circulation passage, which has been obtained by integrally forming both of the ball passage forming portions 21, 21 and the resin pipes 23 as a returning passage forming portion with a pair of direction changing passage-inner guide forming portions 22, 22, is divided at the middle portion of each of the ball passage forming portions 21, 21 and the resin pipes 23 into two parts. More specifically, the ball passage forming portions 21, 21 and the resin pipes 23 are divided at their middle portion into the respective two half parts, and each of the thus divided two half parts is integrally formed with the direction changing passage-inner guide forming portions 22, 22, thus forming two resin-formed frames 20C, 20D having substantially the same shape.

Four sets of the ball passage forming portions 21, 21 are formed on the first, second and third connecting plate portions 25, 26, 27. Recess portions 38 and engaging projections 37 to be inserted therein are formed on the divided ends of the first, second and third connecting plate portions 25, 26, 27 and the divided ends of the resin pipes 23.

Third Modification

Figure 13A:
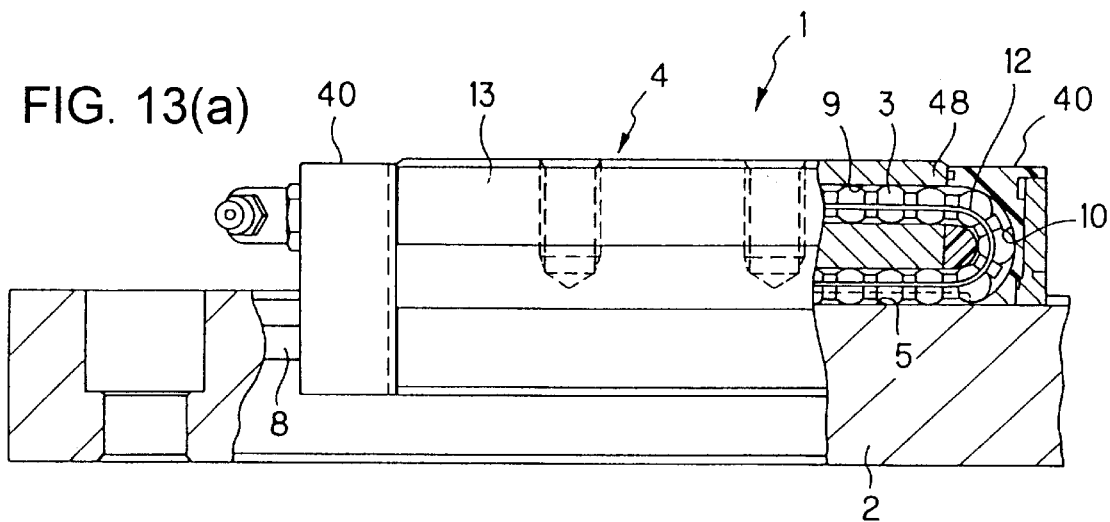
FIG. 13(a) is a side view having a partial cross section, illustrating the linear motion guiding apparatus, in which the movable block as shown in FIG. 12 is used.
Figure 13B:
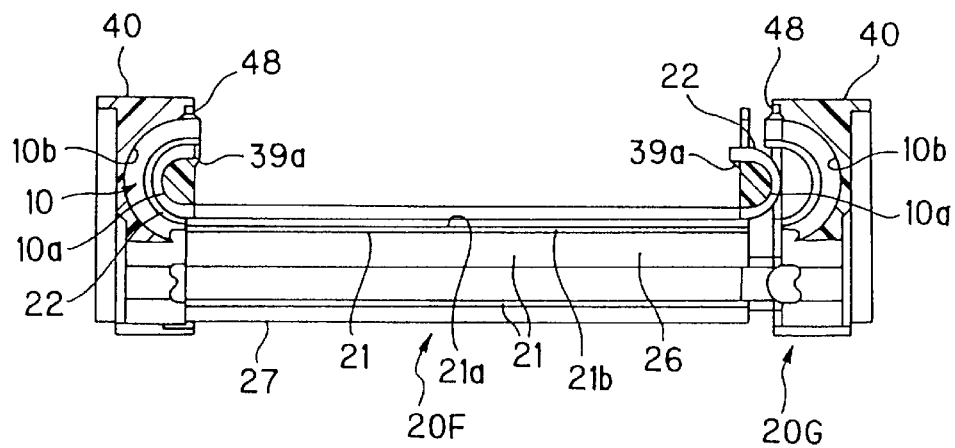
FIG. 13(b) is a cross-sectional view of the resin-formed body for forming the ball circulation passage as shown in FIG. 13(a)

FIGS. 12 to 14 show the third modification of the resin-formed body 20 for forming the ball circulation passage, which is described in the first embodiment.

In the third modification, there is not used the resin pipe 23 as a returning passage forming portion described in the first embodiment, and a resin-formed frame 20E is obtained by integrally forming the first, second and third connecting plate portions 25, 26, 27 having the ball passage forming portions 21, 21 with the thin sheet portions 29, 29 each having the pair of direction changing passage-inner guide forming portions 22, 22. The ball returning passage 9 is composed as a through-hole formed in the block body 13.

In this case, an engaging projection 39a, which is engageable with a tapered portion 15 formed in the opening end of the ball returning passage 9 may be formed in the opening end of the ball hole 39 of the thin sheet portion 29. Such a construction permits to make a proper connection of the end of the ball returning passage 9 and the direction changing passage-inner guide forming portion 22.

In the illustrated example, an arcuate engaging projection 48 is additionally formed on the connection portion of the outer guide groove 10b for the direction changing passage with the ball returning passage 9. The engaging projection 48 can be fitted into the ball hole 39 of the thin sheet portion 29 and engaged with the tapered portion 15 of the opening end of the ball returning passage 9.

Fourth Modification

Figure 15:
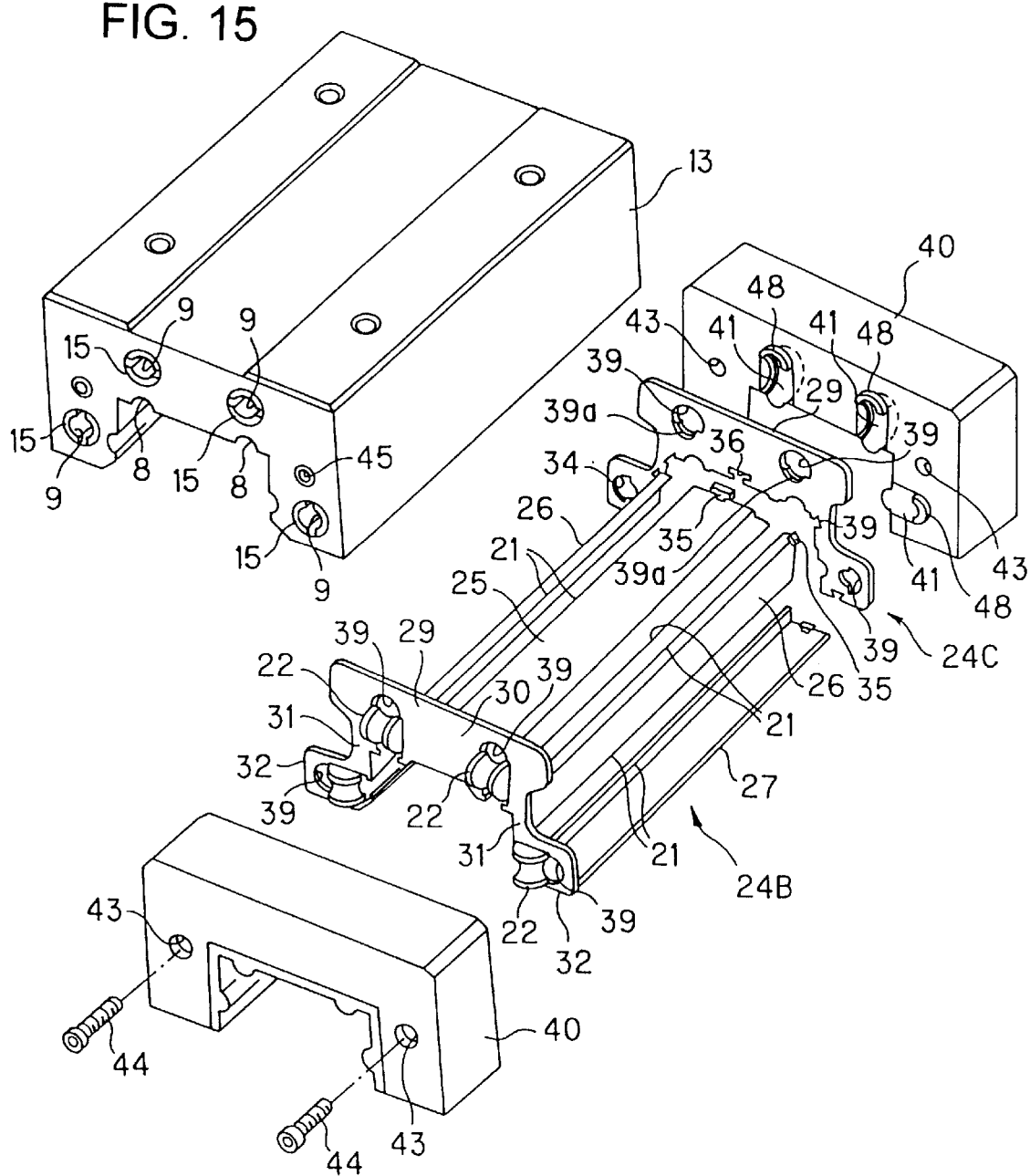
FIG. 15 is a schematic disassembling perspective view illustrating the fourth modification of the resin-formed body for forming the ball circulation passage in the first embodiment of the present invention.

FIG. 15 shows the fourth modification of the resin-formed body 20 for forming the ball circulation passage, which is described in the first embodiment.

In the fourth modification, there is not used the resin pipe 23 described in the third modification, a resin-formed frame 24B is obtained by integrally forming the ball passage forming portions 21 with the direction changing passage-inner guide forming portions 22 for the one side, the other resin-formed frame 24C provided with the direction changing passage-inner guide forming portions 22 for the other side is separately formed from the above-mentioned resin-formed frame 24B, and the resin-formed frames 24B, 24C are connected with each other by engagement of the engaging projection 35 with the recess 36. The structure other than the above-mentioned construction is the same as that of the third modification.

Modifications of the Ball Train

In the first embodiment and the first to fourth modifications, there is described that two trains of the balls are provided on the upper surface of the guide rail 2 and the single train of the balls is provided on each of the side surfaces of the guide rail 2, so as to provide the total number of trains of four. In the present invention, the other type of ball trains can however be applied as shown in FIG. 16. With respect to the division of the resin-formed body 20 for forming the ball circulation passage, all the modifications as shown in FIG. 16 are based on the divisional pattern of the first embodiment. All the divisional patterns of the first to fourth modifications may however be applied to the modifications of the ball train as shown in FIG. 16.

Figure 16A:
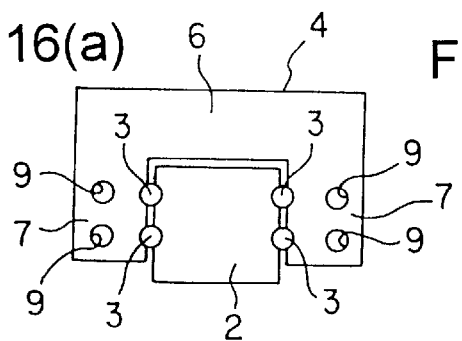
FIGS. 16(a) to 16(h) are descriptive views illustrating the other embodiments of arrangement of the trains of balls in the linear motion guiding apparatus of the first embodiment of the present invention.
Figure 16B:
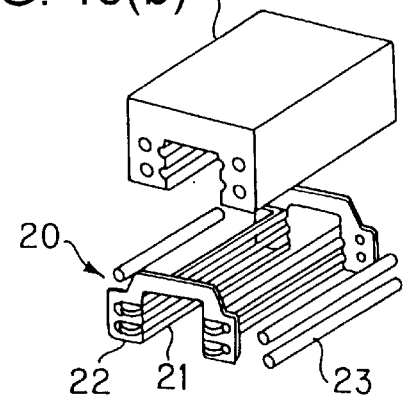

In the example as shown in FIGS. 16(a) and 16(b), two lower and upper trains of the balls as rolling members are provided on each of the gaps between the right and left-hand side surfaces of the guide rail 2 and the inner surfaces of the right and left-hand wing portions 7, 7 of the movable block 13, so as to provide the total number of trains of four.

Figure 18:
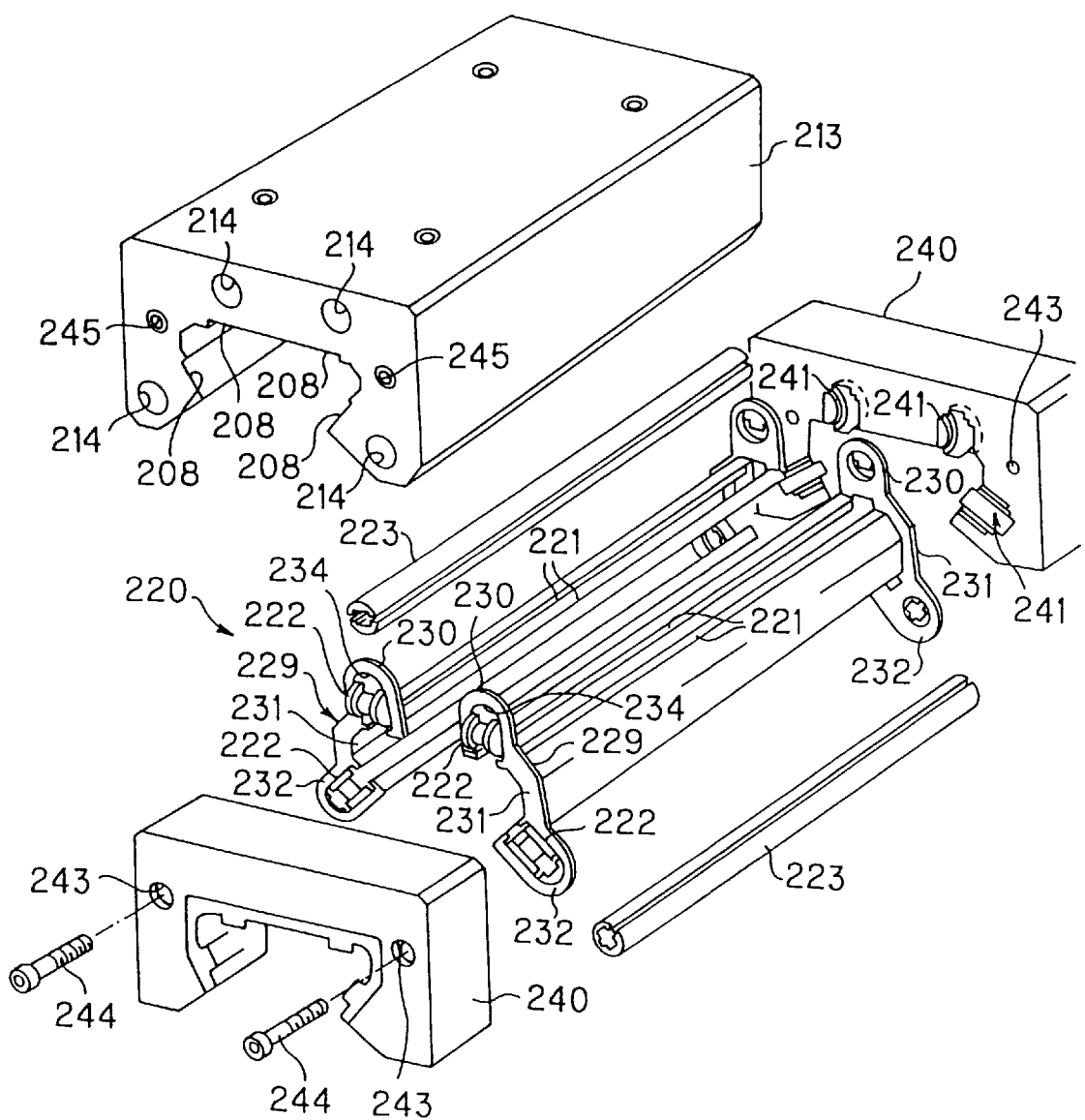
FIG. 18 is a schematic disassembling perspective view illustrating a movable block of a linear motion guiding apparatus of the second embodiment of the present invention.

FIG. 16(b) shows the resin-formed body 20 in which all the ball passage forming portions for the four trains of the balls are integrally formed with each other. The resin-formed body 20 may however be divided into two resin-formed bodies 20, 20, which correspond to two trains of the balls for each of the right and left-hand sides of the guide rail 2, as shown in FIG. 18.

Figure 16C:
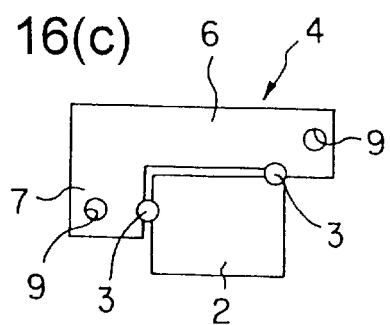
Figure 16D:
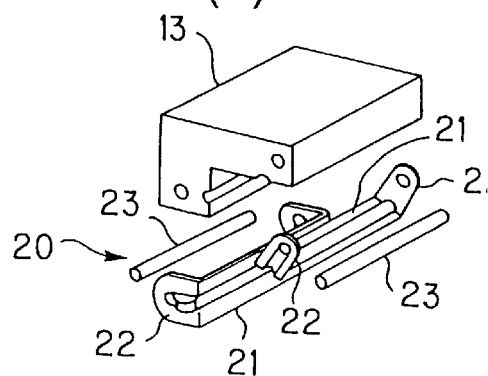

In the example as shown in FIGS. 16(c) and 16(d), the movable block 4 is provided with the horizontal portion 6 facing the upper surface of the guide rail 2 and a single wing portion 7 facing the one side surface of the guide rail 2. The single train of the balls 3 as rolling members is provided between the one side surface of the guide rail 2 and the single wing portion 7 of the movable block 4, and the other single train of the balls 3 is provided between the upper surface of the guide rail 2 and the lower surface of the horizontal portion in the vicinity of the corner of the guide rail 2, so as to provide the total number of trains of two.

Figure 16E:
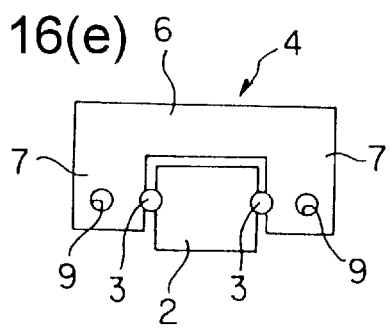
Figure 16F:
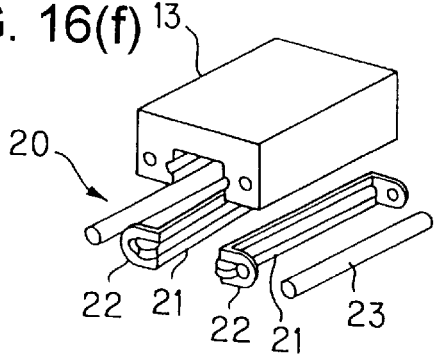

In the example as shown in FIGS. 16(e) and 16(f), the movable block 4 is provided with a pair of wing portions 7, 7 between which the guide rail 2 is held at its right and left-hand surfaces. The single train of the balls 3 is provided in each of the gaps between the right and left-hand surfaces of the guide rail 2 and the inner surfaces of the right and left-hand wing portions 7, 7 of the movable block 4, so as to provide the total number of trains of two.

Figure 16G:
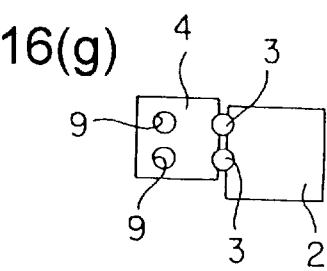
Figure 16H:
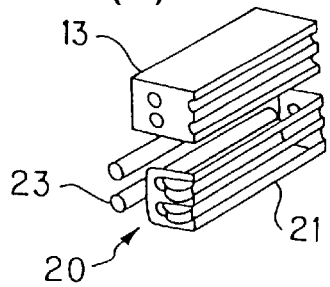
Figure 17:
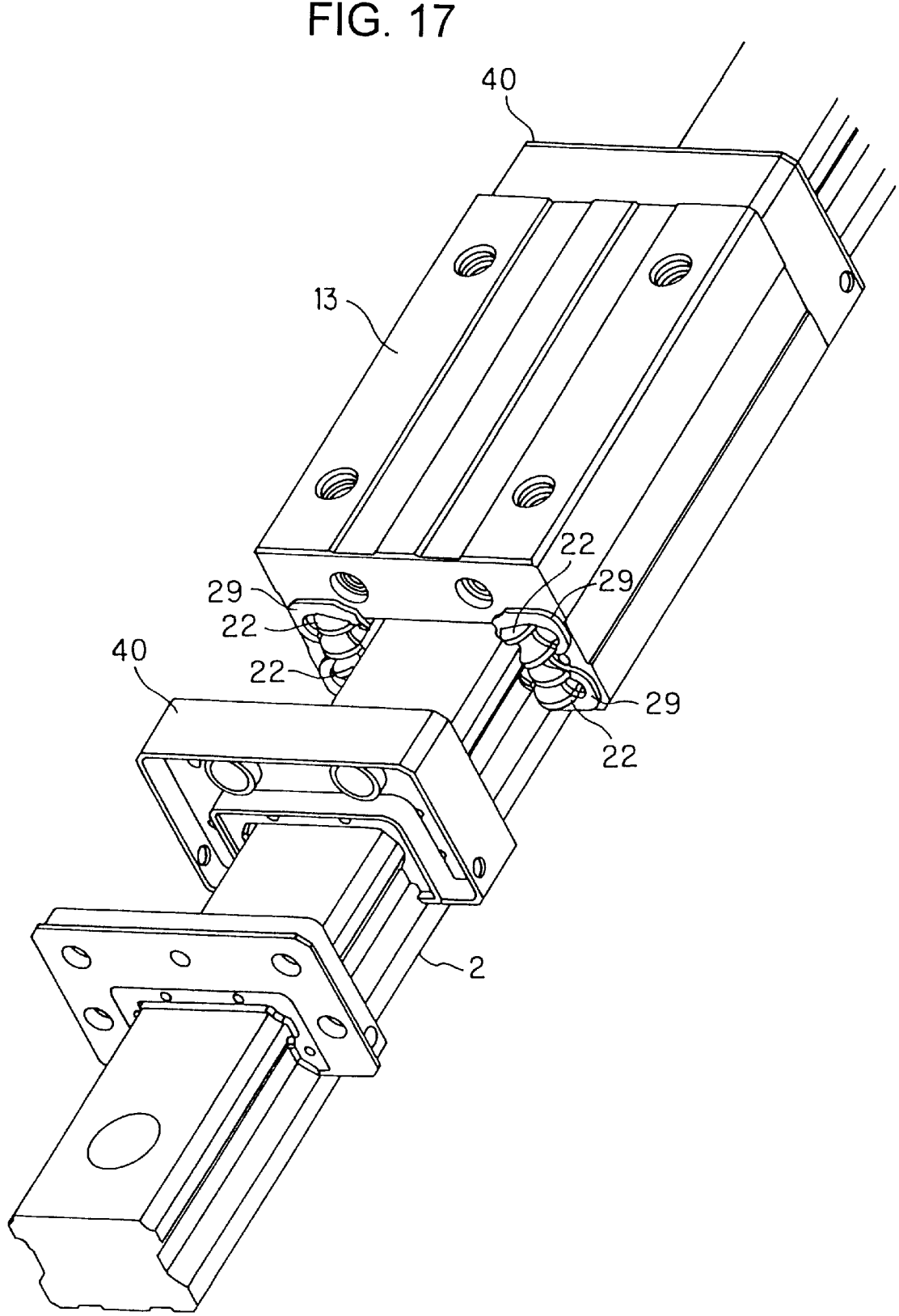
FIG. 17 is a perspective view illustrating the constructional elements other than the resin-formed body for forming the ball circulation passage of the linear motion guiding apparatus as shown in FIG. 16(a), which is provided with two trains of balls at each of the both sides.

In the example as shown in FIGS. 16(g) and 16(h), the movable block 4 is arranged along the one side surface of the guide rail 2. Two upper and lower trains of the balls 3 are provided between the one side surface of the guide rail 2 and the movable block 4.

Second Embodiment

FIGS. 18 to 20 show a linear motion guiding apparatus of the second embodiment of the present invention.

In the second embodiment, rollers are used as rolling members. More specifically, the linear motion guiding apparatus comprises a guide rail 202 as a guide member, extending linearly, and a movable block 204 arranged so as to be movable along the guide rail 202 through a large number of rollers 203 as rolling members.

The guide rail 202 is formed into a long bar shape having a rectangular cross-section. Two roller running surfaces 205, 205 as a rolling member running track are formed on the horizontal upper surface of the guide rail 2, and a single roller running surface 205 as the rolling member running track is formed on each of the right and left-hand vertical surfaces of the guide rail 2, so as to provide a total number of surfaces 5 of four.

The movable block 204 is formed as a block body having an inverse U-shaped cross-section, with its opening end being directed downwardly. The block body is provided with a horizontal portion 206, which faces the upper surface of the guide rail 202 and with a pair of wing portions 207, 207, which extend downwardly from the right and left ends of the horizontal portion 206 and face the right and left-hand side surfaces of the guide rail 202, respectively. The horizontal portion 206 has on its lower surface two roller running counter-surfaces 208, 208 as a rolling member running counter-track, which correspond to the roller running surfaces 205, 205 formed on the upper surface of the guide rail 202. Each of the wing portions 207, 207 has on its inner surface a single roller running counter-surface 208 as the rolling member running counter-track, which corresponds to the respective roller running surfaces 205, 205 formed on the right and left-hand side surfaces of the guide rail 202.

In addition, in the movable block 204, there are formed four roller returning passages 209, 209, 209, 209 as a rolling member returning passage, which are provided in parallel with the four roller running counter-surfaces 208, 208, 208, 208, respectively, as well as four pairs of direction changing passages 210, 210, 210, 210 each having a U-shape, for connecting the respective both ends of the roller running counter-surfaces 208, 208, 208, 208 with the respective both ends of the roller returning passages 209, 209, 209, 209, so as to form four endless circulation passages.

The roller returning passages 209, 209 respectively corresponding to the roller running surfaces 205, 205 formed on the upper side of the guide rail 202 are formed in the horizontal portion 206. The other roller returning passages 209, 209 respectively corresponding to the roller running surfaces 205, 205 formed on the right and left-hand vertical surfaces of the guide rail 202 are formed in the wing portions 207, 207 of the movable block 204, respectively.

In each of the endless circulation passages in this embodiment, the rollers 3 are retained in the form of train by means a roller retainer 212 as a rolling member retainer so that the rollers 203 can be circulated while being guided by the roller retainer 212.

As shown in FIGS. 19(b) to 19(d), the roller retainer 212 comprises a flexible belt portion 212b, which is provided with roller holes 212a for respectively receiving the rollers 203, and spacing portions 212c provided between the adjacent two rollers 203, 203. The belt portion 212b has a width longer than the diameter of the roller 203 so that the both side edges of the belt portion 212b extend outwardly from the roller 203.

The spacing portion 212c is provided with a roller supporting recess 212d corresponding to the cylindrical surface of the roller 203. The roller 203 is supported on its both sides by a pair of supporting recesses 212d so as to prevent the roller 203 from coming off the belt portion 212b. In this embodiment, the one end of the belt portion 212b is not connected to the other end thereof, thus forming a strip-shaped belt having the both ends. The one end of the belt portion 212b may be connected to the other end thereof so as to form an endless belt.

As shown in FIGS. 18 and 20, the movable block 204 is composed of a metallic block body 213 having roller running counter-surfaces 208, 208, 208, 208, a resin-formed body 220 for forming roller circulation passages, which is inserted in the block body 213, and a pair of side cover plates 214, 214 secured to the both end surfaces of the block body 213, in which the resin-formed body 220 is inserted.

In the second embodiment, four circulation passages are formed by two resin-formed bodies 220, 220 for forming the roller circulation passage, which are arranged at the right and left-hand sides.

Each of the roller circulation passages of the resin-formed bodies 220 comprises a pair of roller passage forming portions 221, 221 extending along both longitudinal sides of the roller running counter-surface 208, a pair of direction changing passage-inner guide forming portions 222, 222 provided on the both side surfaces of the block body 213, and a resin pipe 223 as a returning passage forming portion, which is inserted into a through-hole formed in the block body 213.

The roller passage forming portions 221, 221 are provided with guide surfaces for guiding the both side edges of the belt portion 212b of the roller retainer 212 in a loaded area as illustrated in detain in FIG. 20. The guide grooves can prevent the roller retainer 212 not only from being swung during run of the roller, but also from being sagged by engaging the side edges of the belt portion 212b with the guide groove 221a. The rollers 203 are supported by the roller retainer 212. More specifically, the roller retainer 212 is supported by a jaw portion of the guide groove 221a, with the result that the rollers 203 are kept-in its proper position so as not to come off the movable block 204.

In this embodiment, the one end of the belt portion 212b is not connected to the other end thereof, thus forming a strip-shaped belt having the both ends. The one end of the belt portion 212b may be connected to the other end thereof so as to form an endless belt.

Guide grooves 209c, 210c are also formed in the roller returning passage 209 and the direction changing passage 210 as non-loaded areas, in order to guide the side edges of the belt portion 212b. The guide grooves 209c, 210c are connected to the above-mentioned guide groove 221a in the loaded area so as to form an endless groove on the entire periphery.

In each of the resin-formed bodies 220, 220 for forming the roller circulation passage, the roller passage forming portions 221, 221 and the pair of the direction changing passage-inner guide forming portions 222, 222 are integrally formed with each other. The resin pipe 223 for forming the roller returning passage 209 is separately formed from the resin-formed bodies 220, 220. More specifically, the one ends of the two pairs of the roller passage forming portions 221, 221 are integrally connected with the ends of the pair of direction changing passage-inner guide forming portions 222, 222 to form a single resin frame 220A so that the thus formed resin frame 220A can be inserted into the block body 213. The other resin frame 220A has the same construction.

The roller passage forming portions 221, 221 to be arranged on the upper surface of the guide rail 202 are integrally connected with the other roller passage forming portions 221, 221 to be arranged on the side surface of the guide rail 202 by means of a thin connecting plate portion 226.

The direction changing passage-inner guide forming portion 222 is integrally formed with a thin sheet portion 229, which is to be brought into contact with the end surface of the block body 213.

The thin sheet portion 229 has the first end plate portion 230, which is to be brought into contact with the end surface of the horizontal portion 206 of the block body 213, the third end plate portion 232, which is to be brought into contact with the end surface of the wing portion 207, and the second end plate portion 231, which is arranged at the corner between the horizontal portion 206 and the wing portion 207 on the end surface of the block body 213, and connects the first end plate portion 230 with the third end plate portion 232.

The pair of roller passage forming portions 221, 221, which are arranged on the both longitudinal sides of the roller running surface 208 are integrally formed on the inside edge of the first end plate portion 230 and the inside edge of the third end plate portion 232, respectively. The both ends of the connecting plate portion 226 are integrally connected with the inside edges of the second plate portions 231, 231.

Each of the direction changing passage-inner guide forming portions 222 has a semi-cylindrical shape. On the outer periphery of the direction changing passage-inner guide forming portion 222, there is formed an inner guide groove 210a having a rectangular cross section so as to form the inner guide portion for the direction changing passage 210. The one end of the bottom of the inner guide groove 210a is connected to the end of the roller running counter-surface 208. Accordingly, the one end of the inner guide groove 210a has the same cross-sectional shape as the roller running counter-surface 208 so as to make an alignment of the one end of the inner guide groove 210a with the end of the roller running counter-surface 208. The other end of the inner guide groove 210a of the direction changing passage 210 is connected to the end of the roller returning passage 229. Accordingly, the other end of the inner guide groove 210a has the same cross-sectional shape as the roller returning passage 209 so as to make an alignment of the other end of the inner guide groove 210a with the end of the roller returning passage 209.

Cylindrical flange portions 233, 233 are formed on the both ends of the inner guide groove 210a. The distance between the respective outer surfaces of the cylindrical flange portions 233, 233 is larger than the width of the belt portion 212b. The cylindrical flange portions 233, 233 form a guide groove 210c for the roller retainer 212 in cooperation with the side cover plate 240 described later.

The one end of the inner guide groove 210a for the direction changing passage 210 extends to the contacting surface of the first and third end plate portions 230, 232 with the end surface of the block body 213 so as to be connected to the end of the roller running counter-surface 208. The other end of the inner guide groove 210a for the direction changing passage 210 extends to the end surface of the thin sheet portion 229, which is apart from the block body 213. A step portion 222a having a depth identical to the thickness of the thin sheet portion 229 is formed at the other end of the inner guide groove 210a. The inner peripheral side-half pipe member for the resin pipe 223 projects from the end surface of the block body 13 by a length identical to the thickness of the thin sheet portion 229. The projected end of the half pipe member 223a is fitted into the step portion 222a of the thin sheet portion 229.

Pipe inserting holes 234, 234 having a semi-circular shape, in which the ends of for the outer peripheral side-half pipe member 223a for the resin pipes 223 for forming the roller returning passage 209 are to be inserted are formed on the first and third end plate portions 230, 232 of the thin sheet portion 229. The resin pipe 223 is inserted into the circular through-hole 214 formed in the block body 213 so that the inner peripheral surface of the resin pipe 223 form the roller returning passage 209.

As shown in FIG. 20, the resin pipe 223 is composed of the inner peripheral side-half pipe member 223a, which is continuously connected to the inner guide groove 210a for the direction changing passage, and the outer peripheral side-half pipe member 223b, which is continuously connected to the outer guide groove 210b for the direction changing passage 210, which is formed on the side cover plate 240. The inner peripheral side-half pipe member 223a has an inner groove portion 209a having a rectangular cross section, and side edge portions 223b extending longitudinally along the inner groove portion 209a. The longitudinal edge portions 223c of the inner peripheral side-half pipe member 223a has the same width as the flange portion 233 of the portion 228.

The outer peripheral side-half pipe member 223b is formed into a linear member having the same rectangular cross section as the outer guide groove 210b for the direction changing passage, which is formed on the side cover plate 240. The outer peripheral side-half pipe member 223b has a outer groove portion 209b, which is continuously connected to the outer guide groove 210b, and side edge portions 223d extending longitudinally along the outer groove portion 209b. The side edge portions 223d is provided on its outer edges with projections 223e, which are to be brought into contact with the side edge portions 223c of the inner peripheral side-half pipe member 223a to form the guide groove for the belt portion 212 of the roller retainer 212.

The inner peripheral side-half pipe member 223a of the resin pipe 223 has the same length of the block body 213. The inner peripheral side-half pipe member 223a is positioned so as to be brought into contact with the end surface of the direction changing passage-inner guide forming portion 222, which is arranged on the side of the block body 213.

The outer peripheral side-half pipe member 223b of the resin pipe 223 has on the other hand a longer length than the block body 213 by a length corresponding to the thickness of the first and third end plate portions of the thin sheet portion 229, which are arranged on the both ends of the block body 213. The outer peripheral side-half pipe members 223b are inserted in the inserting holes 234 of the first and third end plate portions 230, 232. Longitudinal positional determination of the outer peripheral side-half pipe member 223b is made by bringing the both ends of the outer peripheral side-half pipe member 223b inserted in the inserting holes 234 into contact with the peripheral edge of the end portion of the outer guide grooves 210b for the direction changing passage, which are formed on the side cover plate 240. The projections 223e formed on the both longitudinal side edges 223 of the outer peripheral side-half pipe member 223b come into contact with the cylindrical flange portions 233 at the side edges of the inner guide groove 210a of the direction changing passage-inner guide forming portion 222, and the outer peripheral side-half pipe member 223b and the inner peripheral side-half pipe member 223a are restricted to be turned in the inserting hole 214.

The resin pipes 223 and the direction changing passage-inner guide forming portions 222 are accurately positioned through the inserting holes 234 formed on the first and third end plate portions 230, 232 of the thin sheet portion 229 and a proper assembling is carried out in this manner.

The side cover plate 240 is provided with four recess portions 241 having the outer guide grooves 210b for the direction changing passage, into which the portions 228 of the direction changing passage-inner guide forming portions 222 are fitted, and screw-fixing portions for securing the side cover plate 240 to the block body 213. In the screw-fixing portions, the side cover plate 240 is fixed to the block body 213 by inserting bolts 244 into holes 243 formed on the side cover plate 240 and engaging the bolts 244 with screwed holes 245 formed on the end surface of the block body 213. The holes 243 are located between the first and third end plate portions 230, 232 of the thin sheet portion 229.

The direction changing passage-inner guide forming portion 222 provided with the inner guide groove 210a for the direction changing passage is fitted into the recess portion 241 of the side cover plate 240. The thin sheet portion 229 is held between the side cover plate 240 and the end surface of the block body 213 through a clamping force so as to be firmly fixed therebetween.

The direction changing passage-inner guide forming portions 222 and the roller passage forming portion 221 are connected through the thin sheet portion 229, thus making it possible to maintain an accurate positional relationship of the end of the inner guide groove 210*a* for the direction changing passage relative to the roller passage forming portions 221, as well as an accurate positional relationship of the inner guide groove 210*a* for the direction changing passage relative to the roller returning passage 209.

The thin sheet portion 229 is uniformly urged against the flat end surface of the block body 213 through a clamping force applied to the side cover plate 240. Even when the direction changing passage-inner guide forming portion 222 is not located in a correct position, the thin sheet portion 229 changes its shape, thus permitting the correct positioning of the direction changing passage-inner guide forming portion 222. The thin sheet portion 229 is firmly clamped and fixed through a clamping force, which is applied to the side cover plate 240, and frictional force caused by such a clamping step may prevent an unfavorable movement of the inner guide groove 210*a* for the direction changing passage.

Description will be given of modifications of the resin-formed body 220 for forming the roller circulation passage, which is divided into parts. In the description of the modifications, modified features will only be explained in comparison with the second embodiment of the present invention. The same reference numerals will be given to the same components as those in the second embodiment of the present invention, and description thereof will be omitted.

First Modification

Figure 22A:
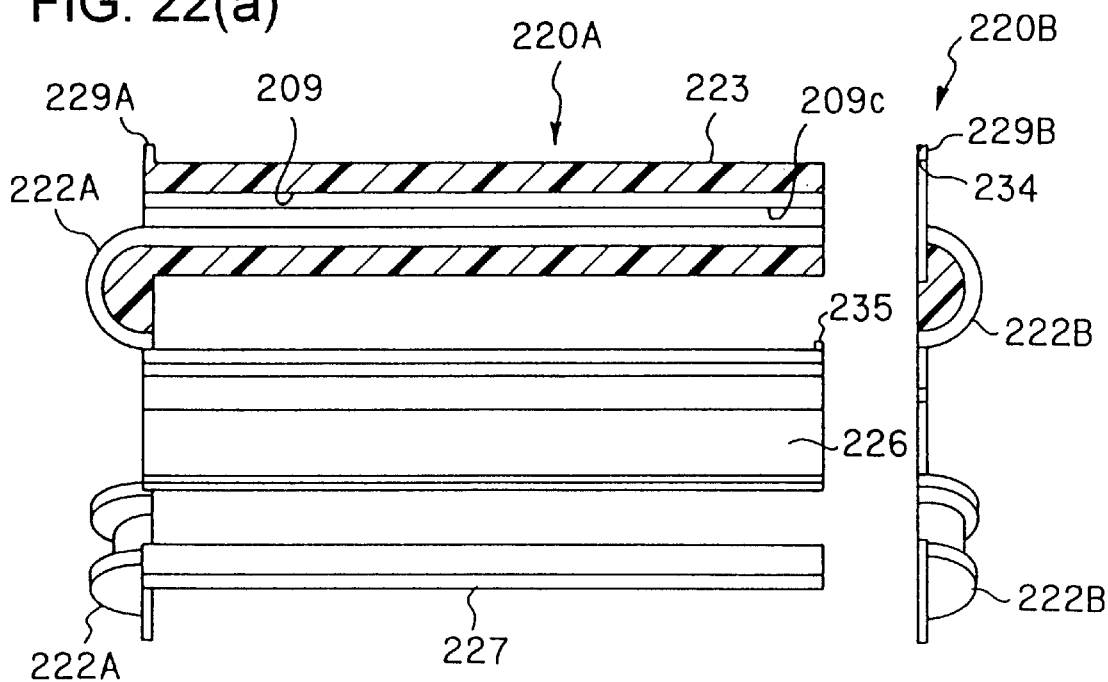
FIG. 22(a) is a disassembling side view having a partial cross-section, illustrating the resin-formed body for the ball circulation passage as shown in FIG. 21.
Figure 22B:
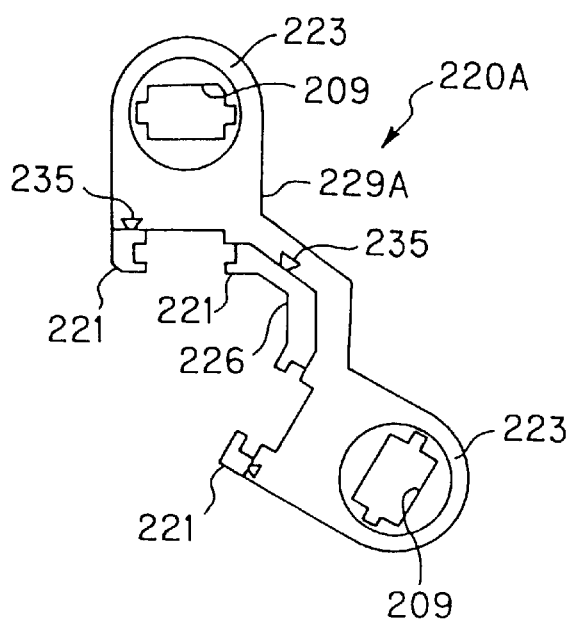
FIG. 22(b) is a view illustrating the first resin frame as shown in FIG. 22(a), with sight being placed on the divided end side thereof
Figure 22C:
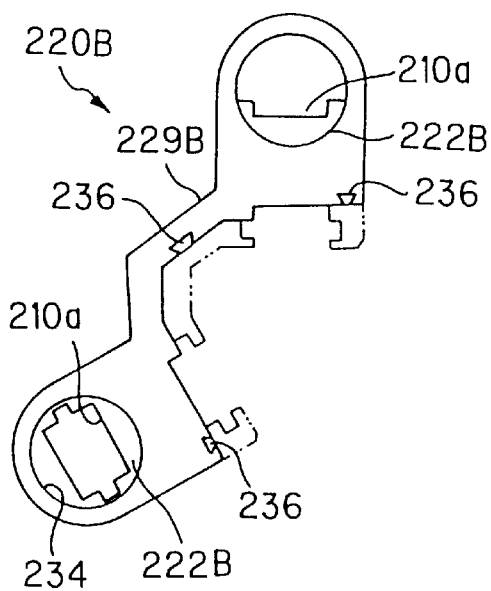
FIG. 22(c) is a view illustrating the second resin frame as shown in FIG. 22(a), with sight being placed on the divided end side thereof.

FIGS. 21 and 22 show the first modification of the resin-formed body 20 for forming the ball circulation passage, which is described in the second embodiment.

In the first modification, the resin-formed body 220 for forming the ball circulation passage is composed of the first resin-formed frame 220A, which is obtained by integrally connecting both of the roller passage forming portions 221, 221 and the resin pipes 223 at their ends with the direction changing passage-inner guide forming portions 222A for one side, and the second resin-formed frame 220B, which is provided with the direction changing passage-inner guide forming portions 222B for the other side and separately formed from the first resin-formed frame 220A.

In this case, the roller passage forming portions 221, 221 are integrally connected with the direction changing passage-inner guide forming portions 222A through the thin sheet portion 229A as in the second embodiment.

The direction changing passage-inner guide forming portions 222 are also integrally connected with the resin pipes 223 through the thin sheet portion 229A. In this case, the resin pipe 223 is formed into a tubular integral body, although the half pipe members are used in the second embodiment. Accordingly, there exists no inserting hole 234 in the thin sheet portion 229A, and the roller returning passage 209 is exposed on the thin sheet portion 229A.

The first resin-formed frame 220A and the second resin-formed frame 220B are connected, as shown in FIG. 22, by means of a joint method using the combination of a recess and a projection to be inserted therein, such as a faucet joint method. In the illustrated example, a recess portion 236 of a dove-tail groove is formed in the second resin-formed frame 220B, and an engaging projection 235 to be engaged with the recess portion 236 is formed, on the other hand, in the roller passage forming portions 221, 221.

In this case, the resin pipe 223 of the first resin-formed frame 220A is inserted in the through-hole 214 of the block body 213, and the roller passage forming portions 221, 221 and the connecting plate portion 226 are inserted along the under surface of the horizontal portion 206 of the block body 213 and the inner surfaces of the wing portions 207,207.

Then, the engaging projections 235 formed at the roller passage forming portions 221, 221 and the connecting plate portion 226 are engaged with the recess portions 236 formed on the thin sheet portion 229B of the second resin-formed frame 224B, which is arranged on the other end surface of the block body 213.

The recess portions 236 may be formed on the first resin-formed frame 220A and the engaging projections 235 may be formed on the second resin-formed frame 220B. The connecting method is not limited to the method described above, and there may be used any conventional connecting method in which the ends of the divided parts can be maintained in a proper connecting position and connected.

Second Modification

Figure 23:
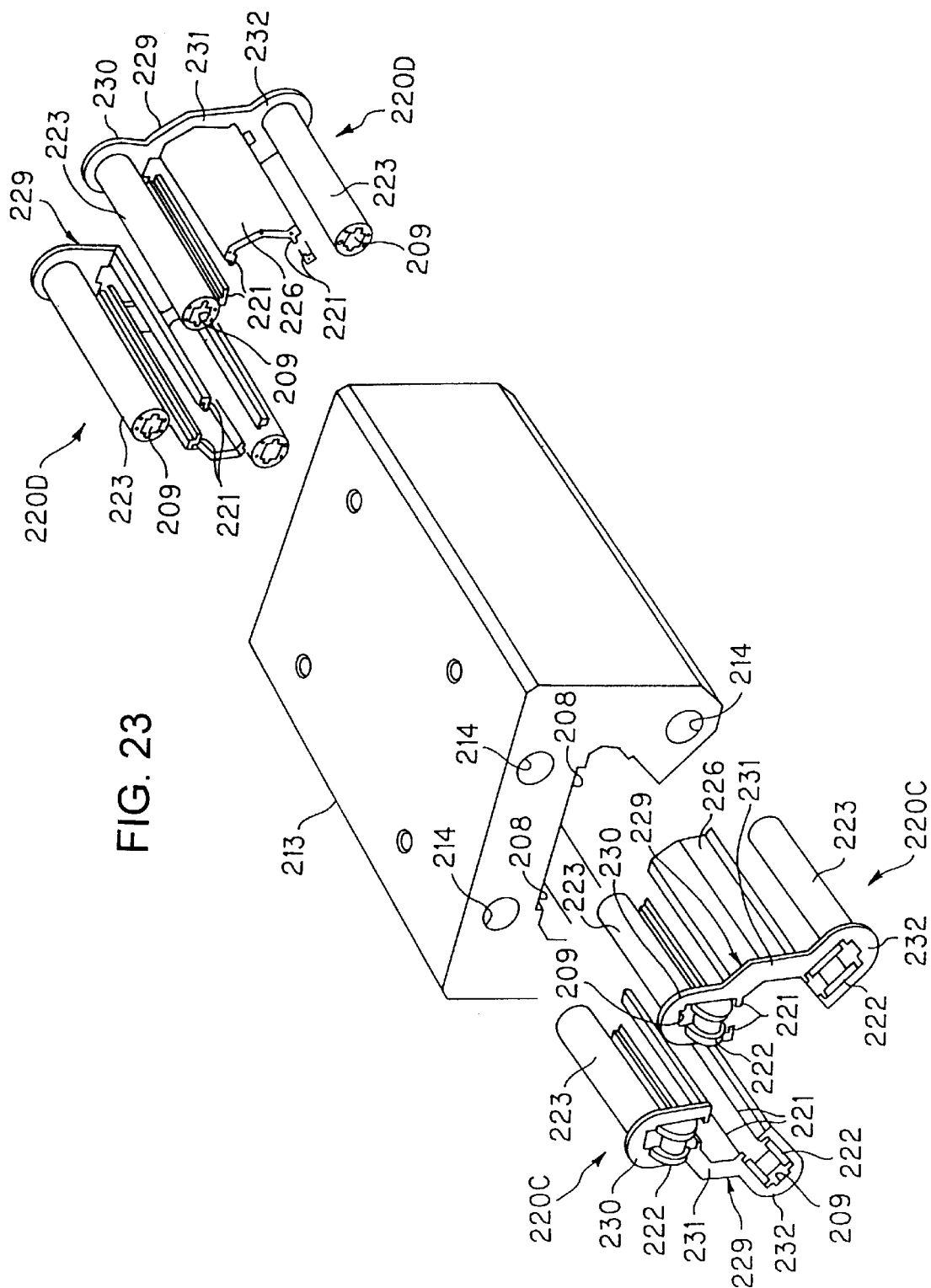
FIG. 23 is a schematic disassembling perspective view illustrating the second modification of the resin-formed body for forming the ball circulation passage in the second embodiment of the present invention.
Figure 24A:
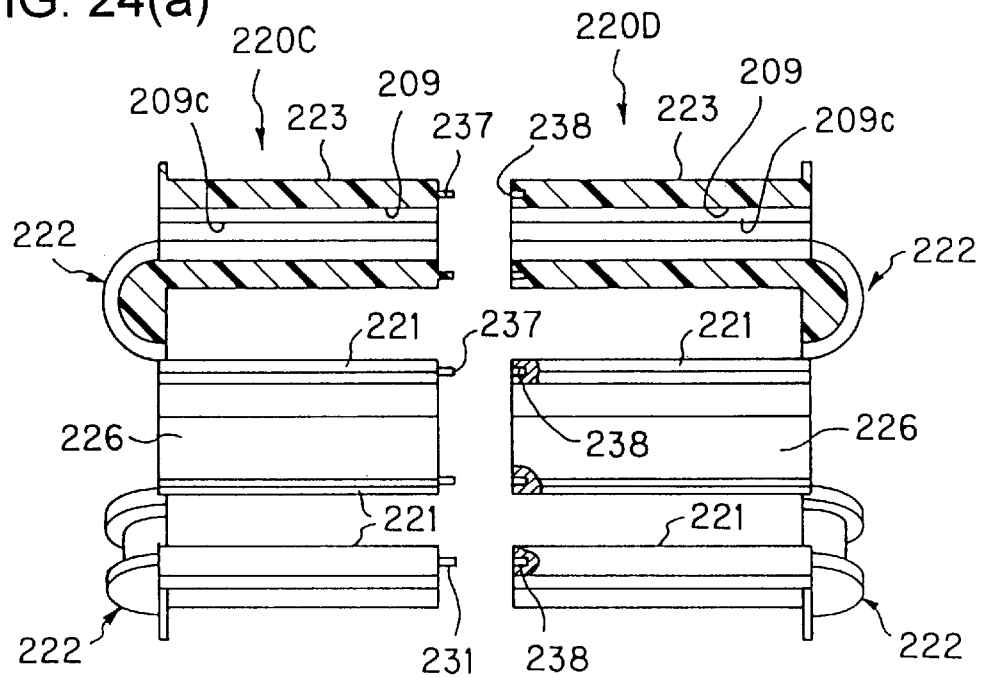
FIG. 24(a) is a disassembling side view having a partial cross-section, illustrating the resin-formed body for the ball circulation passage as shown in FIG. 23.
Figure 24B:
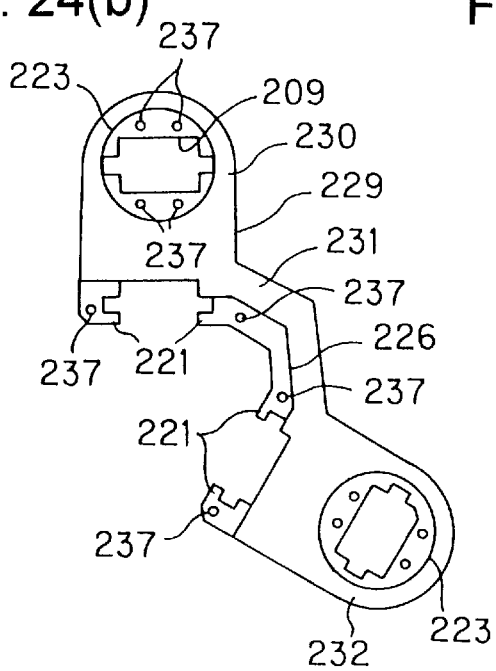
FIG. 24(b) is a view illustrating one resin frame as shown in FIG. 24(a), with sight being placed on the divided end side thereof
Figure 24C:
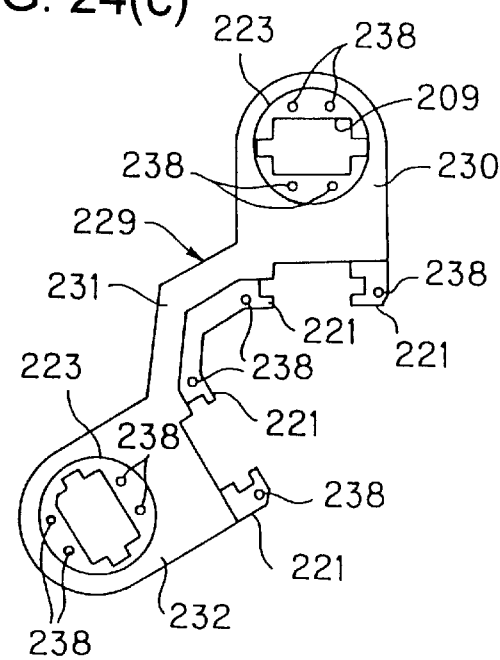
FIG. 24(c) is a view illustrating the other resin frame as shown in FIG. 24(a), with sight being placed on the divided end side thereof.

FIGS. 23 and 24 show the second modification of the resin-formed body 220 for forming the ball circulation passage, which is described in the second embodiment.

In the second modification, the resin-formed body 220 for forming the roller circulation passage, which has been obtained by integrally forming both of the roller passage forming portions 221, 221 and the resin pipes 223 as a returning passage forming portion with a pair of direction changing passage-inner guide forming portions 222, 222, is divided at the middle portion of each of the roller passage forming portions 221, 221 and the resin pipes 223 into two parts. More specifically, the roller passage forming portions 221, 221 and the resin pipes 223 are divided at their middle portion into the respective two half parts, and each of the thus divided two half parts is integrally formed with the direction changing passage-inner guide forming portions 222, 222, thus forming two resin-formed frames 220C, 220D having substantially the same shape.

Recess portions 238 and engaging projections 237 to be inserted therein are formed on the divided ends of the roller passage forming portions 221, 221 and the divided ends of the connecting plate portion 226 and the divided ends of the resin pipes 223.

Third Modification

Figure 25:
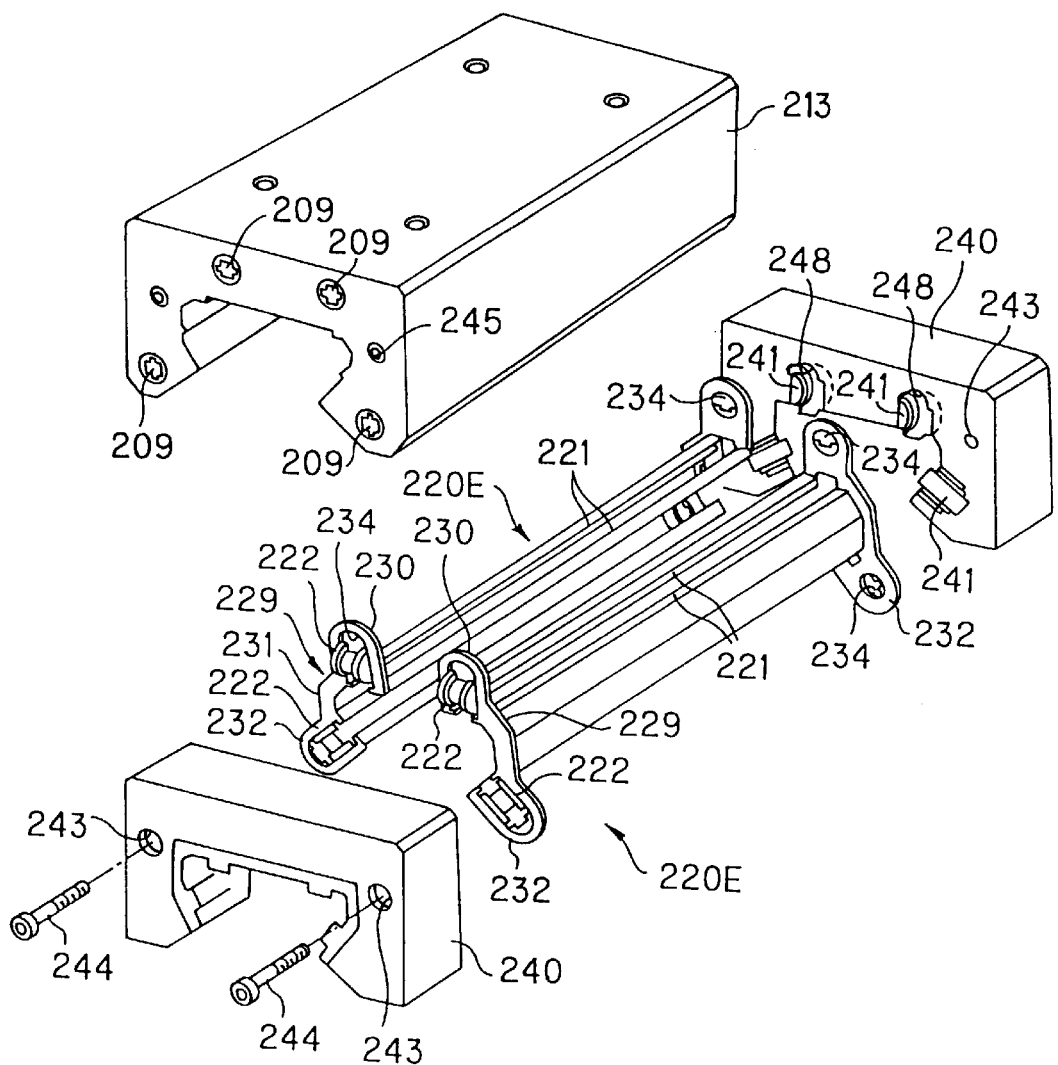
FIG. 25 is a schematic disassembling perspective view illustrating the third modification of the resin-formed body for forming the ball circulation passage in the second embodiment of the present invention.
Figure 26:
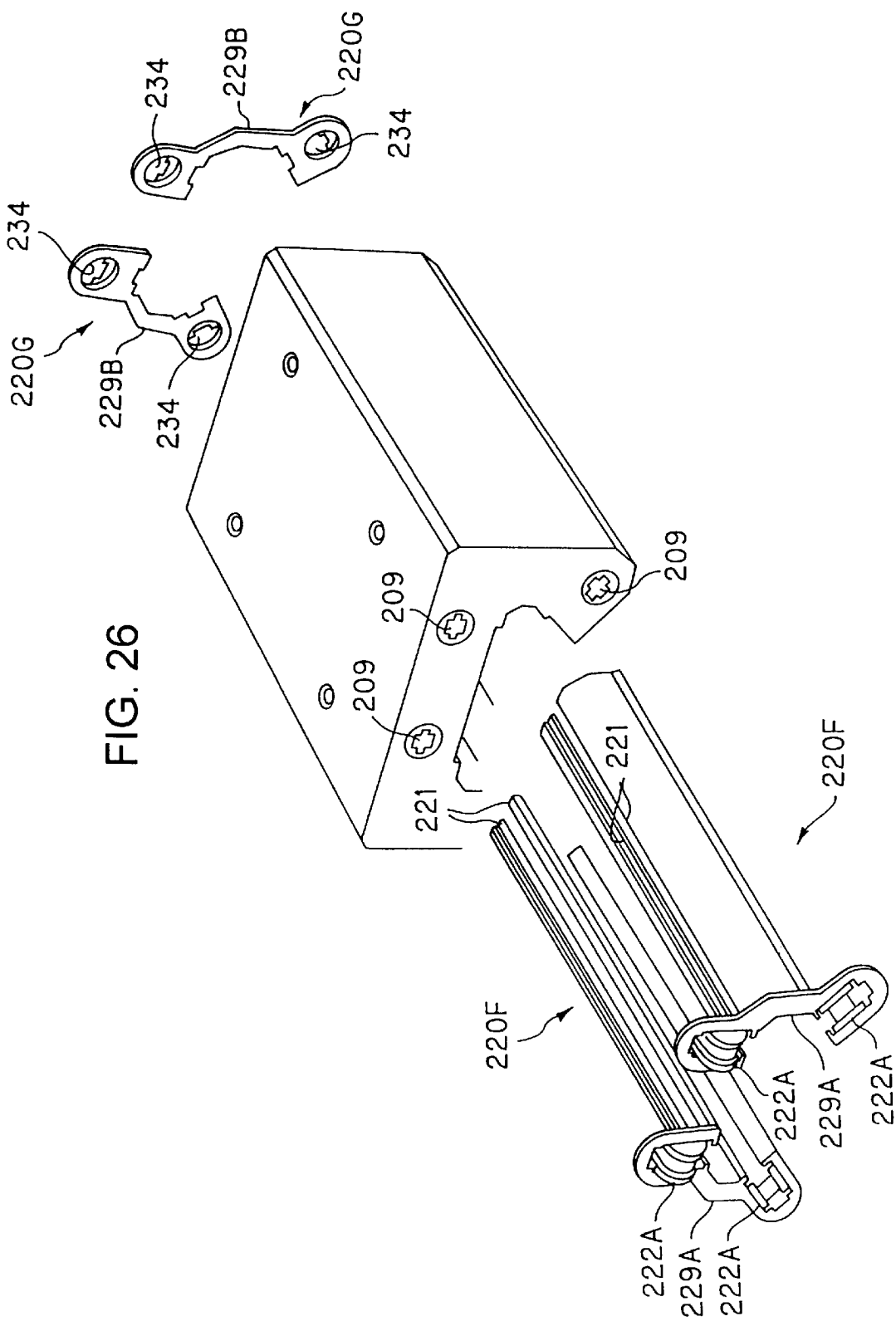
FIG. 26 is a schematic disassembling perspective view illustrating the fourth modification of the resin-formed body for forming the ball circulation passage in the second embodiment of the present invention.

FIGS. 25 to 26 show the third modification of the resin-formed body 220 for forming the roller circulation passage, which is described in the second embodiment.

In the third modification, there is not used the resin pipe 223 as a returning passage forming portion described in the second embodiment, and a resin-formed frame 220E is obtained by integrally forming the both of the roller passage forming portions and the connecting plate portion 226 with the thin sheet portions 229, 229 each having the pair of direction changing passage-inner guide forming portions 222, 222. The roller returning passage 209 is composed as a through-hole formed in the block body 213.

In this case, an engaging projection 239*a*, which is engageable with a tapered portion 215 formed in the opening end of the roller returning passage 209 may be formed in the opening end of the roller hole 239 of the thin sheet portion 229. Such a construction permits to make a proper connection of the end of the roller returning passage 209 and the direction changing passage-inner guide forming portion 222.

In the illustrated example, an arcuate engaging projection 248 is additionally formed on the connection portion of the outer guide groove 210*b* for the direction changing passage with the roller returning passage 209. The engaging projection 248 can be fitted into the roller hole 239 of the thin sheet portion 229 and engaged with the tapered portion 215 of the opening end of the roller returning passage 209.

Fourth Modification

FIG. 26 shows the fourth modification of the resin-formed body 220 for forming the roller circulation passage, which is described in the second embodiment.

In the fourth modification, there is not used the resin pipe 223 described in the third modification, a resin-formed frame 220F is obtained by integrally forming the roller passage forming portions 221 with the direction changing passage-inner guide forming portions 222 for the one side, the other resin-formed frame 220F provided with the direction changing passage-inner guide forming portions 222 for the other side is separately formed from the above-mentioned resin-formed frame 220F, and the resin-formed frames 220F, 220F are connected with each other by engagement of the engaging projection 235 with the recess 236. The structure other than the above-mentioned construction is the same as that of the third modification.

Modifications of the Roller Train

In the second embodiment and the first to fourth modifications, there is described that two trains of the rollers are provided on the upper surface of the guide rail 2 and the single train of the rollers is provided on each of the side surfaces of the guide rail 2, so as to provide the total number of trains of four. In the present invention, the other type of roller trains can however be applied as shown in the figures. With respect to the division of the resin-formed body 220 for forming the roller circulation passage, all the modifications are based on the divisional pattern of the first embodiment. All the divisional patterns of the first to fourth modifications may however be applied to the modifications of the roller train.

Figure 27:
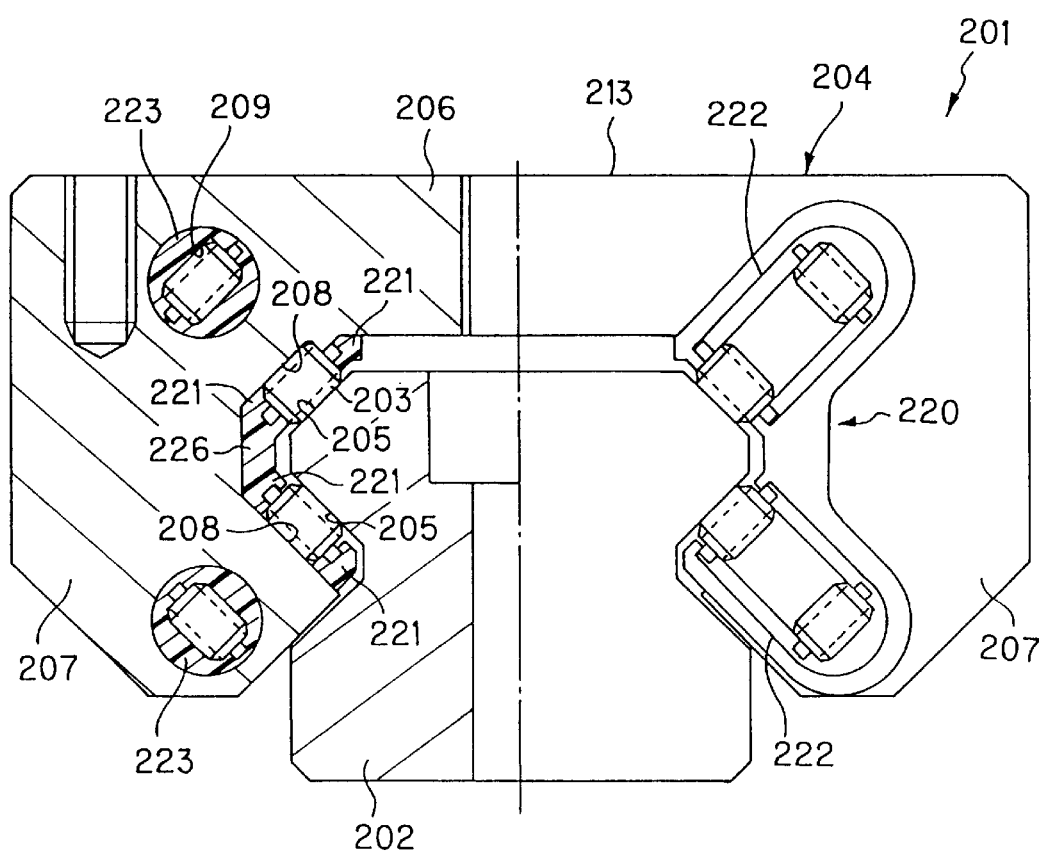
FIG. 27 is a front view having a cross-sectional half portion, illustrating the other embodiment of arrangement of the trains of balls in the linear motion guiding apparatus of the second embodiment of the present invention.

In the example as shown in FIG. 27, two lower and upper trains of the rollers as rolling members are provided on each of the gaps between the right and left-hand side surfaces of the guide rail 202 and the inner surfaces of the right and left-hand wing portions 207, 207 of the movable block 204, so as to provide the total number of trains of four.

In this case, four inner guide portions 210a corresponding to the four trains of the rollers 203 are integrally formed with each other in the direction changing passage-inner guide forming portions 222.

In the above description, the present invention is applied to the linear motion guiding apparatus, in which the movable block is arranged on the guide rail as a track shaft through the rolling members. The present invention may however be applied to a so-called ball-spline, in which an outer tube as a movable member is fitted on a spline shaft as a track shaft, as described below.

Third Embodiment

Figure 28:
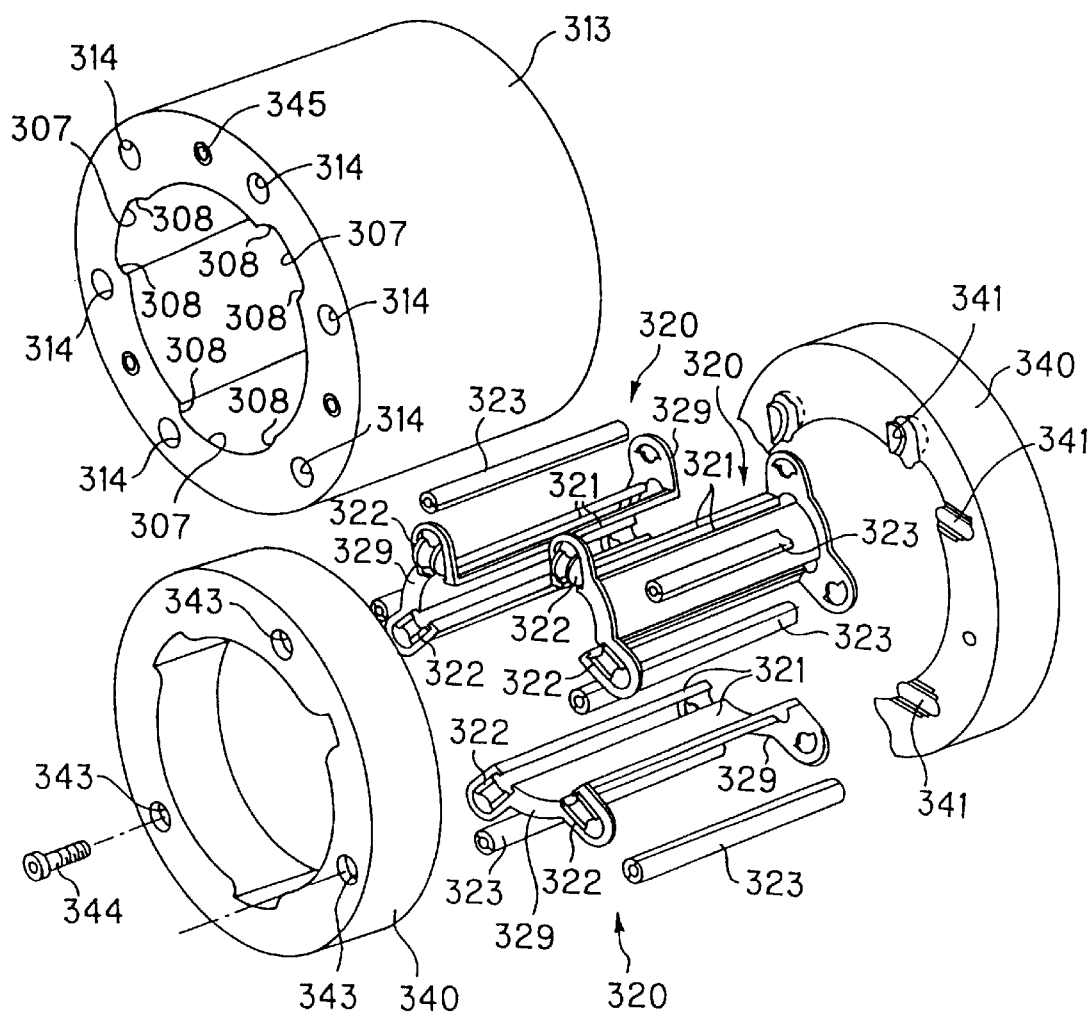
FIG. 28 is a schematic disassembling perspective view of an outer tube of a ball-spline as a linear motion guiding apparatus of the third embodiment of the present invention.
Figure 29A:
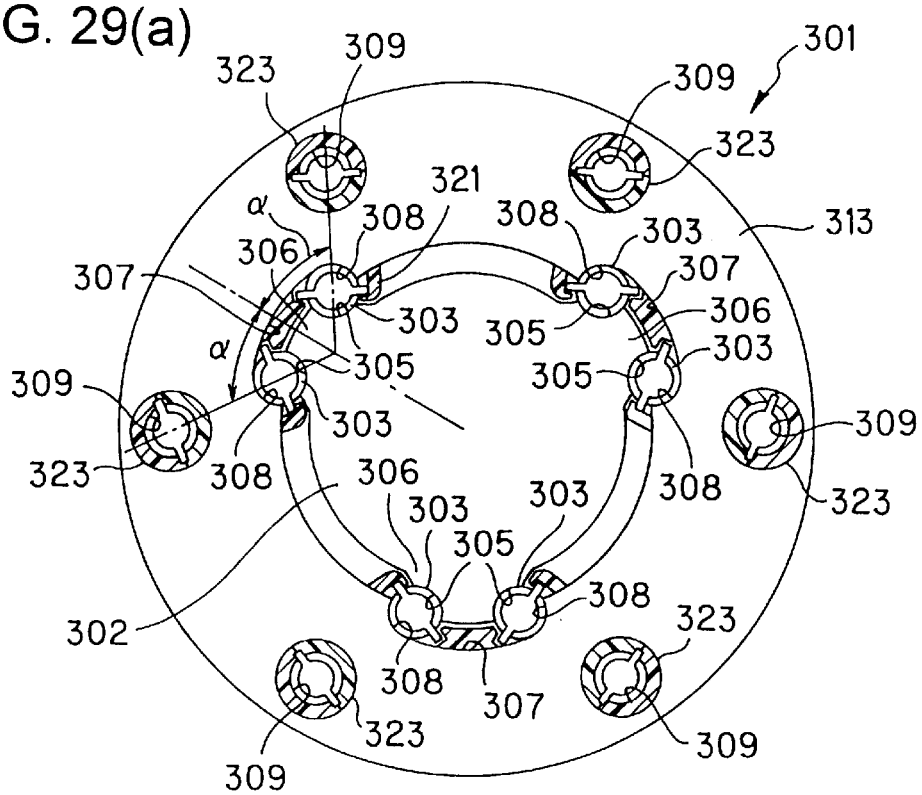
FIG. 29(a) is a front view having a cross-section, illustrating the ball spline of the third embodiment of the present invention, in which the outer tube as shown in FIG. 28 is used.
Figure 29B:
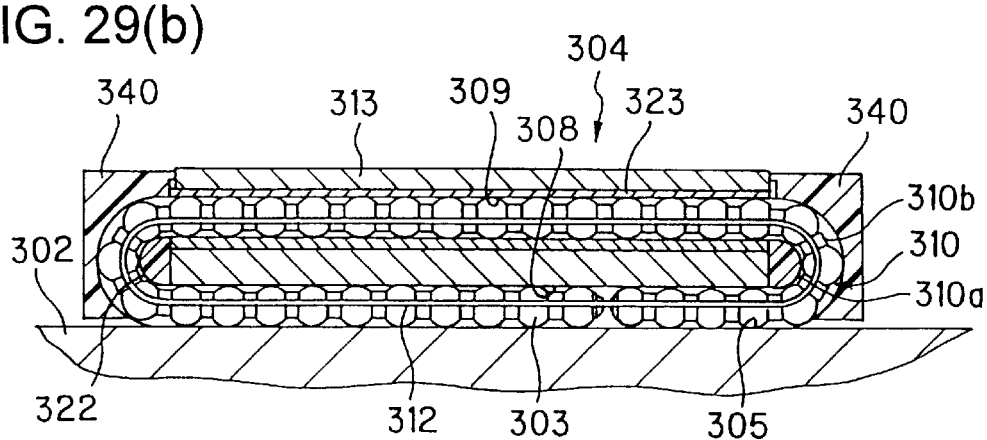
FIG. 29(b) is a partial cross-sectional view illustrating one ball circulation passage of the apparatus as shown in FIG. 29(a) and FIG. 29(c) is a disassembling cross-sectional view illustrating the construction of the ball circulation passage, in which the roller retainer as shown in FIG. 29(b) is removed.
Figure 29C:
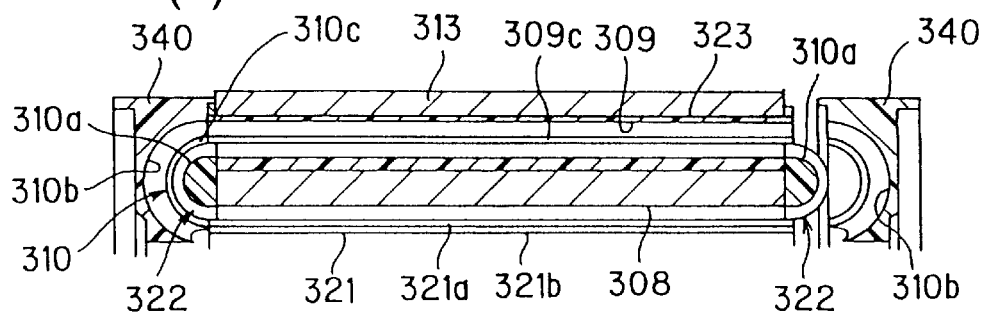

A ball spline 301 as shown in FIGS. 28 to 30 is of a so-called "angular contact" ball spline, and has a spline shaft 302 as a guide member extending linearly and an outer tube 304 arranged so as to be movable along the spline shaft 302 through balls 303 as a large number of rolling members.

The spline shaft 304 is formed into a long bar shape having a circular cross-section. The spline shaft 304 has on its outer periphery three projections 306. Two ball running grooves 305, 305 are formed on the both sides of each of the projections 306, so as to provide the total number of groove of six.

The outer tube 304 has on its inner periphery three recesses 307 corresponding to the projections 306 of the spline shaft 302, respectively. Ball running counter-grooves 308, 308 are formed at the both corners of each of the recesses 307, so as to correspond to the above-mentioned ball running grooves 305, 305.

In addition, the outer tube 304 has six ball returning passage 309, 309; 309, 309; 309, 309, which are in parallel with the six ball running counter-grooves 308, 308; 308, 308; 308, 308, and six direction changing passages 310, 310; 310, 310; 310, 310 formed into a U-shaped tube, which connect the ends of the above-mentioned ball running counter-grooves 308, 308; 308, 308; 308, 308 with the ends of the above-mentioned ball returning passage 309, 309; 309, 309; 309, 309. The outer tube 304 has six circulation passages in this manner.

The ball arranged at each of the both side surfaces of the projection 306 of the spline shaft 302 comes in contact, at its opposite points, with the ball running groove 305 and the ball running counter-groove 308, respectively. A line connecting the above-mentioned contact points is referred to as the "contact angle line". A contact angle α, i.e., an angle between the contact angle line and the radius line, which connects the center of the spline shaft 302 and the central portion of the projection 306 is relatively large. The ball returning passage 309 is located on the contact angle line.

In this third embodiment, the balls 303 inserted in each of the circulation passages are connected with each other by means of a ball retainer 312 so as to form the train of the balls 303. The balls 303 are guided by means of the ball retainer 312 and circulated in each of the circulation passages. The ball retainer 312 has the same structure as shown in FIG. 14 and the description thereof is therefore omitted.

The outer tube 304 is composed of a tubular main body 313 having the ball running counter-grooves 308, 308; 308, 308; 308, 308, three resin-formed bodies 320, 320, 320 for forming the ball circulation passage, which are to be inserted in the main body 313, and a pair of side cover plates 314, 314 secured on the both ends of the main body 313 after the insertion of the resin-formed bodies 320, 320, 320 in the main body 313.

In the third embodiment, the six circulation passages are formed by the three resin-formed bodies 320, 320, 320.

Each of the circulation passages 311 of the resin-formed bodies 320 for forming the ball circulation passage has a pair of the ball passage forming portions 321, 321 extending along the longitudinal side edges of the ball running counter-groove 308, a pair of direction changing passage-inner guide forming portions 322, 322 provided on the both ends of the main body 313, and resin pipes 323 as a returning passage forming portion, which are inserted in through-holes formed in the main body 313.

The ball passage forming portions 321, 321 are provided with guide grooves for guiding the both side edges of the belt portion 312b of the ball retainer 312 in a loaded area. The guide grooves can prevent the ball retainer 312 not only from being swung during run of the ball, but also from being sagged by engaging the side edges of the belt portion 312b with the guide groove 321a, when the outer tube 304 is removed from the spline shaft 302. The balls 303 are supported by the ball retainer 312. More specifically, the ball retainer 312 is supported by a jaw portion of the guide groove 321a, with the result that the balls 303 are kept in its proper position so as not to come off the outer tube 304.

Guide grooves 309c, 310c are also formed in the ball returning passage 309 and the direction changing passage 310 as non-loaded areas, in order to guide the side edges of the belt portion 312b. The guide grooves 309c, 310c are connected to the above-mentioned guide groove 321a in the loaded area so as to form an endless groove on the entire periphery.

In each of the resin-formed bodies 320 for forming the ball circulation passage, the ball passage forming portions 321, 321 and the pair of the direction changing passage-inner guide forming portions 322, 322 are integrally connected with each other. The resin-formed body 320 is divided at the other portions into separate parts so as to be able to be inserted in the main body 313. In the third embodiment, a single resin frame 324 is obtained by integrally connecting the ends of the four sets of ball passage forming portions 321, 321 with the end of the pair of direction changing passage-inner guide forming portions 322, 322, and the thus obtained resin frame 324 is divided at the connecting portion of the returning passage forming portion 323 with the direction changing passage-inner guide forming portions 322, 322 into the separate parts so as to be able to be inserted in the main body 313.

The adjacent two of the roller passage forming portions 321, 321, 321, 321 are integrally connected with each other by means of a thin connecting sheet portion 326. The direction changing passage-inner guide forming portion 322 is integrally formed with the thin sheet portion 329, which is to be brought into contact with the end surface of the main body 313.

The thin sheet portion 329 is provided with the first end plate portions 330, 330 and the second end plate portion 231 for connecting the first end plate portions 330, 330 with each other. Each of the pair of ball passage forming portions 321, 321 is integrally connected with the inner edge of the first end plate portion 230. The both ends of the connecting plate portion 326 are integrally connected with the inner edge of the second end plate portion 331.

Each of the direction changing passage-inner guide forming portions 322 has a semi-cylindrical shape. On the outer periphery of the direction changing passage-inner guide forming portion 322, there is formed an inner guide groove 310a having a semi-circular cross section so as to form the inner guide portion for the direction changing passage 310. The one end of the inner guide groove 310a is connected to the end of the ball running counter-groove 308. Accordingly, the one end of the inner guide groove 310a has the same cross-sectional shape as the ball running counter-groove 308 so as to make an alignment of the one end of the inner guide groove 310a with the end of the ball running counter-groove 308. The other end of the inner guide groove 310a of the direction changing passage 310 is connected to the end of the ball returning passage 309. Accordingly, the other end of the inner guide groove 310a has the same cross-sectional shape as the ball returning passage 309 so as to make an alignment of the other end of the inner guide groove 310a with the end of the ball returning passage 309.

Cylindrical flange portions 333, 333 are formed on the both ends of the inner guide groove 310a. The distance between the respective outer surfaces of the cylindrical flange portions 333, 333 is larger than the width of the belt portion 312b. The cylindrical flange portions 333, 333 form a retainer-guide groove 310c for the ball retainer 312 in cooperation with the side cover plate 340 described later.

The both ends of the inner guide groove 310a for the direction changing passage 310 extend to the contacting surface of the first end plate portion 330 with the end surface of the main body 313 so as to be connected to the respective ends of the ball running counter-groove 308 and the ball returning passage 309.

Pipe inserting holes 334, 334 having a semi-circular shape, in which the ends of for the outer peripheral side-half pipe member 323a for the resin pipes 323 for forming the roller returning passage 309 are to be inserted are formed on the first and third end plate portions 330, 332 of the thin sheet portion 329. The resin pipe 323 is inserted into the circular through-hole 314 formed in the main body 313 so that the inner peripheral surface of the resin pipe 323 form the ball returning passage 309.

The resin pipe 323 is composed of the inner peripheral side-half pipe member 323a, which is continuously connected to the inner guide groove 310a for the direction changing passage, and the outer peripheral side-half pipe member 323b, which is continuously connected to the outer guide groove 310b for the direction changing passage 310, which is formed on the side cover plate 340. The inner peripheral side-half pipe member 323a has an inner groove portion 309a having a rectangular cross section, and side edge portions 323b extending longitudinally along the inner groove portion 309a. The longitudinal edge portions 323c of the inner peripheral side-half pipe member 323a has the same width as the flange portion 333 of the direction changing passage-inner guide forming portion 322.

The outer peripheral side-half pipe member 323b is formed into a linear member having the same rectangular cross section as the outer guide groove 310b for the direction changing passage, which is formed on the side cover plate 340. The outer peripheral side-half pipe member 323b has a outer groove portion 309b, which is continuously connected to the outer guide groove 310b, and side edge portions 323d extending longitudinally along the outer groove portion 309b. The side edge portions 323d is provided on its outer edges with projections 323e, which are to be brought into contact with the side edge portions 323c of the inner peripheral side-half pipe member 323a to form the guide groove for the belt portion 312 of the ball retainer 312.

The inner peripheral side-half pipe member 323a of the resin pipe 323 has the same length of the main body 313. The inner peripheral side-half pipe member 323a is positioned so as to be brought into contact with the end surface of the direction changing passage-inner guide forming portion 322, which is arranged on the side of the main body 313.

The outer peripheral side-half pipe member 323b of the resin pipe 323 has on the other hand a longer length than the main body 313 by a length corresponding to the thickness of the first end plate portions 330, 330 of the thin sheet portion 329, which are arranged on the both ends of the main body 313. The outer peripheral side-half pipe members 323b are inserted in the inserting holes 334 of the first end plate portions 330, 332. Longitudinal positional determination of the outer peripheral side-half pipe member 323b is made by bringing the both ends of the outer peripheral side-half pipe member 323b inserted in the inserting holes 334 into contact with the peripheral edge of the end portion of the outer guide grooves 310b for the direction changing passage, which are formed on the side cover plate 340. The projections 323e formed on the both longitudinal side edges 323 of the outer peripheral side-half pipe member 323b come into contact with the outer edges of the cylindrical flange portions of the direction changing passage-inner guide forming portion 322 to form a guide groove, and the outer peripheral side-half pipe member 323b and the inner peripheral side-half pipe member 323a are restricted to be turned in the inserting hole 314.

The resin pipes 323 and the direction changing passage-inner guide forming portions 322 as the ball returning passage forming portions are accurately positioned through the inserting holes 334 formed on the first end plate portion 330, 330 of the thin sheet portion 329 and a proper assembling is carried out in this manner.

The side cover plate 340 is provided with four recess portions 341 having the outer guide grooves 310b for the direction changing passage, into which the direction changing passage-inner guide forming portions 322 are fitted, and screw-fixing portions for securing the side cover plate 340 to the main body 313. In the screw-fixing portions, the side cover plate 340 is fixed to the main body 313 by inserting bolts 344 into holes 343 formed on the side cover plate 340 and engaging the bolts 344 with screwed holes 345 formed on the end surface of the main body 313. The holes 343 are located between the first end plate portions 330, 330 of the thin sheet portion 329.

The direction changing passage-inner guide forming portion 322 is fitted into the recess portion 341 of the side cover plate 340. The thin sheet portion 329 is held between the side cover plate 340 and the end surface of the main body 313 through a clamping force so as to be firmly fixed therebetween.

The direction changing passage-inner guide forming portions 322 and the ball passage forming portion 321 are connected through the thin sheet portion 329, thus making it possible to maintain an accurate positional relationship of the end of the inner guide groove 310a for the direction changing passage relative to the ball passage forming portions 321, as well as an accurate positional relationship of the inner guide groove 310a for the direction changing passage relative to the ball returning passage 309.

The thin sheet portion 329 is uniformly urged against the flat end surface of the main body 313 through a clamping force applied to the side cover plate 340. Even when the direction changing passage-inner guide forming portion 322 is not located in a correct position, the thin sheet portion 329 changes its shape, thus permitting the correct positioning of the direction changing passage-inner guide forming portion 322. The thin sheet portion 329 is firmly clamped and fixed through a clamping force, which is applied to the side cover plate 340, and frictional force caused by such a clamping step may prevent an unfavorable movement of the inner guide groove 310a for the direction changing passage.

According to the present invention, only the ball running counter-groove 308 for the circulation passage 311 is formed of the main body 313 having high rigidity, and the other portions are formed of the resin-formed bodies 320 for forming the ball circulation passage. Precision working of the ball running counter-groove 308 of the main body 313 suffices, thus permitting reduction in steps for working and decrease in the production cost.

The resin-formed body 320 for forming the ball circulation passage is separately formed from the main body 313. Even when the outer tube 304 has a larger size, there is no restriction of flow of molten resin by the main body 313, unlike the case where the main body 313 is integrally formed with the resin-formed body 320. Increase in number of gates formed on a die may ensure proper run of the molten resin, thus improving the formability. Especially, the ball passage forming portions 321, 321 located at the opposite longitudinal sides of the ball running groove 308 are thin, with the result that molten resin may not reach every part of the space for forming the ball passage forming portions 321, 321. It is therefore effective to form the resin-formed body 320 separately from the main body 313 in accordance with the embodiment of the present invention.

The ball passage forming portions 321, 321 are continuously and integrally connected with the direction changing passage-inner guide forming portions 322, and the divided parts are jointed so as to make alignment of them to make a faucet joint. It is therefore possible to ensure a proper continuity of the connecting portion of the circulation passage and to make smooth run of the balls 303 from the ball running passage between the ball running groove 305 and the ball running counter-groove 308 to the direction changing passage 310, as well as from the direction changing passage 310 to the ball returning passage 309.

Description will be given of modifications of the resin-formed body 320 for forming the ball circulation passage, which is divided into parts. In the description of the modifications, modified features will only be explained in comparison with the third embodiment of the present invention. The same reference numerals will be given to the same components as those in the third embodiment of the present invention, and description thereof will be omitted.

First Modification

Figure 31:
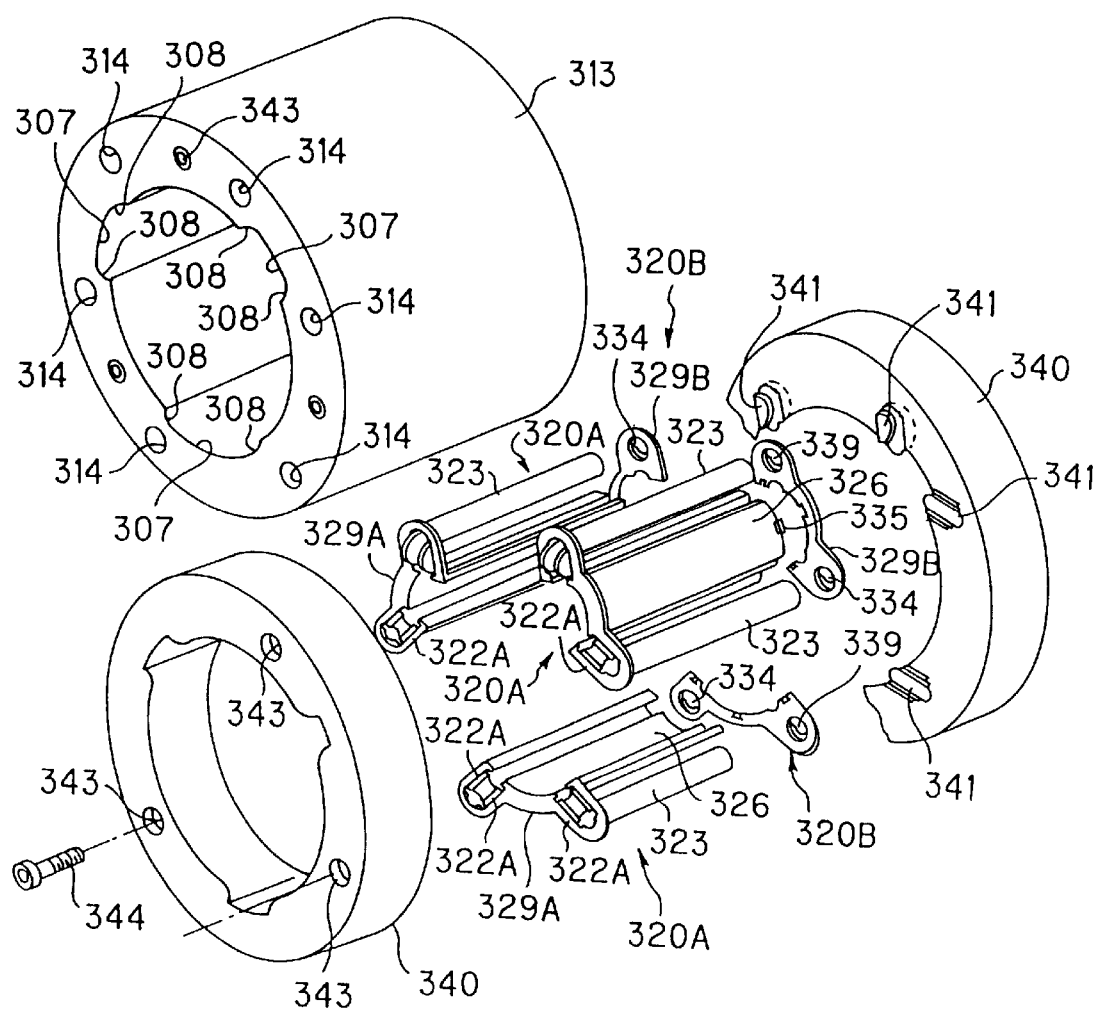
FIG. 31 is a schematic disassembling perspective view illustrating the first modification of the resin-formed body for forming the ball circulation passage in the third embodiment of the present invention.
Figure 32A:
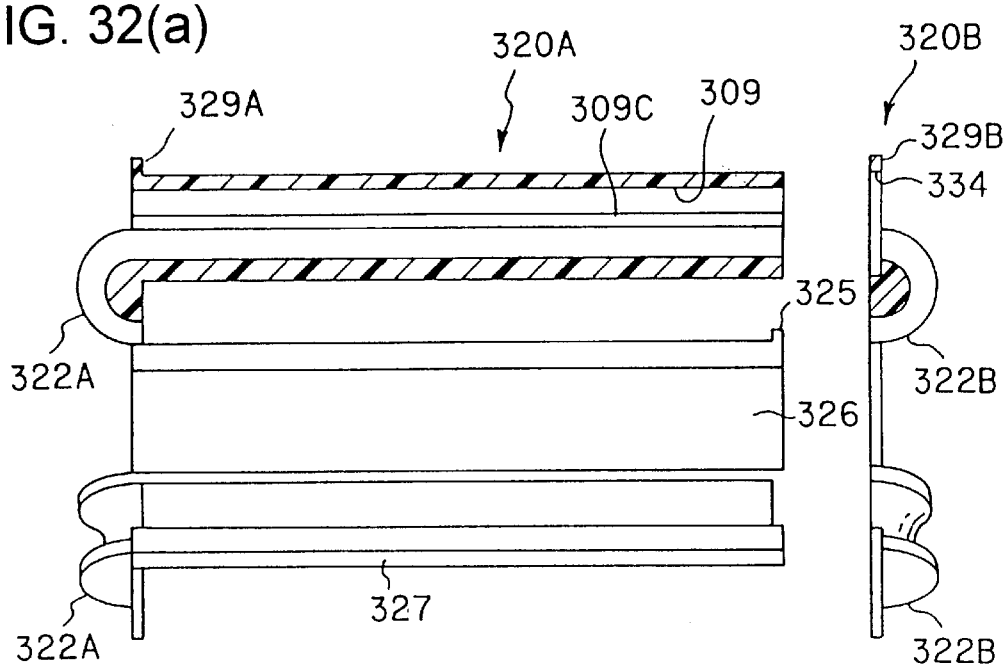
FIG. 32(a) is a disassembling side view having a partial cross-section, illustrating the resin-formed body for the ball circulation passage as shown in FIG. 31.
Figure 32B:
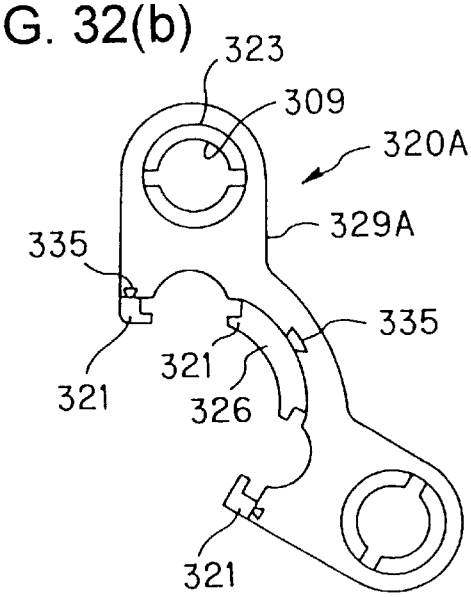
FIG. 32(b) is a view illustrating the first resin frame as shown in FIG. 32(a), with sight being placed on the divided end side thereof
Figure 32C:
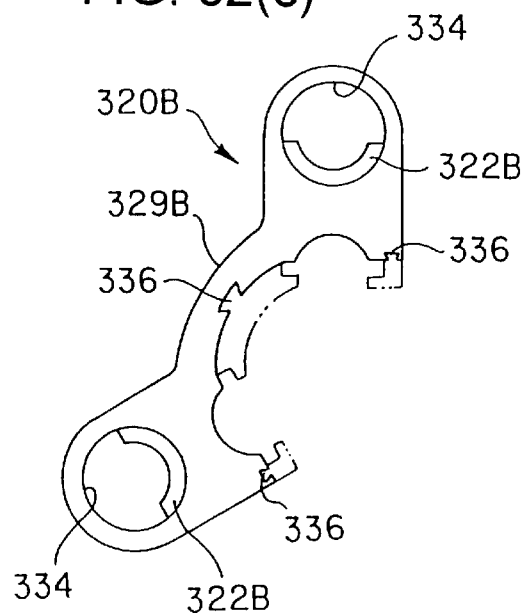
FIG. 32(c) is a view illustrating the second resin frame as shown in FIG. 32(a), with sight being placed on the divided end side thereof.

FIGS. 31 and 32 show the first modification of the resin-formed body 320 for forming the ball circulation passage, which is described in the third embodiment.

In the first modification, the resin-formed body 320 for forming the ball circulation passage is composed of the first resin-formed frame 320A, which is obtained by integrally connecting both of the ball passage forming portions 321, 321 and the resin pipes 323 at their ends with the direction changing passage-inner guide forming portions 322A for one side, and the second resin-formed frame 320B, which is provided with the direction changing passage-inner guide forming portions 322B for the other side and separately formed from the first resin-formed frame 320A.

In this case, the ball passage forming portion s 321, 321 are integrally connected with the direction changing passage-inner guide forming portions 322A through the thin sheet portion 329A as in the first embodiment.

The direction changing passage-inner guide forming portions 322A are also integrally connected with the resin pipes 323 through the thin sheet portion 329A. In this case, the resin pipe 323 is formed into a tubular integral body, although the half pipe members are used in the third embodiment. Accordingly, there exists no inserting hole s34 in the thin sheet portion 329A, and the ball returning passage 309 is exposed on the thin sheet portion 329A.

The first resin-formed frame 320A and the second resin-formed frame 320B are connected, as shown in FIG. 32, by means of a joint method using the combination of a recess and a projection to be inserted therein, such as a faucet joint method. In the illustrated example, a recess portion 336 of a dove-tail groove is formed in the second resin-formed frame 320B, and an engaging projection 335 to be engaged with the recess portion 336 is formed, on the other hand, in the ball passage forming portions 321, 321.

In this case, the resin pipe 323 of the first resin-formed frame 320A is inserted in the through-hole 314 of the main body 313, and the ball passage forming portions 321, 321 and the connecting plate portion 236 are inserted along the inner surface of the recess 307 of the main body 313.

Then, the engaging projections 335 formed at the respective free end portions of the ball passage forming portions 321, 321 and the connecting plate portion 326 are engaged with the recess portions 336 formed on the thin sheet portion 329B of the second resin-formed frame 324B, which is arranged on the other end surface of the main body 313.

The recess portions 336 may be formed on the first resin-formed frame 320A and the engaging projections 335 may be formed on the second resin-formed frame 320B. The connecting method is not limited to the method described above, and there may be used any conventional connecting method, in which the ends of the divided parts can be maintained in a proper connecting position and connected.

Second Modification

Figure 33:
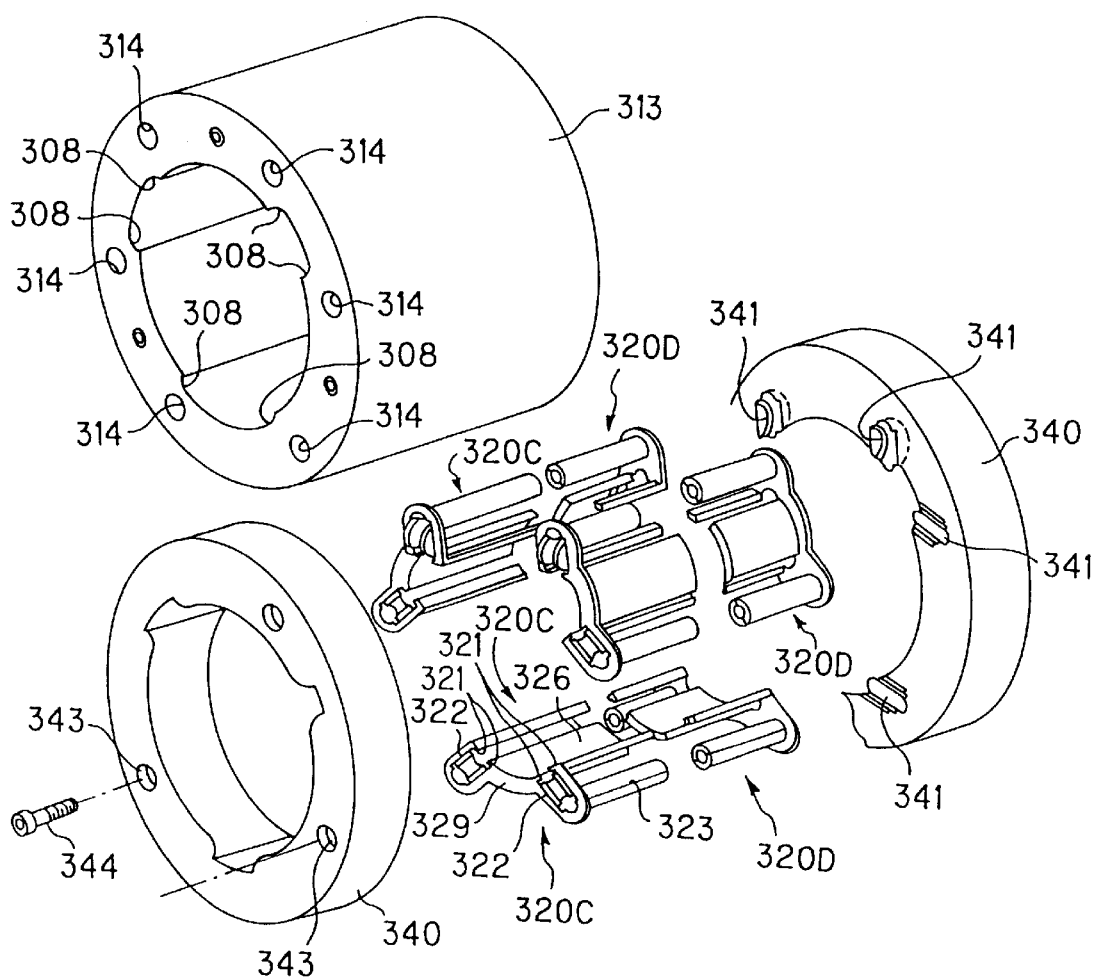
FIG. 33 is a schematic disassembling perspective view illustrating the second modification of the resin-formed body for forming the ball circulation passage in the third embodiment of the present invention.
Figure 34A:
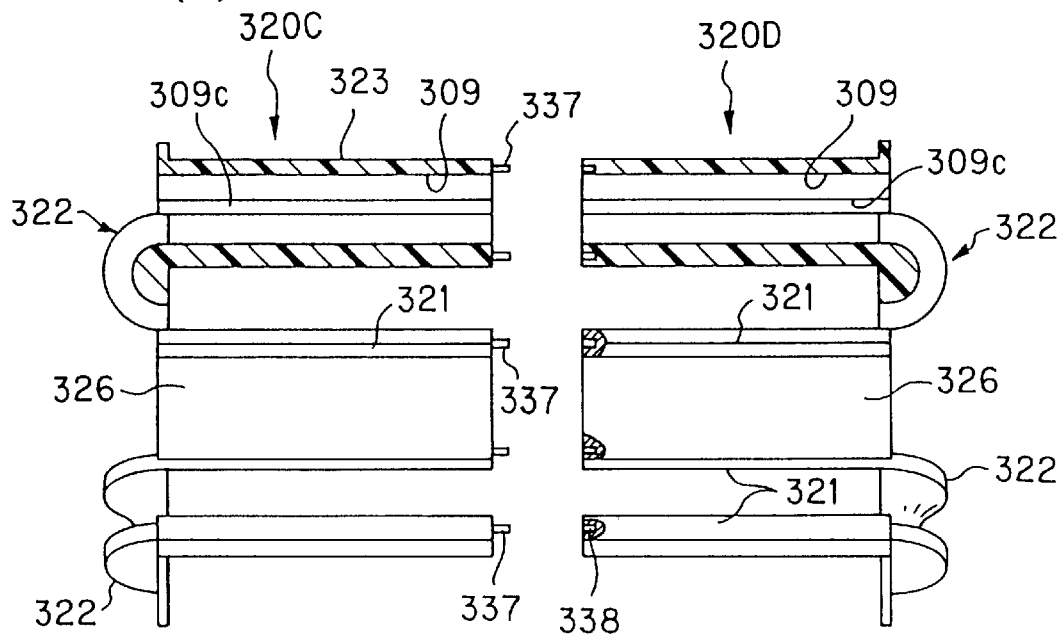
FIG. 34(a) is a disassembling side view having a partial cross-section, illustrating the resin-formed body for the ball circulation passage as shown in FIG. 33.
Figure 34B:
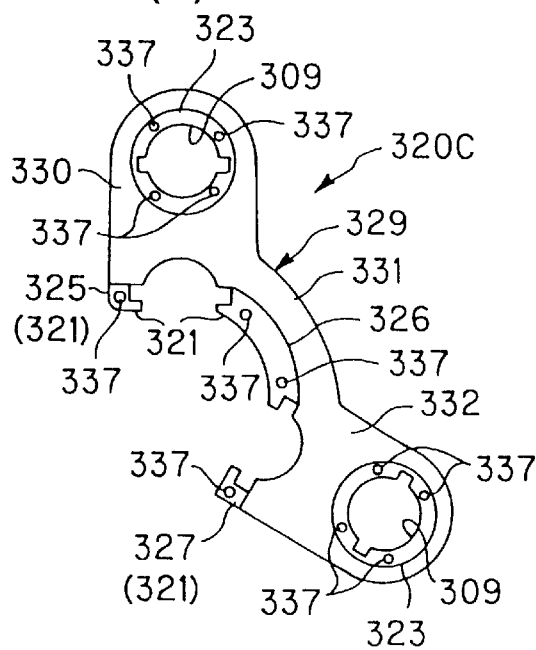
FIG. 34(b) is a view illustrating one resin frame as shown in FIG. 34(a), with sight being placed on the divided end side thereof
Figure 34C:
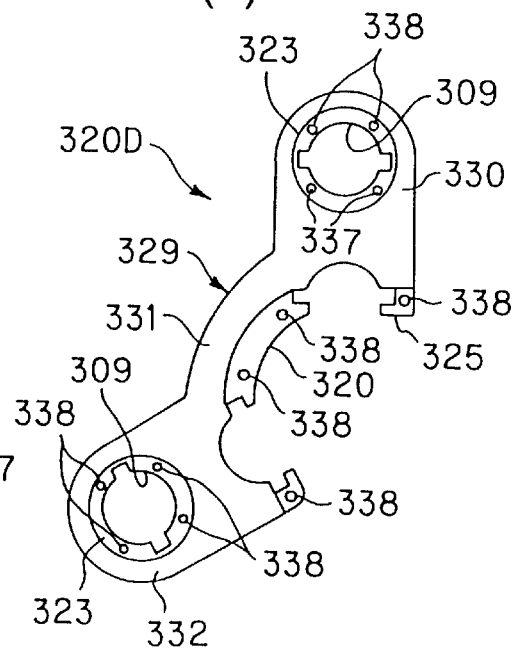
FIG. 34(c) is a view illustrating the other resin frame as shown in FIG. 34(a), with sight being placed on the divided end side thereof.

FIGS. 33 and 34 show the second modification of the resin-formed body 320 for forming the ball circulation passage, which is described in the third embodiment.

In the second modification, the resin-formed body 320 for forming the ball circulation passage, which has been obtained by integrally forming both of the ball passage forming portions 321, 321 and the resin pipes 323 as a returning passage forming portion with a pair of direction changing passage-inner guide forming portions 322, 322, is divided at the middle portion of each of the ball passage forming portions 321, 321 and the ball returning passage forming portions 323 into two parts. More specifically, the ball passage forming portions 321, 321 and the ball returning passage forming portions 323 are divided at their middle portion into the respective two half parts, and each of the thus divided two half parts is integrally formed with the direction changing passage-inner guide forming portions 322, 322, thus forming two resin-formed frames 320C, 320D having substantially the same shape.

Recess portions 338 and engaging projections 337 to be inserted therein are formed on the divided ends of the ball passage forming portions 321, 321, the divided ends of the central connecting plate portion 326 and the divided ends of the resin pipes 323.

Third Modification

Figure 35:
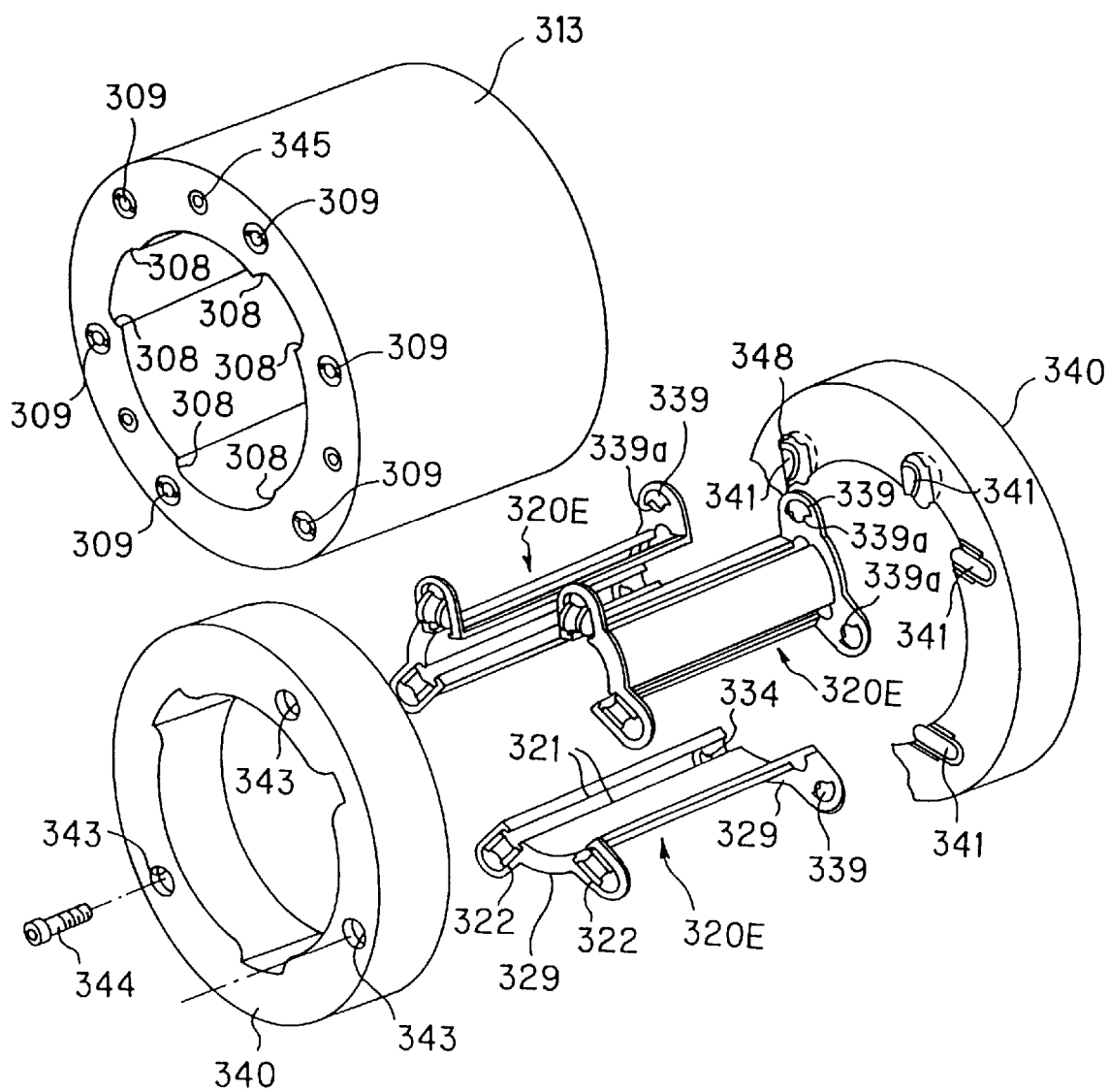
FIG. 35 is a schematic disassembling perspective view illustrating the third modification of the resin-formed body for forming the ball circulation passage in the third embodiment of the present invention.

FIG. 35 shows the third modification of the resin-formed body 320 for forming the ball circulation passage, which is described in the third embodiment.

In the third modification, there is not used the resin pipe 323 as a returning passage forming portion described in the first embodiment, and a resin-formed frame 320E is obtained by integrally forming the ball passage forming portions, the connecting plate portions 326 with the thin sheet portions 329, 329 each having the pair of direction changing passage-inner guide forming portions 322, 322. The ball returning passage 309 is composed as a through-hole formed in the main body 313.

In this case, an engaging projection 339a, which is engageable with a tapered portion 315 formed in the opening end of the ball returning passage 309 may be formed in the opening end of the ball hole 339 of the thin sheet portion 329. Such a construction permits to make a proper connection of the end of the ball returning passage 309 and the direction changing passage-inner guide forming portion 322.

In the illustrated example, an arcuate engaging projection 348 is additionally formed on the connection portion of the outer guide groove 310b formed on the side cover plate 340 with the ball returning passage 309. The engaging projection 48 can be engaged with the thin sheet portion 329.

Fourth Modification

Figure 36:
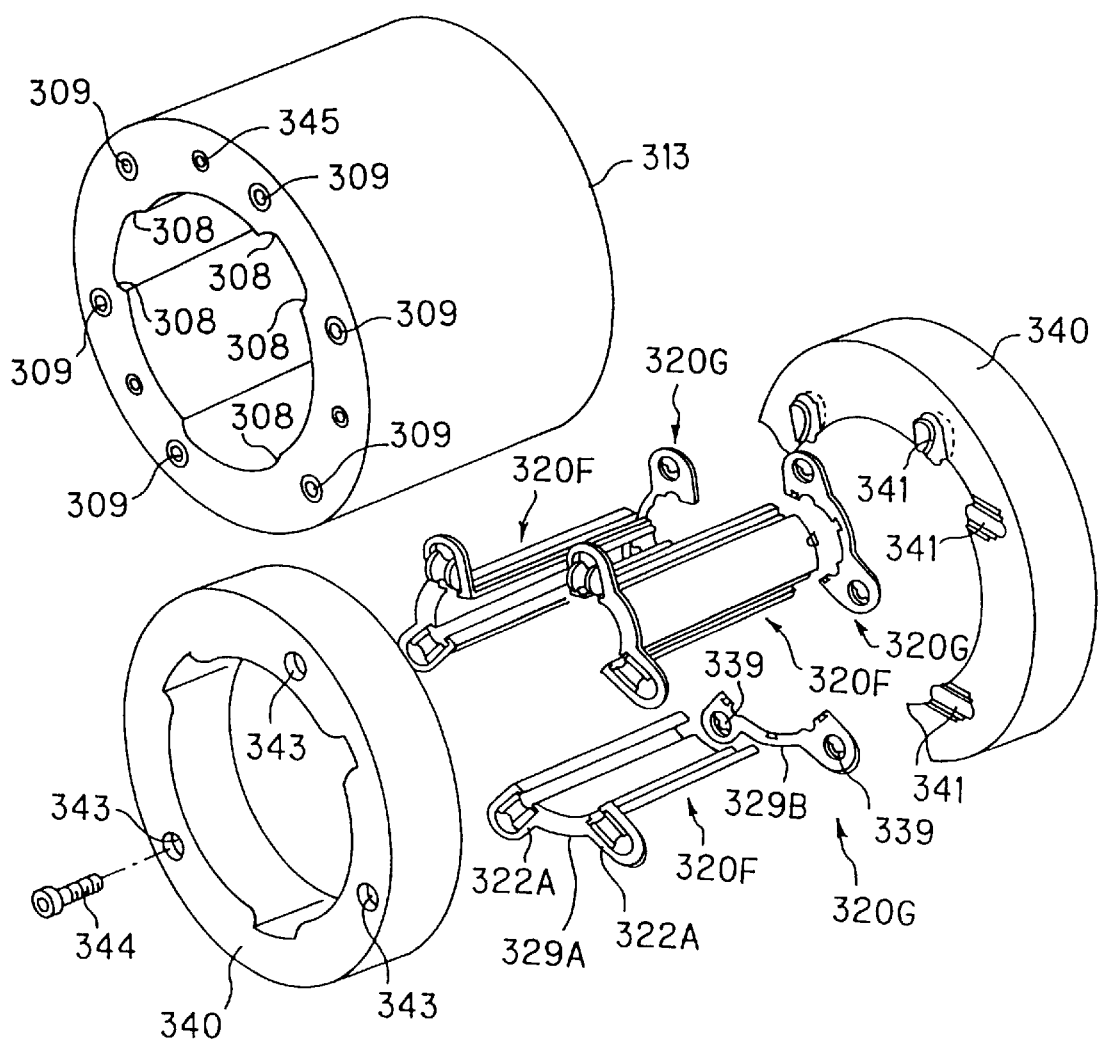
FIG. 36 is a schematic disassembling perspective view illustrating the fourth modification of the resin-formed body for forming the ball circulation passage in the third embodiment of the present invention.

FIG. 36 shows the fourth modification of the resin-formed body 320 for forming the ball circulation passage, which is described in the third embodiment.

In the fourth modification, there is not used the resin pipe 323 described in the third modification, a resin-formed frame 320F is obtained by integrally forming the ball passage forming portions 321 with the direction changing passage-inner guide forming portions 322 for the one side, the other resin-formed frame 320G provided with the direction changing passage-inner guide forming portions 322 for the other side is separately formed from the above-mentioned resin-formed frame 320F, and the resin-formed frames 320F, 320G are connected with each other by engagement of the engaging projection 335 with the recess 336. The structure other than the above-mentioned construction is the same as that of the third modification.

In the third embodiment described above, there are used three sets of resin-formed bodies for forming the ball circulation passage, each of which is divided into two parts. Six sets of resin-formed bodies may however be used for the respective circulation passages. The single set of resin-formed body may also be used. In this case, the divisional method of the resin-formed body should be based on the first, second and fourth modifications described above, taking into consideration the difficulty of insertion of the resin-formed body into the main body of the outer tube.

Modifications of the Ball Train

Figure 37:
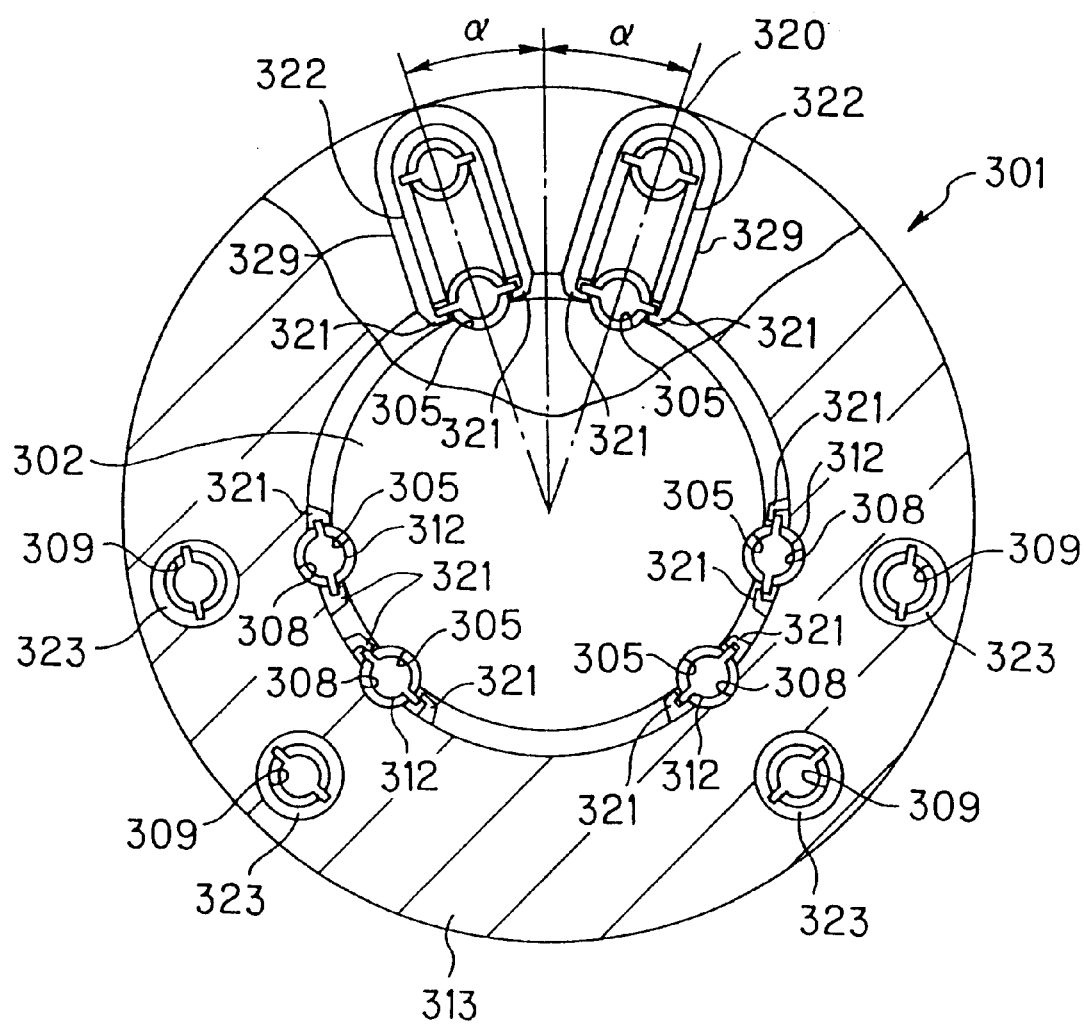
FIG. 37 is a front view having a partial cross-section, illustrating the another embodiment of arrangement of the trains of balls in the ball spline as the linear motion guiding apparatus of the third embodiment of the present invention.

In the third embodiment and the first to fourth modifications thereof, the ball spline has the angular contact type ball train. The present invention may also be applied to the ball spline having the radial contact type ball train as shown in FIG. 37. In such a radial contact type ball train, the spline shaft has no projections on the outer periphery so as to reveal the circular cross-section, and the outer tube has no recesses on the inner periphery so as to reveal the hollow cylindrical shape. The radial contact type ball train has the smaller contact angle α than that of the angular contact type ball train. With respect to the divisional method of the resin-formed body 320 for forming the ball circulation passage, all the patterns described in the third embodiment and the first to fourth modifications thereof may be used.

In the example illustrated in FIG. 37, six resin-formed bodies 320 for forming the ball circulation passage are separately provided from each other for the respective six ball trains. The two sets of resin-formed bodies 320 mentioned above may be integrally formed with each other so as to prepare three sets of resin-formed bodies 320 having the six ball circulation passages. The single resin-formed body having the six ball circulation passages may also be used.

Fourth Embodiment

Figure 38A:
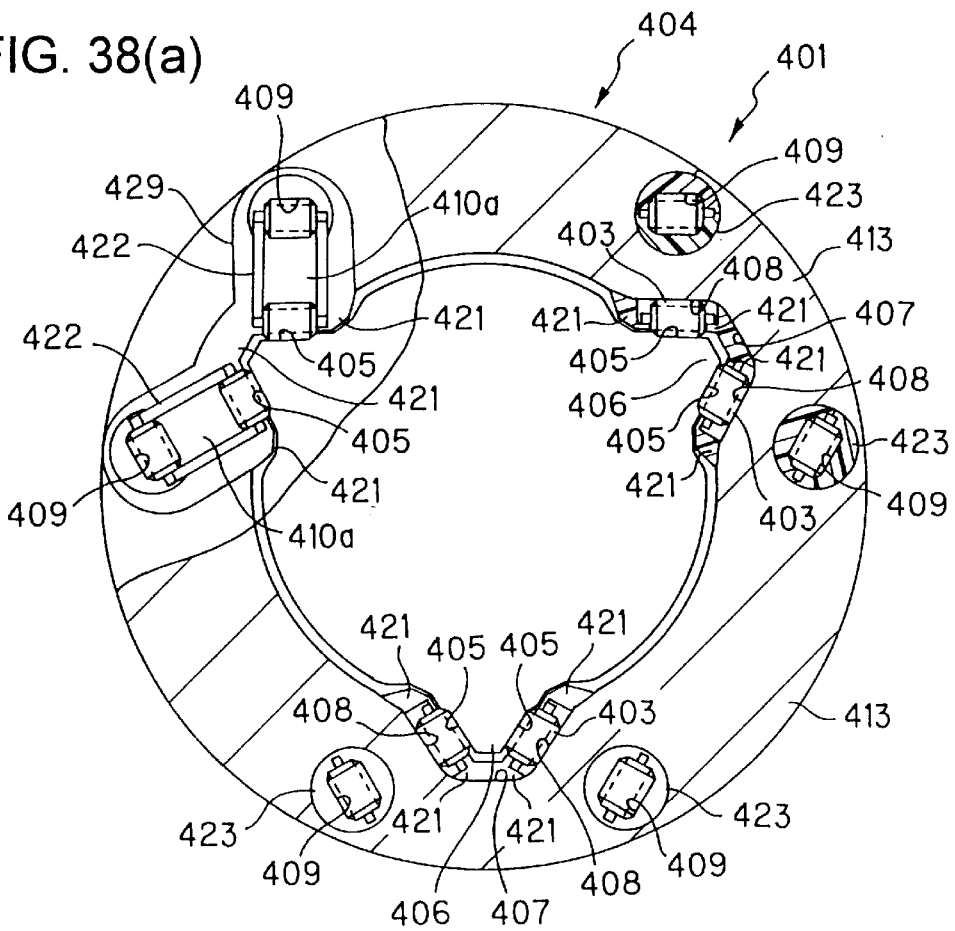
FIG. 38(a) is a front view having a partial cross-section, illustrating a roller-spline as the linear motion guiding apparatus of the fourth embodiment of the present invention, in which a side cover plate is removed.
Figure 38B:
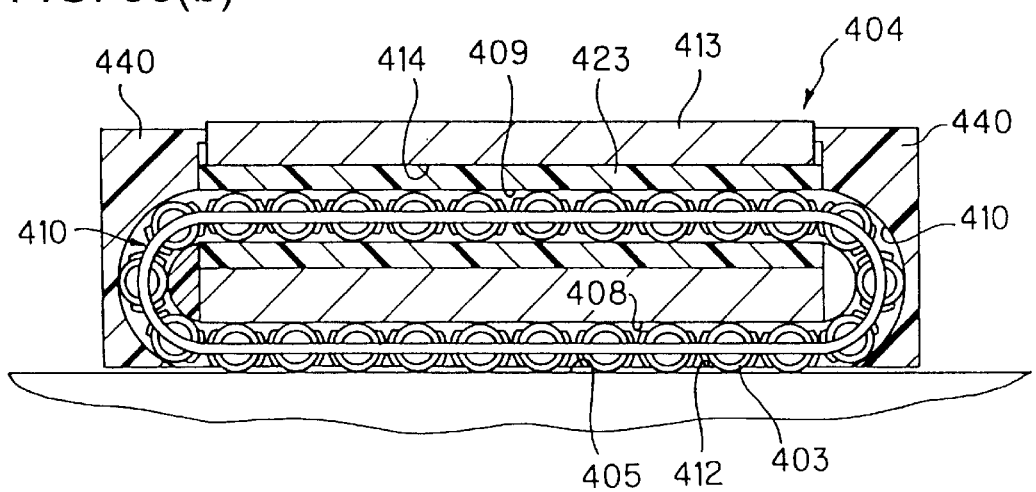
FIG. 38(b) is a longitudinal partial cross-sectional view of one roller circulation passage as shown in FIG. 38(b)
Figure 39A:
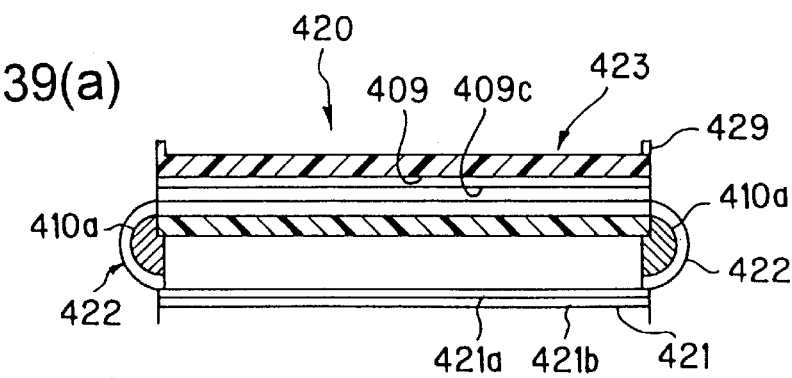
FIG. 39(a) is a partial cross-sectional view illustrating the constructional example of the resin-formed body for forming the roller circulation passage of the roller spline as shown in FIG. 38, and FIGS. 39(b) to 39(e) are views illustrating the first to fourth modifications of the resin-formed body for forming the roller circulation passage.
Figure 39B:
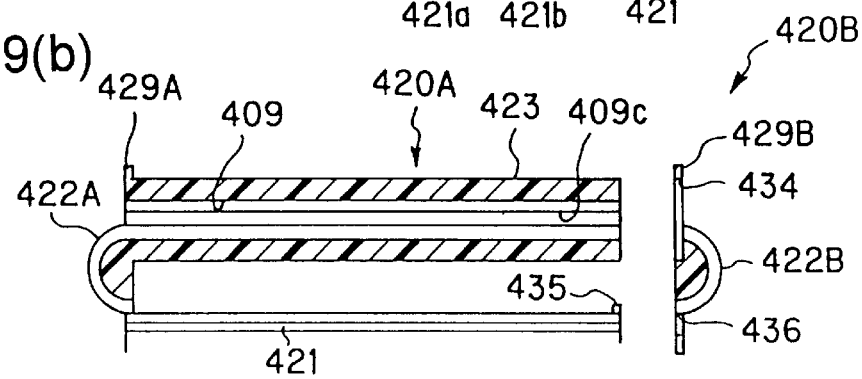
Figure 39C:
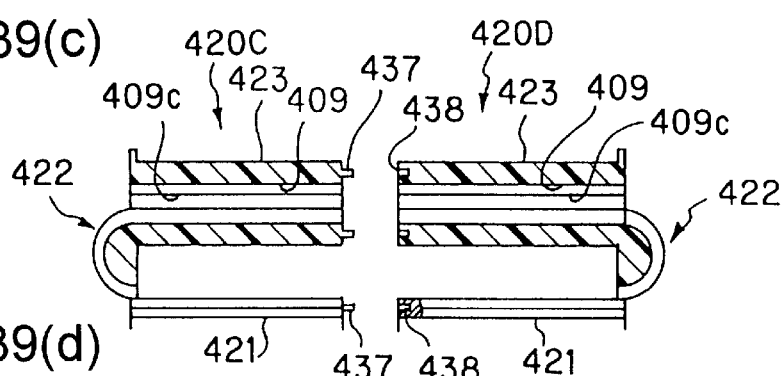
Figure 39D:
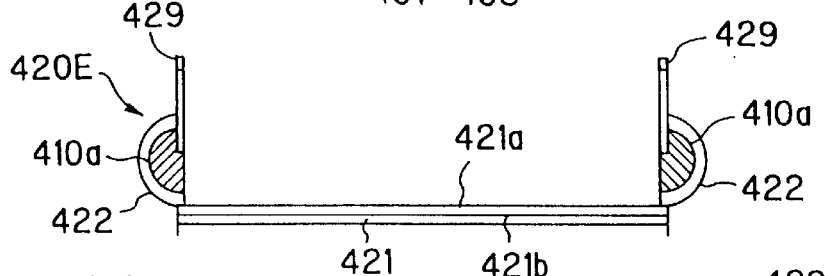
Figure 39E:
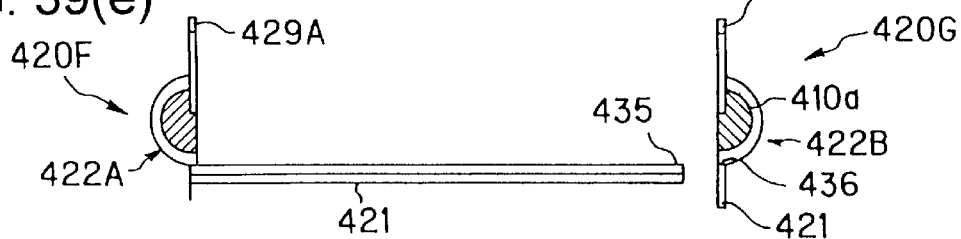
Figure 40A:
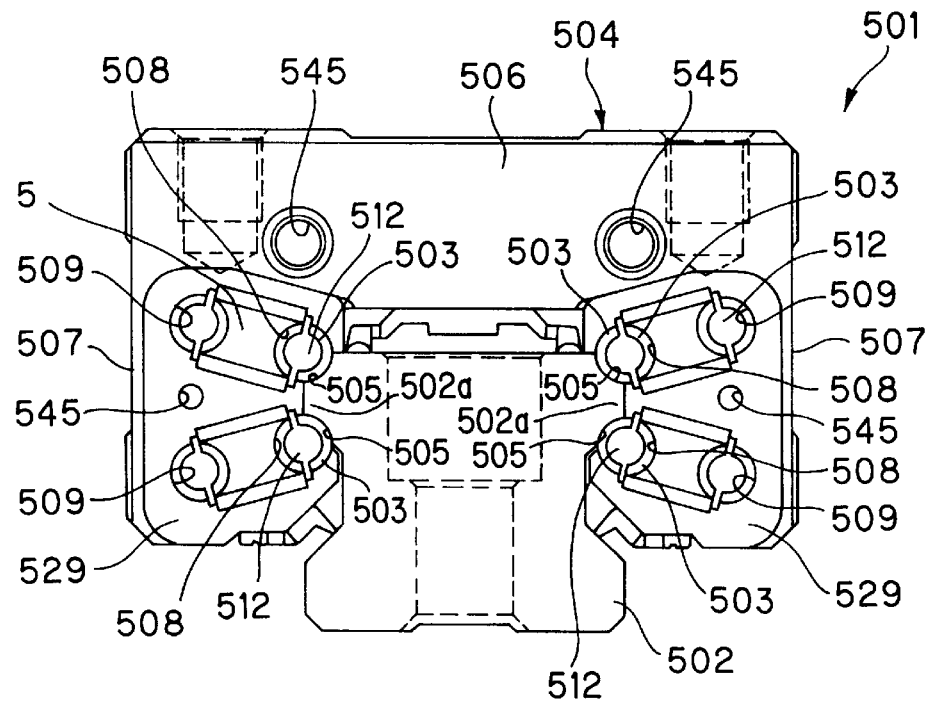
FIG. 40(a) is a front view of the movable block of the linear motion guiding apparatus of the fourth embodiment of the present invention, in which the side cover plate is removed.
Figure 40B:
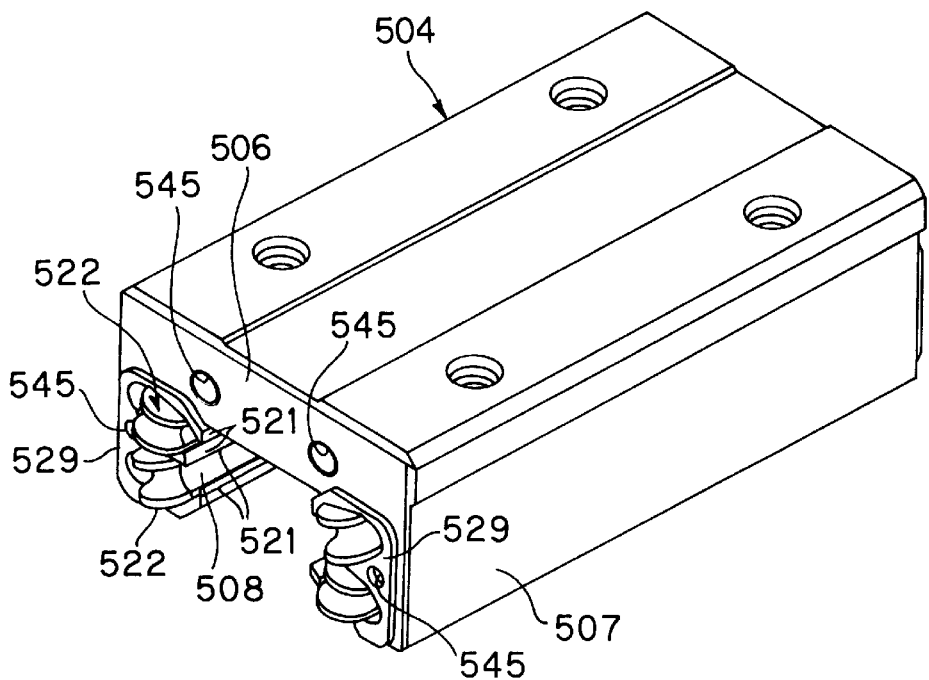
FIG. 40(b) is a perspective view of the movable block as shown in FIG. 40(a)

FIGS. 38 and 39 illustrate the forth embodiment of the present invention. In the fourth embodiment, the present invention is applied to a roller spline, in which rollers are used as the rolling members.

The roller spline 401 as shown in FIG. 38 is composed of a spline shaft 402 as a guide member extending linearly, and an outer tube 404 arranged so as to be movable along the spline shaft 402 through the rollers 403 as the rolling members.

The spline shaft 402 is formed into a long bar shape having a modified cross-section. The spline shaft 402 has on its outer periphery three projections 406. Two roller running surfaces 405, 405 are formed on the both sides of each of the projections 406, so as to provide the total number of running surfaces of six.

The outer tube 404 has on its inner periphery three recesses 407 corresponding to the projections 406 of the spline shaft 402, respectively. Roller running counter-surfaces 408, 408 are formed at the both corners of each of the recesses 407, so as to correspond to the above-mentioned roller running surfaces 405, 405.

In addition, the outer tube 404 has six roller returning passage 409, 409; 409, 409; 409, 409, which are in parallel with the six roller running counter-surfaces 408, 408; 408, 408; 408, 408, and six direction changing passages 410, 410; 410, 410; 410, 410 formed into a U-shaped tube, which connect the ends of the above-mentioned roller running counter-surfaces 408, 408; 408, 408; 408, 408 with the ends of the above-mentioned roller returning passage 409, 409; 409, 409; 409, 409. The outer tube 404 has six circulation passages in this manner.

The rollers 403 inserted in each of the circulation passages are connected with each other by means of the same roller retainer 412 as the roller retainer 212 shown in FIG. 19, so as to form the train of the rollers 403. The rollers 403 are guided by means of the roller retainer 412 and circulated in each of the circulation passages.

The outer tube 404 is composed of a tubular main body 413 having the roller running counter-grooves 408, 408; 408, 408; 408, 408, three resin-formed bodies 420, 420, 420 for forming the ball circulation passage, which are to be inserted in the main body 413, and a pair of side cover plates 440, 440 secured on the both ends of the main body 413 after the insertion of the resin-formed bodies 420, 420, 420 in the main body 413.

In the fourth embodiment, the six circulation passages are formed by the three resin-formed bodies 420, 420, 420 as in the third embodiment.

Each of the resin-formed bodies 420 for forming the ball circulation passage has a pair of the roller passage forming portions 421, 421 extending along the longitudinal side edges of the roller running counter-groove 408, a pair of direction changing passage-inner guide forming portions 422, 422 provided on the both ends of the main body 413, and resin pipes 423 as a returning passage forming portion, which are inserted in through-holes formed in the main body 413.

The roller passage forming portions 421, 421 are provided with guide grooves for guiding the both side edges of the belt portion 412*b* of the roller retainer 412 in a loaded area. The guide grooves can prevent the roller retainer 412 not only from being swung during run of the roller, but also from being sagged by engaging the side edges of the belt portion 412*b* with the guide groove 421*a*, when the outer tube 404 is removed from the spline shaft 402. The rollers 403 are supported by the roller retainer 412. More specifically, the roller retainer 412 is supported by a jaw portion of the guide groove 421*a*, with the result that the rollers 403 are kept in its proper position so as not to come off the outer tube 404.

Guide grooves 409*c*, 410*c* are also formed in the roller returning passage 409 and the direction changing passage 410 as non-loaded areas, in order to guide the side edges of the belt portion 412*b*. The guide grooves 409*c*, 410*c* are connected to the above-mentioned guide groove 421*a* in the loaded area so as to form an endless groove on the entire periphery.

When the roller retainer 412 is not used, the guide grooves 421*a*, 410*a*, 409*a* are not needed, and the jaw portions as shown in FIG. 20(*h*) for supporting the ends of the roller are formed on the roller passage forming portions 421.

In each of the resin-formed bodies 420 for forming the roller circulation passage, at least one of four connecting portions of the roller passage forming portions 421, 421 with the pair of the direction changing passage-inner guide forming portions 422, 422 are integrally connected with each other. The resin-formed body 420 is divided at the other portions into separate parts so as to be able to be inserted in the main body 413.

The fundamental embodiment of the resin-formed body for forming the roller circulation passage, which is to be used for the spline unit is described in detail in the third embodiment. The structure of the resin-formed body for forming the roller circulation passage is described in detail in the second embodiment. Here, only the fundamental divisional pattern of the resin-formed body 420 for forming the roller circulation passage will be briefly described below with reference to FIG. 39.

In FIG. 39(*a*), the both ends of the four sets of roller passage forming portions 421, 421 are integrally connected with the respective one end of the pair of direction changing passage-inner guide forming portions 422, 422 to form a single resin frame 424, and the both ends of each of the returning passage forming portions 423 are not connected with the other end of the direction changing passage-inner guide forming portion 422 so that these parts can be assembled into the main body 413.

In FIG. 39(*b*), the resin-formed body 420 for forming the roller circulation passage is composed of the first resin-formed frame 420A, which is obtained by integrally connecting both of the roller passage forming portions 421, 421 and the resin pipes 423 as a returning passage forming portion at their ends with the direction changing passage-inner guide forming portions 422A for one side, and the second resin-formed frame 420B, which is provided with the direction changing passage-inner guide forming portions 422B for the other side and separately formed from the first resin-formed frame 420A.

In FIG. 39(*c*), the resin-formed body 420 for forming the roller circulation passage, which has been obtained by integrally forming both of the roller passage forming portions 421, 421 and the resin pipes 423 as a returning passage forming portion with a pair of direction changing passage-inner guide forming portions 422, 422, is divided at the middle portion of each of the roller passage forming portions 421, 421 and the returning passage forming portions 423 into two parts. More specifically, the roller passage forming portions 421, 421 and the resin pipes 423 are divided at their middle portion into the respective two half parts, and each of the thus divided two half parts is integrally formed with the direction changing passage-inner guide forming portions 422, 422, thus forming two resin-formed frames 420C, 420D having substantially the same shape.

In FIG. 39(*d*), there is not used the resin pipe 423 as shown in FIG. 39(*a*), and a resin-formed frame 420E is obtained by integrally forming both of the roller passage forming portions and the connecting plate portion 326 with the thin sheet portions 429, 429 each having the pair of direction changing passage-inner guide forming portions 422, 422. The roller returning passage 409 is composed as a through-hole formed in the main body 413.

In FIG. 39(*e*), there is not used the resin pipe 423 as shown in FIG. 39(*b*), and a resin-formed frame 420F is obtained by integrally forming the roller passage forming portions 421 with the direction changing passage-inner guide forming portions 422 for the one side, the other resin-formed frame 420G provided with the direction changing passage-inner guide forming portions 422 for the other side is separately formed from the above-mentioned resin-formed frame 420F.

In FIGS. 39(*a*) to 29(*e*), the resin-formed frames are connected with each other by means of the conventional joint method such as a faucet joint, which uses engagement of the engaging projection with the recess.

Fifth Embodiment

FIGS. 40 to 44 show a linear motion guiding apparatus of the fifth embodiment of the present invention.

The linear motion guiding apparatus 501 is provided with a guide rail 502 as a guide member, which extends linearly, and a movable block 504 as a movable member, which is arranged so as to be movable along the guide rail 502 through a large number of balls 503 as rolling members.

The guide rail 502 is formed into a long bar shape having a rectangular cross-section. Two ball running grooves 505, 505 as a rolling member running track are formed on each of the right and left-hand side surfaces of the guide rail 502, so as to provide a total number of grooves 505 of four. The guide rail 502 has on each of its side surfaces a projection 502*a*, on the upper and lower positions of which the ball running grooves 505, 505 are arranged.

The movable block 504 is formed as a block body having an inverse U-shaped cross-section, with its opening end being directed downwardly. The block body is provided with a horizontal portion 506, which faces the upper surface of the guide rail 502 and with a pair of wing portions 507, 507, which extend downwardly from the right and left ends of the horizontal portion 506 and face the right and left-hand side surfaces of the guide rail 502, respectively. Each of the wing portions 507, 507 has on its inner surface two ball running counter-grooves 508, 508 as a rolling member running counter-track, which correspond to the ball running grooves 505, 505 formed on the right and left-hand side surfaces of the guide rail 502.

Each of the right and left-hand wing portions 507, 507 of the movable block 504 has two ball returning passage forming portions 509, 509 formed therein, which extend in parallel with the ball running counter-grooves 508, 508. At both the longitudinal ends of each of the wing portions 507, 507, there are arranged direction changing passages 510, 510; 510, 510 for connecting the ends of the ball running counter-grooves 508, 508; 508, 508 with the ends of the ball returning passage 509, 509; 509, 509. In summary, each of the wing portions 507, 507 of the movable block 504 has two endless circulation passages, in which the balls 503 are circulated, so as to provide the total number of passage of four.

In each of the four endless circulation passages in this embodiment, the balls 503 are retained in the form of train by means a ball retainer 512 as a rolling member retainer so that the balls 503 can be circulated while being guided by the ball retainer 512.

Figure 44A:
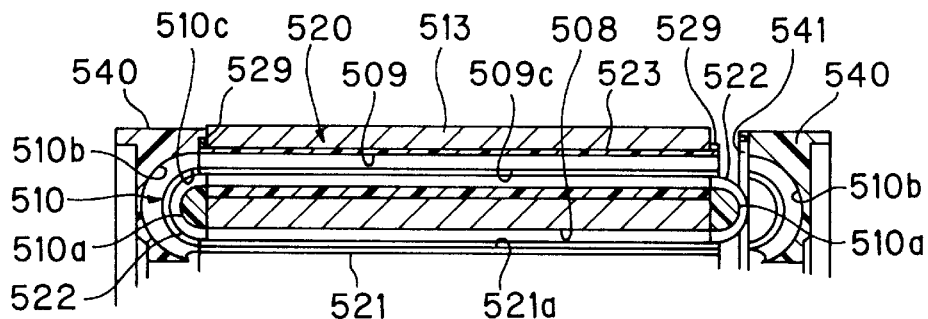
FIG. 44(a) is a cross-sectional view of one ball circulation passage, in which the ball retainer is removed from the movable block as shown in FIG. 40(a)
Figure 44B:
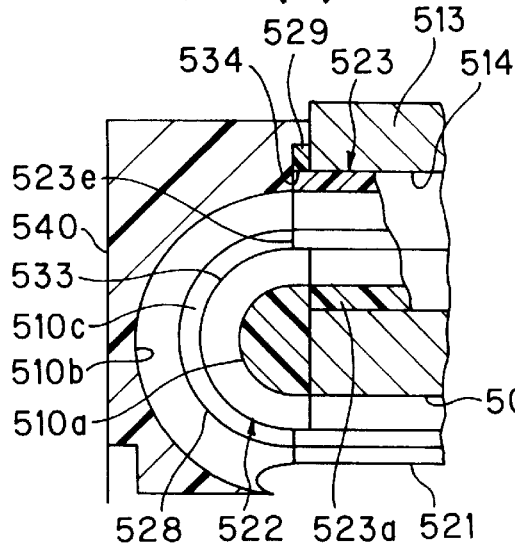
FIG. 44(b) is an enlarged partial view of the direction changing passage as shown in FIG. 44(a)
Figure 44F:
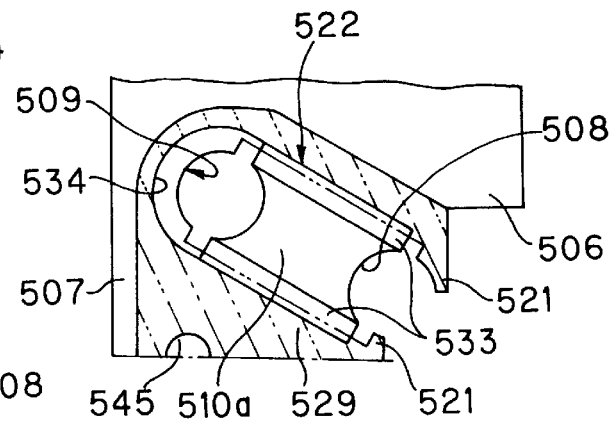
FIG. 44(f) is a partial side view of the direction changing passage as shown in FIG. 44(b), in which the side cover plate is removed.
Figure 44G:
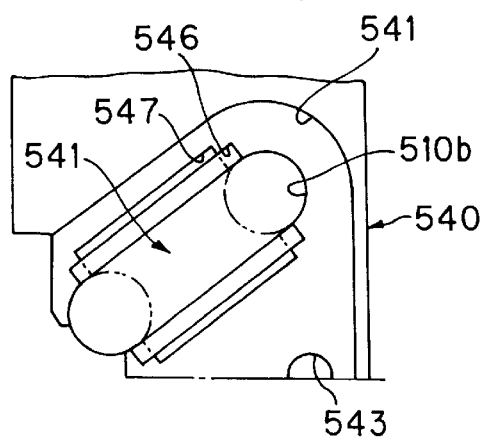
FIG. 44(g) is a partial side view illustrating a recess portion, which forms the direction changing passage in the side cover plate as shown in FIG. 44(b).
Figure 44C:
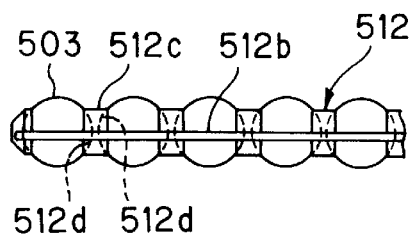
FIG. 44(c) is a partial side view of the ball retainer.
Figure 44D:
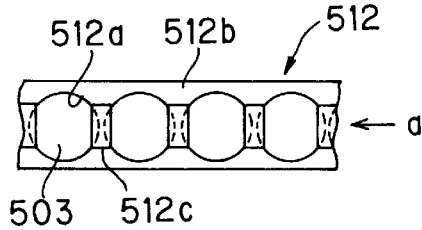
FIG. 44(d) is a plan view of the ball retainer as shown in FIG. 44(c)
Figure 44E:
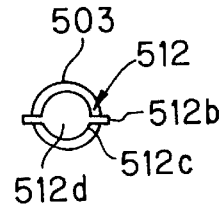
FIG. 44(e) is a view of the ball retainer, with sight being placed in a direction of an arrow of "a" as indicated in FIG. 44(d)

As shown in FIGS. 44(c) to 44(e), the ball retainer 512 comprises a flexible belt portion 512b, which is provided with ball holes 512a for respectively receiving the balls 503, and spacing portions 512c provided between the adjacent two balls 503, 503. The belt portion 512b has a width longer than the diameter of the ball 503 so that the both side edges of the belt portion 512b extend outwardly from the ball 503.

The spacing portion 512c is provided with a ball supporting spherical recess 512d corresponding to the spherical surface of the ball 503. The ball 503 is supported on its both sides by a pair of supporting spherical recesses 512d so as to prevent the ball 503 from coming off the belt portion 512b. In this embodiment, the one end of the belt portion 512b is not connected to the other end thereof, thus forming a strip-shaped belt having the both ends. The one end of the belt portion 512b may be connected to the other end thereof so as to form an endless belt.

Figure 41:
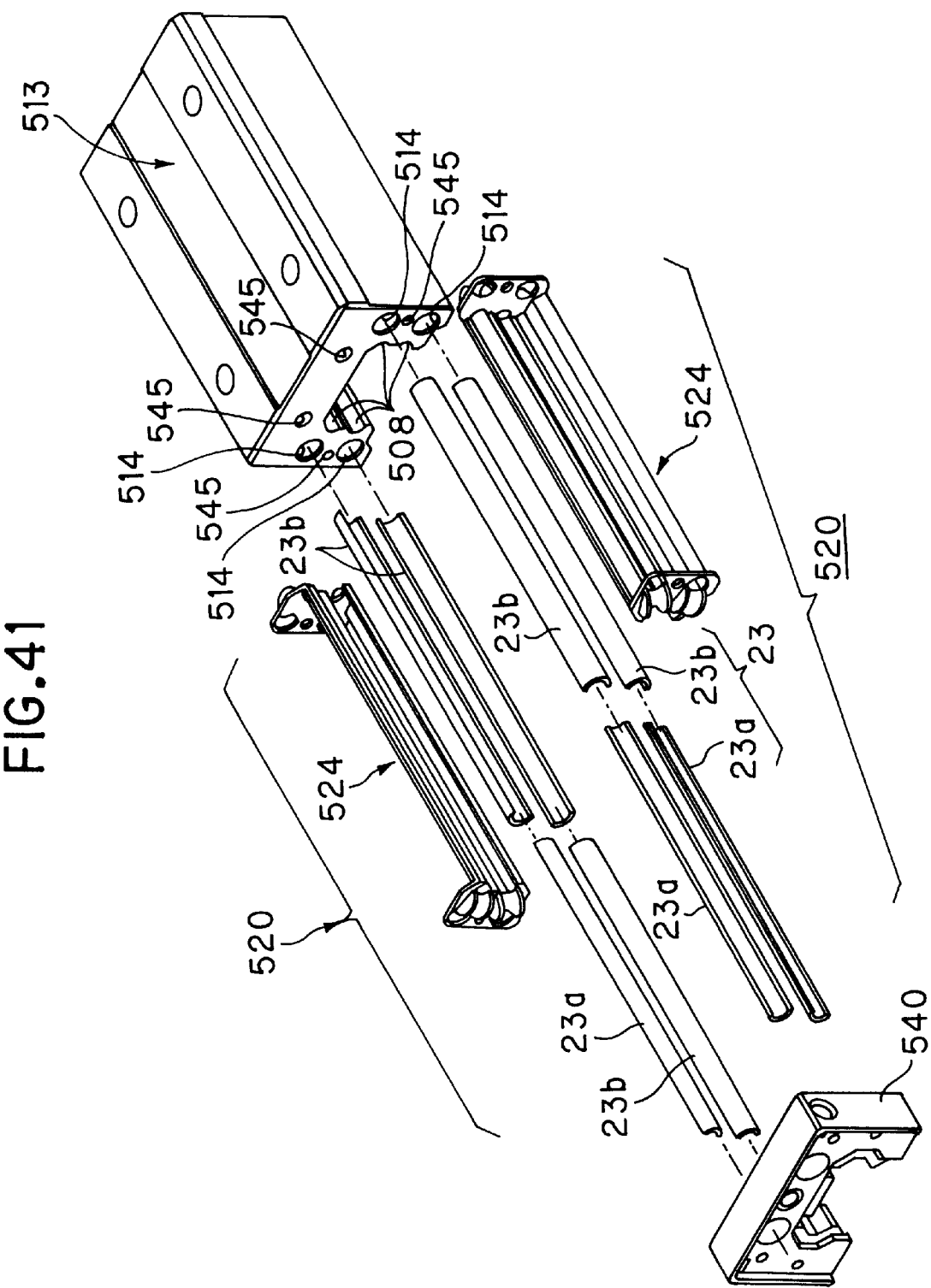
FIG. 41 is a schematic disassembling perspective view of the resin-formed bodies for forming the ball circulation passage as shown in FIG. 40.

As shown in FIG. 41, the movable block 504 is composed of a block body 513 having ball running counter-grooves 508, 508, 508, 508, a pair of right and left-hand resin-formed bodies 520, 520 for forming ball circulation passages, which is inserted in the block body 513, and a pair of side cover plates 540 (only one cover plate 540 is illustrated) secured to the both end surfaces of the block body 13, in which the resin-formed bodied 520, 520 are inserted.

Each of the right and left-hand resin-formed bodies 520, 520 for forming the ball circulation passage forms two endless circulation passages. The right and left-hand resin-formed bodies 520, 520 have the symmetrical shape. One of them will be described below and the description of other thereof will be omitted.

More specifically, the resin-formed body 520 for forming the ball circulation passage is composed of a resin frame 524 obtained by integrally forming the ball passage forming portions 521, 521 extending along both longitudinal sides of the ball running counter-groove 508 with the pair of direction changing passage-inner guide forming portions 522, 522 (see FIG. 42); and a pair of resin pipes 523, 523 as a returning passage forming portion, which are to be inserted in through-holes 514, 514 formed in the block body 513 (see FIG. 43). The ball passage forming portions 521, 521 are integrally formed with the pair of direction changing passage-inner guide forming portions 522, 522 to form the resin frame 524 as an integral body, and the pair of resin pipes 523, 523 are separately formed from such an integral body, so that these parts can be assembled into the block body 513.

Figure 42A:
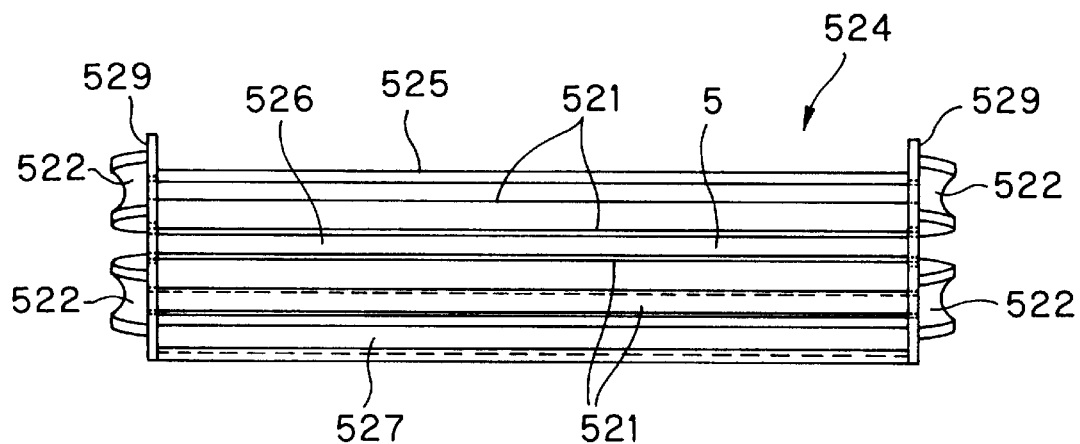
FIG. 42(a) is a front view of the resin frame composing the resin-formed body for forming the ball circulation passage, as shown in FIG. 41.
Figure 42B:
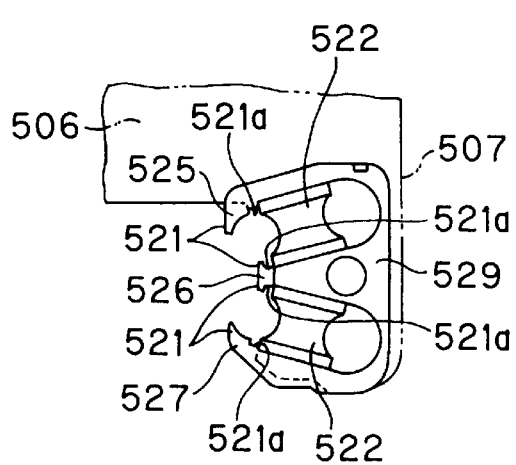
FIG. 42(b) is a left-hand side view of the resin-formed body as shown in FIG. 42(a) and FIG. 42(c) is a right-hand side view of the resin-formed body as shown in FIG. 42(a)
Figure 42C:
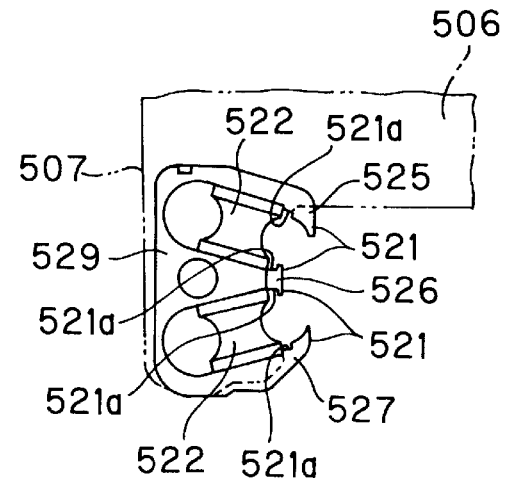

As shown in FIG. 42, the ball passage forming portions 521, 521 are provided with guide grooves for guiding the both side edges of the belt portion 512b of the ball retainer 512 in a loaded area. The guide grooves can prevent the ball retainer 512 not only from being swung during run of the ball, but also from being sagged by engaging the side edges of the belt portion 512b with the guide groove 521a, when the movable block 504 is removed from the guide rail 502. The balls 503 are supported by the ball retainer 512. More specifically, the ball retainer 512 is supported by a jaw portion of the guide groove 521a, with the result that the balls 503 are kept in its proper position so as not to come off the movable block 504.

The distance between the pair of ball passage forming portions 521, 521 arranged in parallel with each other on the both longitudinal sides of the ball running counter-groove 508 is slightly smaller than the diameter of the ball 503. In such a construction, it is possible to prevent the balls 503 from coming off the ball passage forming portions 521, 521 even when the ball retainer 512 is not used.

Guide grooves 509c, 510c are also formed, as shown in FIGS. 44(a) and 44(b), in the ball returning passage 509, 509 and the direction changing passage 510, 510 as non-loaded areas, in order to guide the side edges of the belt portion 512b. The guide grooves 509c, 510c are connected to the above-mentioned guide groove 521a in the loaded area so as to form an endless groove on the entire periphery.

The ball passage forming portions 521, 521; 521, 521 are composed, as shown in FIG. 42(a), of the first connecting plate portion 525 extending longitudinally along the corner between the horizontal portion 506 and the wing portion 507 of the block body 513 in the longitudinal direction of the block body 513; the second connecting plate portion 526 extending longitudinally between the ball running counter-grooves 508, 508 on the inner surface of each of the wing portions 507 of the block body 513; and a pair of third connecting plate portions 527 extending along the under surface of the wing portion 507 of the block body 513 in the longitudinal direction thereof.

The upper edge of the first connecting plate portion 525 and the lower edge of the second connecting plate portion 526, which face to each other, are placed on the opposite longitudinal sides of the upper ball running counter-groove 508 provided in the wing portion 507, so as to form the ball passage forming portions 521, 521. The lower edge of the second connecting plate portion 526 and the upper edge of the third connecting plate portion 527, which face to each other, are placed on the opposite longitudinal sides of the lower ball running counter-groove 508 provided in the wing portion 507, so as to form the ball passage forming portions 521, 521.

As shown in FIGS. 44(a), 44(b) and 44(c), the direction changing passage-inner guide forming portions 522 and the ball passage forming portions 521, 521 are connected by means of the thin sheet portion 529 through integral forming. The resin pipe 523 is inserted in a hole 534 formed on the thin sheet portion 529 so as to make a faucet joint, and fixed to the thin sheet portion 529.

The thin sheet portion 529 has the direction changing passage-inner guide forming portions 522, 522, which are formed so as to project corresponding to the two trains of balls 503, 503 on the side surface of the guide rail 502. The both ends of the first, second and third connecting plate portions 525–527 are connected to the thin sheet portion 529 to be arranged on the end of the block body 513 so as to form the single resin frame 524.

Each of the direction changing passage-inner guide forming portions 522 has a semi-cylindrical shape. On the outer periphery of the direction changing passage-inner guide forming portion 522, there is formed an inner guide groove 510a having a semi-circular cross section so as to form the inner guide portion for the direction changing passage 510. The one end of the inner guide groove 510a is connected to the end of the ball running counter-groove 508. Accordingly, the one end of the inner guide groove 510a has the same cross-sectional shape as the ball running counter-groove 508 so as to make an alignment of the one end of the inner guide groove 510a with the end of the ball running counter-groove 508. The other end of the inner guide groove 510a of the direction changing passage 510 is connected to the end of the ball returning passage 509. Accordingly, the other end of the inner guide groove 510a has the same cross-sectional shape as the ball returning passage 509 so as to make an alignment of the other end of the inner guide groove 510a with the end of the ball returning passage 509.

Cylindrical flange portions 533, 533 are formed on the both ends of the inner guide groove 510a. The distance between the respective outer surfaces of the cylindrical flange portions 533, 533 is larger than the width of the belt portion 512b. The cylindrical flange portions 533, 533 form a retainer-guide groove 510c for the ball retainer 512 in cooperation with a semi-circular recess portion having cutouts, which is formed on the inner periphery of the recess of the side cover plate 5040 described later.

The both ends of the inner guide groove 510a for the direction changing passage 510 extend to the contacting surface of the thin sheet portion 529 with the end surface of the block body 513 so as to be connected to the respective ends of the ball running counter-groove 508 and the ball returning passage 509. Pipe inserting holes 534, 534 having a semi-circular shape, in which the ends of the resin pipes 523 are to be inserted are formed on the thin sheet portion 529.

As shown in FIG. 43, the resin pipe 523 is composed of an outer peripheral side-half pipe member 523b located in the outer peripheral side of the ball circulation passage, which is continuously connected to the outer guide groove 510b for the direction changing passage 510 of the side cover plate 540, and an inner peripheral side-half pipe member 523a located in the inner peripheral side of the ball circulation passage, which is continuously connected to an inner guide groove 510a for the direction changing passage 510 of the side cover plate 540.

Figure 43A:
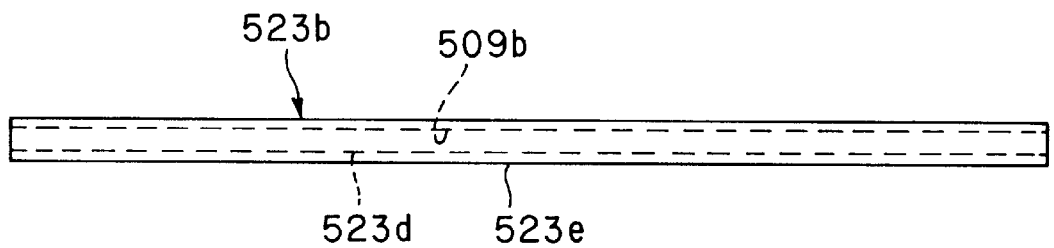
FIG. 43(a) is a front view of an outer peripheral side-half pipe member.
Figure 43B:
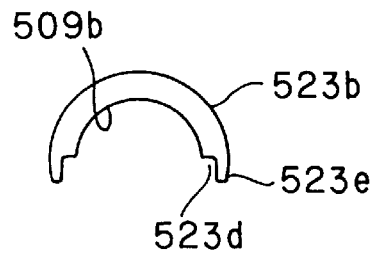
FIG. 43(b) is a side view of the outer peripheral side-half pipe member as shown in FIG. 43(a)
Figure 43C:
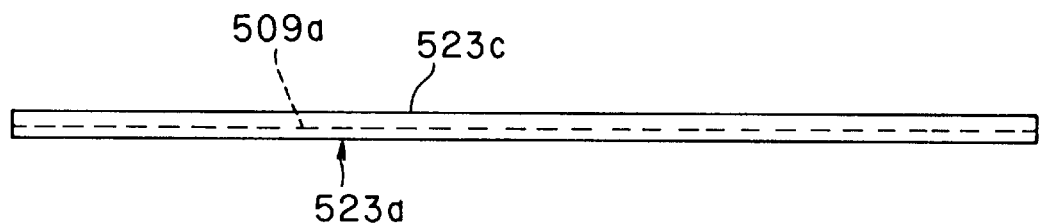
FIG. 43(c) is a front view of an inner peripheral side-half pipe member.
Figure 43D:
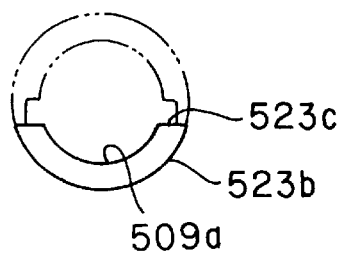
FIG. 43(d) is a side view of the inner peripheral side-half pipe member as shown in FIG. 43(c)

The inner peripheral side-half pipe member 523a has a groove portion 509a having a semi-circular cross section, and side edge portions 523c extending longitudinally along the groove portion 509a, as shown in FIGS. 43(c) and 43(d). The outer peripheral side-half pipe member 523b is formed into a linear member having the same circular cross section as the outer guide groove 510b for the direction changing passage, which is formed on the side cover plate 540. The outer peripheral side-half pipe member 523b has a groove portion 509b, which is continuously connected to the outer guide groove 510b, and side edge portions 523d extending longitudinally along the groove portion 509b. The side edge portions 523d is provided on its outer edges with projections 523e, which are to be brought into contact with the outer edges of the side edge portions 523c of the inner peripheral side-half pipe member 523a to form the retainer-guide groove 509c for the ball retainer 512.

The inner peripheral side-half pipe member 523a of the resin pipe 523 has the same length of the block body 513. The inner peripheral side-half pipe member 523a is positioned so as to be brought into contact with the back surface of the direction changing passage-inner guide forming portion 522.

The outer peripheral side-half pipe member 523b of the resin pipe 523 has on the other hand a longer length than the block body 513 by a length corresponding to the thickness of the thin sheet portion 529. The outer peripheral side-half pipe members 523b are inserted in the inserting holes 534. Longitudinal positional determination of the outer peripheral side-half pipe member 523b is made by bringing the both ends of the outer peripheral side-half pipe member 523b inserted in the inserting holes 534 into contact with the peripheral edge of the end portion of the outer guide grooves 510b for the direction changing passage, which are formed on the side cover plate 540. The projections 523e formed on the both side edges of the outer peripheral side-half pipe member 523b come into contact with the outer edges of the cylindrical flange portions 533 formed on the direction changing passage-inner guide forming portion 522 to form a part of the guide groove 510c, and the outer peripheral side-half pipe member 523b and the inner peripheral side-half pipe member 523a are restricted to be turned in the inserting hole 514.

The resin pipes 523 and the direction changing passage-inner guide forming portions 522 are accurately positioned through the inserting holes 534 formed on the thin sheet portion 529 and a proper assembling is carried out in this manner.

As shown in FIGS. 44(f) and 44(g), the side cover plate 540 is provided with an inserting recess portion 540a, in which the thin sheet portion 529 is inserted, recess portions 541 having the outer guide grooves 510b for the direction changing passage, into which portions the direction changing passage-inner guide forming portions 522 are fitted, and screw-fixing portions for securing the side cover plate 540 to the block body 513. In the screw-fixing portions, the side cover plate 540 is fixed to the block body 513 by inserting bolts (not shown) into holes 543 formed on the side cover plate 540 and engaging the bolts with screwed holes 545 formed on the end surface of the block body 513. The holes 543 are located at four positions, i.e., the position corresponding to the thin sheet portion 529 between the direction changing passage-inner guide forming portions 522, 522 of each of the resin-formed bodies 520, 520, and the positions in the vicinity of the thin sheet portions 529, 529 on the horizontal portion 506.

As shown in FIG. 44(g), the outer guide groove 510b for the direction changing passage in the recess portion 541 has on its side edges larger-diameter arcuate recesses 546, which form the retainer-guide groove 510c in cooperation with the cylindrical flange portions 533 of the direction changing passage-inner guide forming portions 522 as shown in FIG. 44(f), and a smaller-diameter arcuate recesses 547, in which the cylindrical flange portions 533 are inserted. The direction changing passage-inner guide forming portion 522 provided with the inner guide groove 510a for the direction changing passage is fitted into the recess portion 541 of the side cover plate 540, and the thin sheet portion 529 is received in the inserting recess portion 540a of the side cover plate 540. The thin sheet portion 529 is held between the side cover plate 540 and the end surface of the block body 513 through a clamping force so as to be firmly fixed therebetween.

The direction changing passage-inner guide forming portions 522 and the ball passage forming portion 521 are connected through the thin sheet portion 529, thus making it possible to maintain an accurate positional relationship of the end of the inner guide groove 510a for the direction changing passage formed in the direction changing passage-inner guide forming portion 522 relative to the ball passage forming portions 521, 521, as well as an accurate positional relationship of the inner guide groove 510a for the direction changing passage relative to the ball returning passage 509.

The thin sheet portion 529 located in the vicinity of the direction changing passage-inner guide forming portion 522 is uniformly urged against the flat end surface of the block body 513 through a clamping force applied to the side cover plate 540 (see FIG. 44). Even when the direction changing passage-inner guide forming portion 522 is not located in a correct position, the thin sheet portion 529 changes its shape on the end surface of the block body 513, thus permitting the correct positioning of the direction changing passage-inner guide forming portion 522. The thin sheet portion 529 is firmly clamped and fixed through a clamping force, which is applied to the side cover plate 540, and frictional force caused by such a clamping step may prevent an unfavorable movement of the inner guide groove 510a for the direction changing passage.

The side cover plate 540 is secured to the block body 513 so that the direction changing passage-inner guide forming portion 522 assembled to the block body 513 is fitted into the recess portion 541 of the side cover plate 40. Such a fitting step permits to make an accurate positioning of the side cover plate 540 relative to the block body 513.

Now, description will be given of assembling steps for the above-mentioned resin-formed bodies 520 for forming the ball circulation passage.

First, the inner peripheral side-half pipe member 523a of the resin pipe 523 is inserted in the through-hole 514 of the wing portion 507 of the block body 513.

Then, the resin frame 524 obtained by integral forming is inserted in the recess of the block body 513, while causing the thin sheet portions 529 at the both ends of the resin frame 524 to slide on the respective end surfaces of the wing portion 507 of the block body 513. The first connecting plate portion 525 of the resin frame 524 comes into contact with the corner portion between the horizontal portion 506 and the wing portion 507, thus making positional determination in the vertical direction of the resin frame 524. The second connecting plate portion 526 and the third connecting plate portion 527 of the resin frame 524 come into contact with the respective inner surfaces of the wing portions 507 of the block body 513, thus making positional determination of the ball passage forming portions 521, 521 and the direction changing passage-inner guide forming portions 522, 522. At this time, the inserting holes 534, 534 of the thin sheet portion 529 are aligned with the through-holes 514, 514 of the block body 513.

Then, the outer peripheral side-half pipe members 523b, 523b are inserted in the through-holes 514, 514 from the inserting holes 534, 534, thus completing the assembling step of one of the resin-formed bodies 520, 520 for forming the ball circulation passage.

The assembling step of the other of the resin-formed bodies 520, 520 is carried out in the same manner.

Then, the one side cover plate 540 is secured to the one end surface of the block body 513 by a clamping step, the ball retainer 512 holding the balls is inserted, and the other side cover plate 540 is secured to the other end surface of the block body 513 by the same clamping step, thus completing the assembling step of the movable block 504.

According to the present invention, the resin-formed bodies 520, 520 for forming the ball circulation passage are separately formed from the block body 513. Even when the movable block 504 has a larger size, there is no restriction of flow of molten resin by the block body 513, unlike the case where the block body 513 is integrally formed with the resin-formed bodies 520, 520. Increase in number of gates formed on a die may ensure proper run of the molten resin, thus improving the formability. Especially, the ball passage forming portions 521, 521 located at the opposite longitudinal sides of the ball running groove 508 are thin, with the result that molten resin may not reach every part of the space for forming the ball passage forming portions 521, 521. It is therefore effective to form the resin-formed bodies 520, 520 separately from the block body 513 in accordance with the embodiment of the present invention.

In addition, since there are formed the right and left-hand resin-formed bodies 520, 520 for forming the ball circulation passage, each of which has two endless circulation passages, a proper run of molten resin is ensured even when the movable block 513 has a larger width.

The continuous circulation passage is formed by the resin-formed body 520, and it is therefore possible to make positional determination of the inner guide groove 510a for the direction changing passage relative to the ball passage forming portions 521, 521, as well as positional determination of the inner guide groove 510a for the direction changing passage relative to the ball returning passage 509, thus ensuring continuity of the circulation passage so as to make smooth circulation of the balls 503.

When the proper positional relationship of the inner guide groove 510a for the direction changing passage relative to the ball passage forming portions 521, 521, is maintained, the ball passage forming portions 521, 521 are located at the longitudinal both sides of the ball running groove 508 so as to be aligned with the ends of the inner guide groove 510a for the direction changing passage.

When the proper positional relationship of the inner guide groove 510a for the direction changing passage relative to the ball returning passage 509 is maintained, the inner guide groove 510a for the direction changing passage can be aligned with the inner groove 523a of the ball returning passage 509.

The connecting portion of the ball passage forming portions 521, 521 and the direction changing passage-inner guide forming portion 522 is obtained by integral forming, thus permitting omission of an assembling step of the connecting portion. Although the running direction of the balls 503 is changed in such a connecting portion, the above-mentioned integral structure may ensure continuity of the circulation passage, without being affected by assembling accuracy. It is therefore possible to make smooth run of the balls 503 from the ball running passage between the ball running groove 505 and the ball running counter-groove 508 to the direction changing passage 510, as well as from the direction changing passage 510 to the ball returning passage 509.

According to the present invention as described in detail, since the resin-formed body for forming the rolling member circulation passage is separately formed from the block body, even when the movable block has a larger size, increase in number of gates formed on a die may ensure proper run of the molten resin, thus improving the formability. It is therefore effective to form the resin-formed body separately from the block body in accordance with the present invention, taking into consideration the fact that the rolling member passage forming portions located at the opposite longitudinal sides of the rolling member running track are thin, with the result that molten resin may not reach every part of the space for forming the rolling member passage forming portions.

The continuous circulation passage is formed by the resin-formed body, and it is therefore possible to make positional determination of the inner guide groove for the direction changing passage relative to the rolling member passage forming portions, as well as positional determination of the inner guide groove for the direction changing passage relative to the rolling member returning passage, thus ensuring continuity of the circulation passage so as to make smooth circulation of the rolling members.

When the connecting portion of the rolling member passage forming portions and the direction changing passage-inner guide forming portion or the connecting portion of the direction changing passage-inner guide forming portion and the returning passage forming portion, in which portion the running direction of the rolling members is changed is obtained by integral forming, it is possible to omit an assembling step of the connecting portion and to ensure continuity of the circulation passage, without being affected by assembling accuracy.

The integral formation of the connecting portion of the rolling member passage forming portion with the direction changing passage-inner guide forming portion may cause the smooth running of the rolling members between the rolling member running track in the loaded area and the direction changing passage-inner guide forming portion, even when the returning passage forming portion formed of resin is not used.

When the rolling member retainer is used, it is possible to maintain a proper continuity on the entire periphery of the circulation passage in the retainer guide portion for guiding the rolling member retainer.

The thin retainer guide portion is formed without insertion of the body of the movable member in a die, and position of gates in the die can freely be determined without being restricted by the body of the movable member, with the result that molten resin can reach, during formation of the guide portion, the entire space therefor, which is formed in the die.

In addition, the formation of the right and left-hand resin-formed bodies for forming the rolling member circulation passage, each of which has two endless circulation passages may ensure a proper run of molten resin even when the body of the movable member has a larger width.

The connection of the direction changing passage-inner guide forming portion with the rolling member passage forming portion through the thin sheet portion makes it possible to maintain, through deformation of the thin sheet portion, a proper positional relationship between the direction changing passage-inner guide forming portion and the rolling member passage forming portion or a proper positional relationship between the direction changing passage-inner guide forming portion and the rolling member returning passage forming portion, thus making an accurate positional determination of the end of the direction changing passage-inner guide forming portion relative to the rolling member returning passage forming portion as well as an accurate positional determination of the direction changing passage-inner guide forming portion relative to the rolling member returning passage forming portion.

The thin sheet portion is urged against the flat end face of the body of the movable member by a clamping force, which is applied to the side cover plate. It is therefore possible to correct the position of the direction changing passage-inner guide forming portion through deformation of the thin sheet portion, even when the direction changing passage-inner guide forming portion is not correctly positioned relative to the end face of the body of the movable member.

In addition, the thin sheet portion can firmly be secured between the side cover plate and the body of the movable member by the clamping force, which is applied to the side cover plate, and it is therefore possible to prevent the direction changing passage-inner guide forming portion from being incorrectly placed.

What is claimed is:

1. A linear motion guiding apparatus comprising:
a guide member provided with at least one rolling member running track, and
a movable member arranged so as to be movable along the guide member, said movable member being provided with (i) a rolling member running counter-track corresponding to each of the at least one rolling member running track of said guide member, (ii) a rolling member returning passage arranged in parallel with each said rolling member running counter-track and (iii) a direction changing passage for connecting each said rolling member running counter-track and the corresponding rolling member returning passage to permit circulation of a plurality of rolling members, wherein:
said movable member comprises a movable main body and a separate resin-formed body for providing a rolling member circulation passage;
said resin-formed body comprises a pair of rolling member passage forming portions extending along both longitudinal sides of said rolling member running counter-track and a pair of direction changing passage-inner guide forming portions for providing inner peripheral guide portions of said direction changing passage; and
said resin-formed body is divided into a plurality of parts so that at least two of said pair of rolling member passage forming portions and said pair of direction changing passage-inner guide forming portions are integrally formed, and a remainder of said pair of rolling member passage forming portions and said pair of direction changing passage-inner guide forming portions is separated independently from said at least two, whereby said resin-formed body can be built in said movable main body;
said guide member comprises a guide rail provided with two said rolling member running tracks on each of right and left-hand side surfaces of the guide rail, so as to provide a total of four said rolling member running tracks;
said movable member comprises a movable block, said movable block comprising:
a pair of wing portions, between which the guide rail is held at the right and left-hand side surfaces thereof, each of said wing portions having on an inner surface thereof two said rolling member running counter-tracks corresponding to said two rolling member running tracks on each said side of the guide rail, so as to provide a total of four said rolling member running counter-tracks in the movable block;
four rolling member returning passages arranged in parallel with said four rolling member running counter-tracks, respectively; and direction changing passages for connecting both ends of each of said four rolling member running counter-tracks with ends of a respective one of said four rolling member returning passages;

said four rolling member running counter-tracks, said four rolling member returning passages and said direction changing passages providing four endless circulation passages;

said resin-formed body comprising, for each of said four endless circulation passages, the pair of rolling member passage forming portions, a returning passage forming portion for providing the rolling member returning passage and the pair of direction changing passage-inner guide forming portions;

said resin-formed body being divided into two body-parts, which are arranged on the wing portions of the movable block, respectively, so as to form the two endless circulation passages at an inner side of each of the wing portions; and in each of the two body-parts, the pair of rolling member passage forming portions and the pair of direction changing passage-inner guide forming portions are provided as an integral body, and the returning passage forming portion is provided separate from said integral body.

2. An apparatus as claimed in claim 1, wherein:

a rolling member retainer is provided, said rolling member retainer being able to retain the rolling members in a train with a prescribed distance kept between adjacent two of the rolling members, and said rolling member retainer having side edge portions projecting from both sides of each of the rolling members; and guide grooves for guiding the side edge portions of the rolling member retainer are formed on an entire periphery of the rolling member circulation passage.

3. An apparatus as claimed in claim 1, wherein:

each of said direction changing passage-inner guide forming portions has a thin sheet portion, which is to be brought into contact with an end face of the body of said movable member, and said each of said direction changing passage-inner guide forming portions is connected to the rolling member passage forming portions or the returning passage forming portion by means of said thin sheet portion.

* * * * *